US010269121B2

(12) United States Patent
Socek et al.

(10) Patent No.: US 10,269,121 B2
(45) Date of Patent: Apr. 23, 2019

(54) FAST COLOR BASED AND MOTION ASSISTED SEGMENTATION OF VIDEO INTO REGION-LAYERS

(71) Applicant: Intel Corporation, Santa Clara, CA (US)

(72) Inventors: Daniel Socek, Miami, FL (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 15/499,776

(22) Filed: Apr. 27, 2017

(65) Prior Publication Data

US 2018/0315196 A1 Nov. 1, 2018

(51) Int. Cl.
*G06T 7/00* (2017.01)
*G06T 7/11* (2017.01)
*G06T 7/90* (2017.01)
*G06T 7/215* (2017.01)

(52) U.S. Cl.
CPC .............. *G06T 7/11* (2017.01); *G06T 7/215* (2017.01); *G06T 7/90* (2017.01); *G06T 2207/20076* (2013.01)

(58) Field of Classification Search
None
See application file for complete search history.

(56) References Cited

U.S. PATENT DOCUMENTS

| 2011/0293180 | A1* | 12/2011 | Criminisi | G06K 9/38 382/173 |
| 2012/0170659 | A1* | 7/2012 | Chaudhury | H04N 19/139 375/240.16 |
| 2013/0121577 | A1* | 5/2013 | Wang | G06T 7/20 382/173 |
| 2015/0116350 | A1* | 4/2015 | Lin | G06T 11/60 345/620 |
| 2015/0117784 | A1* | 4/2015 | Lin | G06K 9/4671 382/195 |

OTHER PUBLICATIONS

Bai, X. et al., "Dynamic Color Flow: A Motion Adaptive Model for Object Segmentation in Video", ECCV 2010, European Conference on Computer Vision and Pattern Recognition, pp. 617-630, Sep. 2010, Heraklion, Crete, Greece.
Grundmann, Matthias et al., "Efficient Hierarchical Graph-Based Video Segmentation", CVPR 2010, IEEE Conference on Computer Vision and Pattern Recognition, pp. 2141-2148, Jun. 2010, San Francisco, USA.
Guo, Ju et al., "New Video Object Segmentation Technique with Color/Motion Information and Boundary Postprocessing", Applied Intelligence Journal, Mar. 1999.

(Continued)

*Primary Examiner* — Delomia L Gilliard
(74) *Attorney, Agent, or Firm* — Green, Howard & Mughal LLP.

(57) ABSTRACT

Techniques related to improved video frame segmentation based on color, motion, and texture are discussed. Such techniques may include segmenting a video frame of a video sequence based on only dominant color when the frame does not have a dominant motion nor a global motion in a high probability region of dominant color within the video frame.

24 Claims, 32 Drawing Sheets

(56) References Cited

OTHER PUBLICATIONS

Lezama, Jose et al., "Track to the Future: Spatio-temporal Video Segmentation with Long-range Motion Cues", CVPR 2011, IEEE Conference on Computer Vision and Pattern Recognition, pp. 3369-3376, Jun. 2011, Colorado Springs, USA.

Papazoglou, A. et al., "Fast Object Segmentation in Unconstrained Video", ICCV 2013, International Conference on Computer Vision, pp. 1777-1784, Dec. 2013, Sydney, Australia.

Zhang, et al., "Video Object Segmentation through Spatially Accurate and Temporally Dense Extraction of Primary Object Regions", CVPR 2013, IEEE Conference on Computer Vision and Pattern Recognition,pp. 628-635, Jun. 2013, Portland, USA.

\* cited by examiner (i)

(ii)

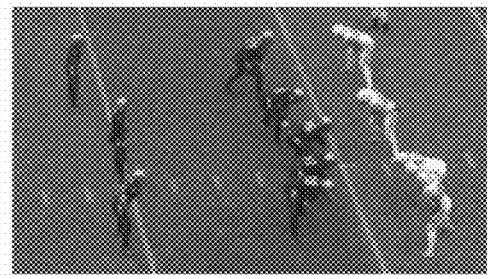
911 (i)  (ii) 912
913 (iii)  FIG. 9B  (iv) 914
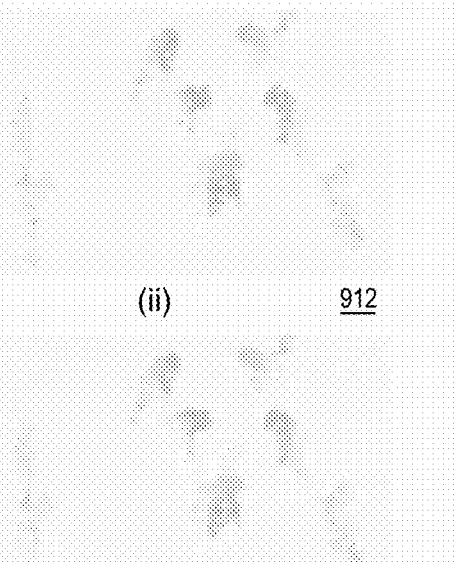
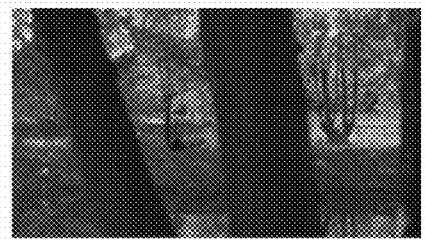
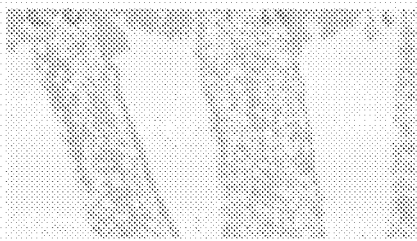
921 (i)  (ii) 922
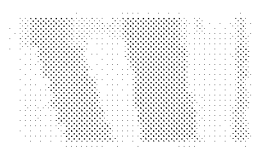
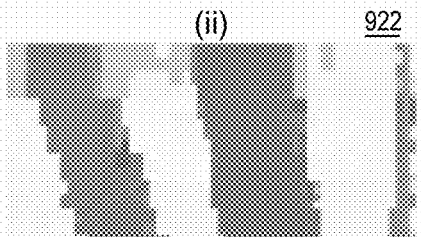
923 (iii)  (iv) 924
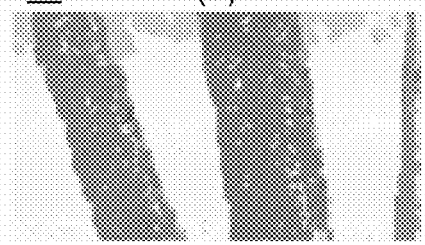
(v)
925  FIG. 9C

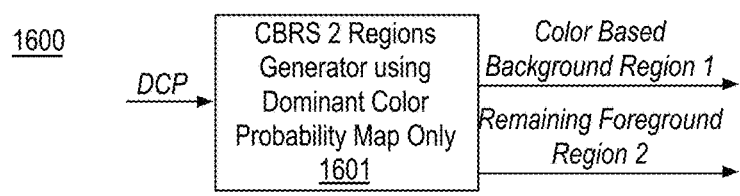
FIG. 16A
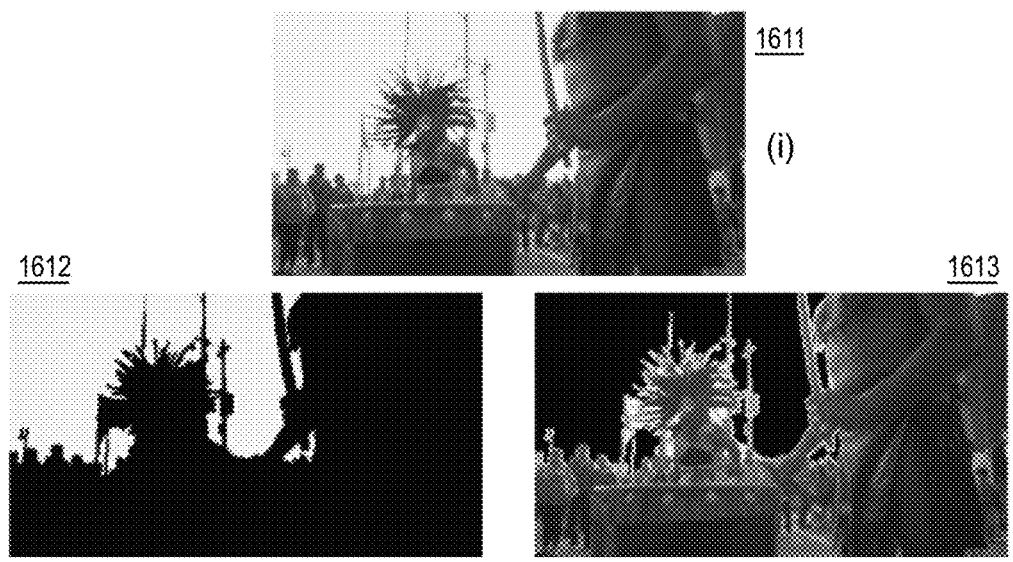
FIG. 16B
FIG. 16C

FAST COLOR BASED AND MOTION ASSISTED SEGMENTATION OF VIDEO INTO REGION-LAYERS

BACKGROUND

Segmentation of video scenes into meaningful region-layers such that each region-layer represents a grouping of regions or objects that share a number of common spatio-temporal properties has been and remains a difficult task despite considerable effort. The task becomes even more challenging if this segmentation needs to be performed in real-time or even faster, with high reliability, in moderate compute complexity, and with good quality as necessary in a new generation of critical image processing and computer vision applications such as surveillance, autonomous driving, robotics, and real-time video with high quality/compression.

The state of the art in image/video segmentation is not able to provide good quality segmentation consistently on general video scenes in a compute effective manner. If a very large amount of compute resources are not available, to get good quality segmentation such segmentation must still be performed manually or in a semi-automatic manner. This, however, limits its use to non-real time applications where cost and time of manual segmentation can be justified. For real time applications, either a tremendous amount of compute resources have to be provided, alternate mechanisms have to be devised, or poor quality has to be tolerated.

For example, a current technique (please see J. Guo, J. Kim, C.-C. J. Kuo, "New Video Object Segmentation Technique with Color/Motion Information and Boundary Post-processing," Applied Intelligence Journal, March 1999) for video segmentation based on color/motion has been provided for foreground/background segmentation for MPEG-4 video, which supported object based video coding. It operates in L*u*v* color space using its unique properties to derive a color feature, which is a gradient based iterative color clustering algorithm called mean shift algorithm to segment homogenous color regions per colors that are dominant. The color feature is then combined with a motion feature. Moving regions are detected by motion detection method and analyzed by region based affine model and tracked to increase the spatial and temporal consistency of extracted objects. The motion detection is a high order statistics based algorithm, and the motion estimation is done by region based affine model on spatial regions identified by color based feature. The process involves determining if a feature belongs to foreground or background. The boundary of regions can be of variable precision to match the bit-rate needs of MPEG-4 due to implications to coding efficiency. This approach is primarily designed for 2 level segmentation of a scene into a foreground and a background object; it is designed for a constrained class of sequences such as typically encountered in videoconferencing application.

Another approach (please see M. Grundmann, V. Kwatra, M. Han, I. Essa, "Efficient Graph Based Video Segmentation," CVPR 2010, IEEE Conference on Computer Vision and Pattern Recognition, pp. 2141-2148, June 2010, San Francisco, USA) is volumetric and starts by oversegmenting a graph of a volume (chunk) of video into space-time regions with a grouping based on appearance. Following this, a region graph is created over obtained segmentation and iteratively repeated on multiple levels until a tree of spatio-temporal segmentations is generated. It is asserted that the approach generates temporally coherent segmentations with stable region boundaries, and allows for choice of different levels of granularity. Furthermore, the segmentation quality may be improved by using dense optical flow to help temporal connections within initial graph. To improve scalability, two variants of the algorithm include an out-of-core parallel algorithm that can process much larger volumes than the in-core algorithm and an algorithm that temporally segments video into scene into overlapping clips and then segments them successively. The basic algorithm's processing is complex with processing time for a 40 sec video of CIF to SD resolution of around 20 min, which implies 1 sec (30 frames) video takes 20/40=½min (30 secs); thus the processing time for 1 frame of low to medium resolution is around ~1 sec or 1000 msec. A portion of the method relating to selection and tracking may be semi-automatic as a postprocessing operation left to user, while the main segmentation is automatic. The may be high-delay as performing segmentation of a volume involves first collecting all frames that make up the volume before processing. FIG. 1 illustrates the key principles of this segmentation approach including (i) an example region graph and (ii) example segmentation with and without optical flow edges and features.

Yet another approach (please see X. Bai, J. Wang, G. Sapiro, "Dynamic Color Flow: A Motion Adaptive Model for Object Segmentation in Video," ECCV 2010, European Conference on Computer Vision and Patten Recognition, pp. 617-630, September 2010, Heraklion, Crete, Greece) for segmentation uses a scalable hierarchical graph based algorithm. The algorithm may also use modeling of object features including color and other features. The algorithm goes beyond color models such as Gaussian mixture model, localized Gaussian mixtures model, and pixel-wise adaptive modesl as they fail in complicated scenes leading to incorrect segmentation. The segmentation algorithm introduces a new color model called Dynamic Color Flow that incorporates motion estimation into color modeling and adaptively changes model parameters to match local properties of motion. The proposed model attempts to accurately reflect changes in a scene's appearance caused by motion and may be applied to both background and foreground layers for efficient segmentation of video. The model may provide more accurate foreground and background estimation allowing video object separation from scenes. FIG. 2 illustrates the key principles of this segmentation approach including (i) example variance adapting to local intensity across an object and (ii) example segmentation.

Therefore, current approaches have limitations in that they either require high-delay due to operating on a volume of frames, lack flexibility beyond 2 layer segmentation (such as for video conferencing scenes), require a-priori knowledge of parameters needed for segmentation, lack sufficient robustness, or are not practical general purpose solutions as they require manual interaction, provide good quality region boundary while offering complexity tradeoffs, exhibit scale complexity depending on how many regions are segmented, or some combination of the aforementioned limitations.

As such, existing techniques do not provide fast segmentation of video scenes in real time. Such problems may become critical as segmentation of video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale.

For example, the dimensions of some elements may be exaggerated relative to other elements for clarity. Further, where considered appropriate, reference labels have been repeated among the figures to indicate corresponding or analogous elements. In the figures:

FIG. 9B illustrates an example of merging motion vector fields;

FIG. 9C illustrates another example of merging motion vector fields;

FIG. 16A illustrates an example conceptual block diagram of a system that performs color based two primary region segmentation using color only;

FIG. 16B illustrates example processing results attained by the system of FIG. 16A;

FIG. 16C illustrates additional example processing results attained by the system of FIG. 16A;

DETAILED DESCRIPTION

Figure 1:
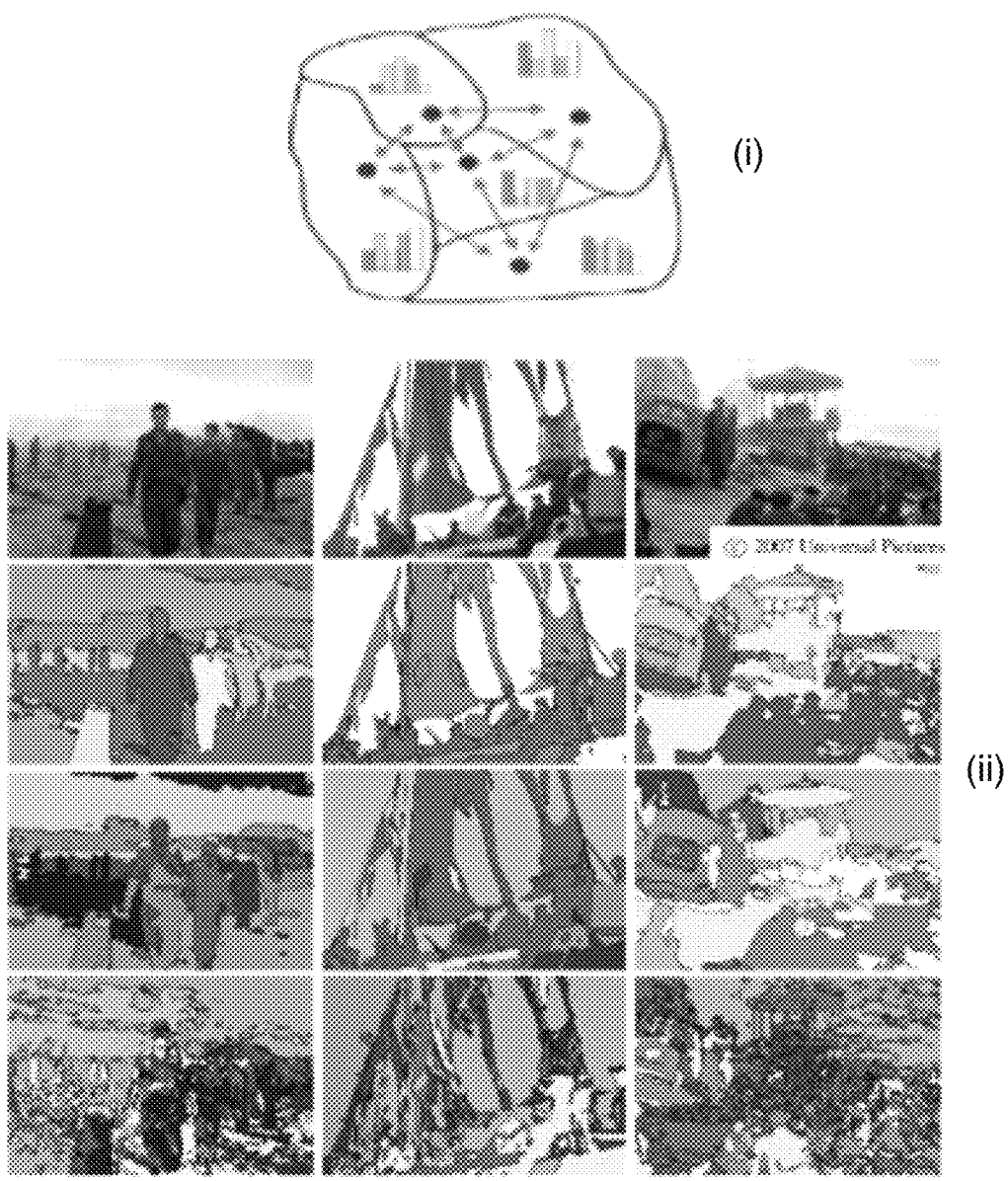
FIG. 1 illustrates a prior art segmentation approach.
Figure 2:
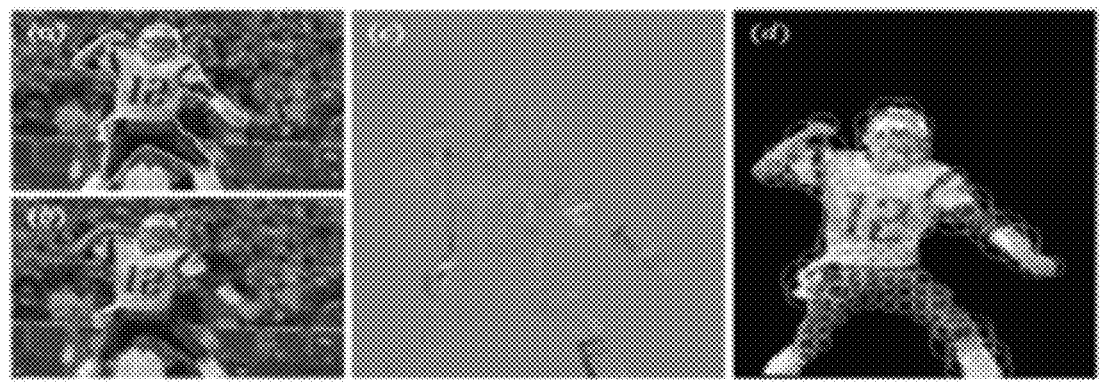
FIG. 2 illustrates another prior art segmentation approach.
Figure 2:
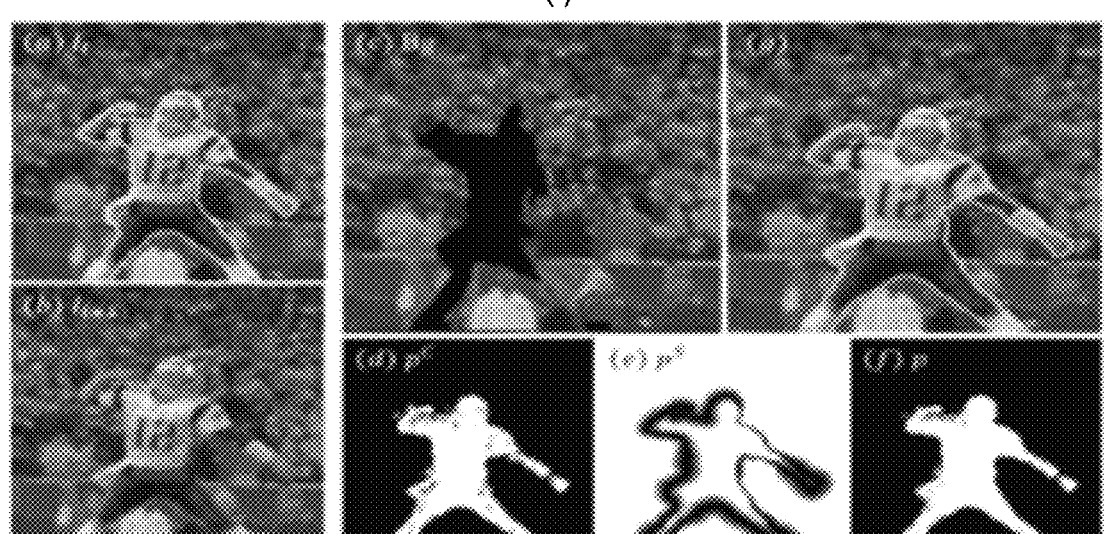

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to fast color based segmentation of video scenes. Such techniques may be used in a variety of contexts.

For example, the techniques discussed herein may provide fast color based segmentation of video scenes that have at least one dominant color. For example, the term dominant color does not necessarily mean that a video scene includes a significant region of uniform color. As used herein, dominant color is used to indicate a video scene includes a region, group of regions, or the like in which many pixels have a similar (i.e., but not identical) color. For example, an outdoor video scene may include a sky in a portion of the frame. In such a scene, the color of sky would provide a dominant color, as would, for example, a body of water such as a river, a lake or an ocean, as would, for example, a scene of a field perhaps containing significant patches of grass or plants and/or trees. Furthermore, the techniques discussed herein is applicable to indoor video scenes that may include a dominant color from, for example, a curtain, a wall, a table, or the like. Therefore, many typical video scenes include one or more regions of having a dominant color along with some form of motion. The techniques discussed herein are applicable to all such scenes.

Furthermore, in some embodiments, the techniques discussed herein are not based solely on color, but are also based partly on motion and on texture. As such, the techniques discussed herein may be characterized as color based (motion assisted) region segmentation. For example, some video scenes may be characterized as general such that the scenes do not contain a significant area of uniform color although they may contain some sub-regions that can be segmented based on color. In some embodiments, such scenes may contain objects with several different kind of motion such as local motion of small size objects and/or motion of medium to large size objects (e.g., which may be characterized as dominant motion), and/or global motion (e.g., caused by camera operation or the like).

The techniques discussed herein may address current shortcomings in video scene segmentation as follows: the techniques discussed herein may be used for normal or low delay (e.g., a volume of frames is not needed for operation), are flexible (e.g., may be applied to any video scene and not just videoconferencing scenes), are content adaptive and may adaptively determine best parameters for segmentation, are robust, reliably yielding spatial and temporally consistent region-layers (and regions), are practical (e.g., real time or faster on state of art PC for HD video) (e.g., may not require any pre-segmentation such as interactive selection of regions or background), are of good quality (e.g., providing 4 pixel accuracy region boundaries and complexity tradeoff), and/or are scalable (e.g., if the number of region-layers are increased, there is moderate complexity increase).

The techniques discussed herein may be based on the general principle of fragmentation of each frame of video into some number of (e.g., 2 to 5) region-layers depending on some common properties of the content of the scene. The segmented region-layers may also be temporally consistent from frame-to-frame to provide the capability of tracking changes due to motion in regions of region-layers over time. As used herein, a region-layer is defined to be an image plane including a subset of pixels of a frame that represent a related region within the frame. For example, a frame may include any number of such region-layers of subsets of pixels of a frame that represent related regions within the frame. For example, an input frame of video may be segmented into several non-overlapping region-layers such that the segmented region-layers when correctly depth ordered may be merged to yield a reconstruction of the input frame. In some embodiments, the primary basis for initial segmentation of a frame into two regions is either a dominant color in the scene or a dominant color assisted by global motion in the scene. In some embodiments, the dominant-color region from such initial segmentations is not segmented further. In some embodiments, the non-dominant-color region from the initial segmentation may optionally undergo examination for further segmentation either based on color, motion based region splitting, or multiple color and/or motion based region splitting. Therefore, the techniques discussed herein may be applied to the segmentation of video scenes in which either one or more dominant color regions exist that have a significant percentage of pixels with similar, for example, YUV colors. The scenes may additionally include objects/regions with global and/or local motion. Herein, since a region-layer may include one or more regions, to reduce any confusion resulting from introduction of the term region-layer, to represent grouping of regions, the term region is used. From the context, the use of such terms will be clear as to when reference is made to a region-layer or an individual region.

Figure 3A:
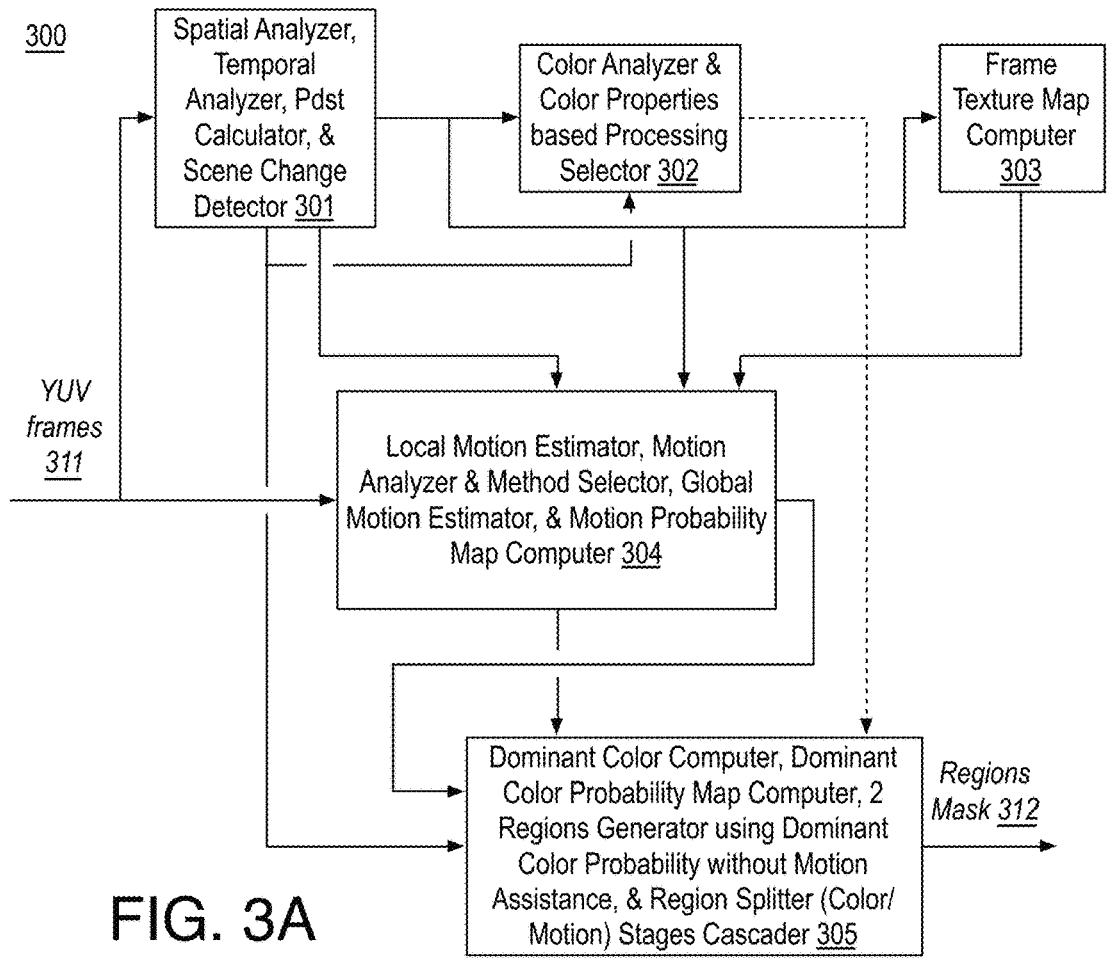
FIG. 3A illustrates an example color based motion assisted region segmentation system.

FIG. 3A illustrates an example color based motion assisted region segmentation system 300, arranged in accordance with at least some implementations of the present disclosure. For example, FIG. 3A illustrates a high level system diagram of a color based motion assisted region segmentation system. As shown, system 300 may include a number of blocks each of which may be a processing-block-group that perform a number of related operations. For example, system 300 may include a spatial analyzer, temporal analyzer, Pdst (P-distance) calculator, and scene change detector 301 (e.g., a processing-block-group that performs content pre-analysis), a color analyzer and color properties based processing selector 302 (e.g., a processing-block-group that performs color distribution analysis and method selection), a frame texture map computer 303 (e.g., a processing-block-group that evaluates texture distribution), a local motion estimator, motion analyzer and method selector, global motion estimator, and motion probability map computer 304 (e.g., a processing-block-group that estimates and analyzes motion), and a dominant color computer, dominant color probability map computer, 2 regions generator using dominant color probability map without motion assistance, and region splitter (color/motion) stages cascader 305 (e.g., a processing-block-group that generates segmented regions).

As shown, YUV frames 311 (or frames in any other suitable color space format) to be segmented are input to spatial analyzer, temporal analyzer, Pdst calculator, and scene change detector 301, which performs a number of scene analysis operations. For example, the spatial analyzer may measure parameters that may be used to describe spatial activity/detail. Furthermore, the temporal analyzer may measure parameters that may be used to describe temporal activity/motion. Furthermore, the Pdst calculator may determine which past frame is stable enough to serve as a reference for estimating motion of a current frame. In some embodiments, to reduce the overall complexity of calculations, some of the operations may be performed on downsampled video. Finally, the scene change detector may detect hard cuts or scene changes in the video content of YUV frames 311. Such processing may be fast by operating on downsampled content and reliable due to use of many scene change detection parameters that are trained using machine learning.

Also as shown, texture cues may be computed by frame texture map computer 303, which may include a texture distribution cues computer processing-block-group or the like. Such texture cues may be derived for a frame based on previously computed spatial analysis parameters from spatial analyzer, temporal analyzer, Pdst calculator, and scene change detector 301. Among the many aspects of texture cues that can be used, a map of the frame showing low detail area may be particularly advantageous.

Several of the computed parameters from spatial analyzer, temporal analyzer, Pdst calculator, and scene change detector 301 may be used by color analyzer and color properties based processing selector 302, which may perform measurement of distribution of color in the downsampled frame to determine if a dominant color $d_c$ exists and then differencing per pixel and scaling to calculate a dominant color probability map (DCP) for which a binarization threshold $t_c$ may be computed and the DCP may be binarized based on the binarization threshold to yield a binarized mask BDCP. The binarized mask may be cleaned up with morphological processing and the two separate regions it indicates may be analyzed for texture gradients to determine a color processing method (csm) to select from the two available choices, and a color differencing method (cdm) to select from the two available choices.

Computation of motion cues may be performed by local motion estimator, motion analyzer and method selector, global motion estimator, and motion probability map computer 304. For example, the local motion estimator may determine block motion estimates such as an 8×8 block motion vector field. A motion analyzer, motion distance method and splitting selector may determine a motion histogram and, based on peaks, determine dominant motion $d_m$, and analyze the difference of the motion vector field both in a magnitude domain and an angle domain by computing the difference, threshold calculation, binarization, morphological clean up followed by determining stability of each approach, to determine a motion differencing method (mdm) to select from the two available choices. A global motion estimator may determine motion parameters based on, for example, a six parameter affine model that may be used for warping prediction and thus motion estimates for pixel (or small-blocks) in regions of global motion. Following determination of local and global motion, a global motion may be mapped to centers of each 8×8 block in an 8×8 block array, and a map of local/global motion probabilities may be determined.

Final processing may be performed by dominant color computer, dominant color probability map computer, 2 regions generator using dominant color probability map without motion assistance, and region splitter (color/motion) stages cascader 305, which may include several individual processing-blocks. For example, dominant color computer, dominant color probability map computer, 2 regions generator using dominant color probability map without motion assistance, and region splitter (color/motion) stages cascader 305 may include a dominant color computer that determines a dominant color, followed by a dominant color probability map computer that may determine a dominant color probability map, followed by a pair of processing-blocks on parallel paths, a 2 regions generator using dominant color probability map only that may use dominant color only and a 2 regions generator using dominant color probability map with global/local motion probability map that may use dominant color with motion assistance. The output of these blocks may optionally undergo splitting in a region splitter stages (color, motion) cascader, which may generate and output a final region or regions mask 312.

Figure 3B:
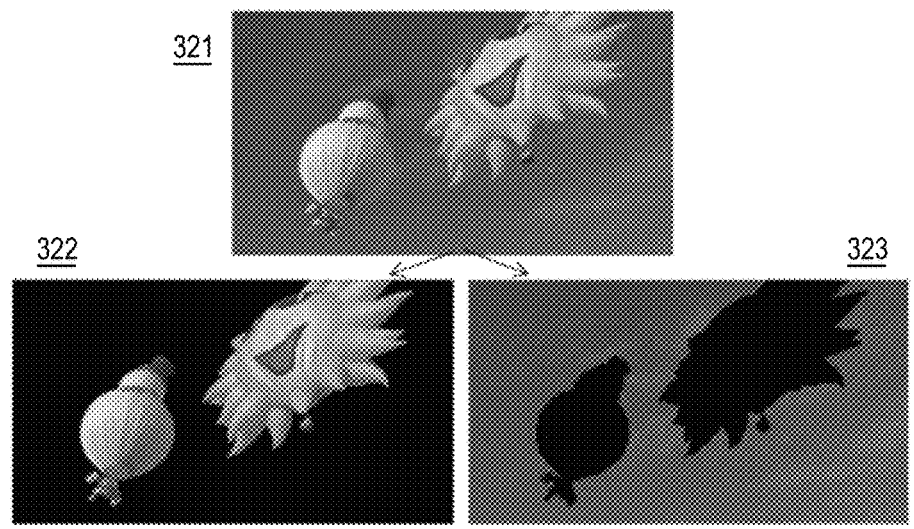
FIG. 3B illustrates an example segmentation of a video frame into a first region-layer and a second region-layer.

FIG. 3B illustrates an example segmentation of a video frame 321 into a first region-layer 322 (e.g., including balloon objects) and a second region-layer 323 (e.g., including sky or sky objects), arranged in accordance with at least some implementations of the present disclosure. For example, FIG. 3B illustrates example results of the segmentation of video frame 321 into first region-layer 322 and second region-layer 323 using the techniques discussed herein.

Figure 4:
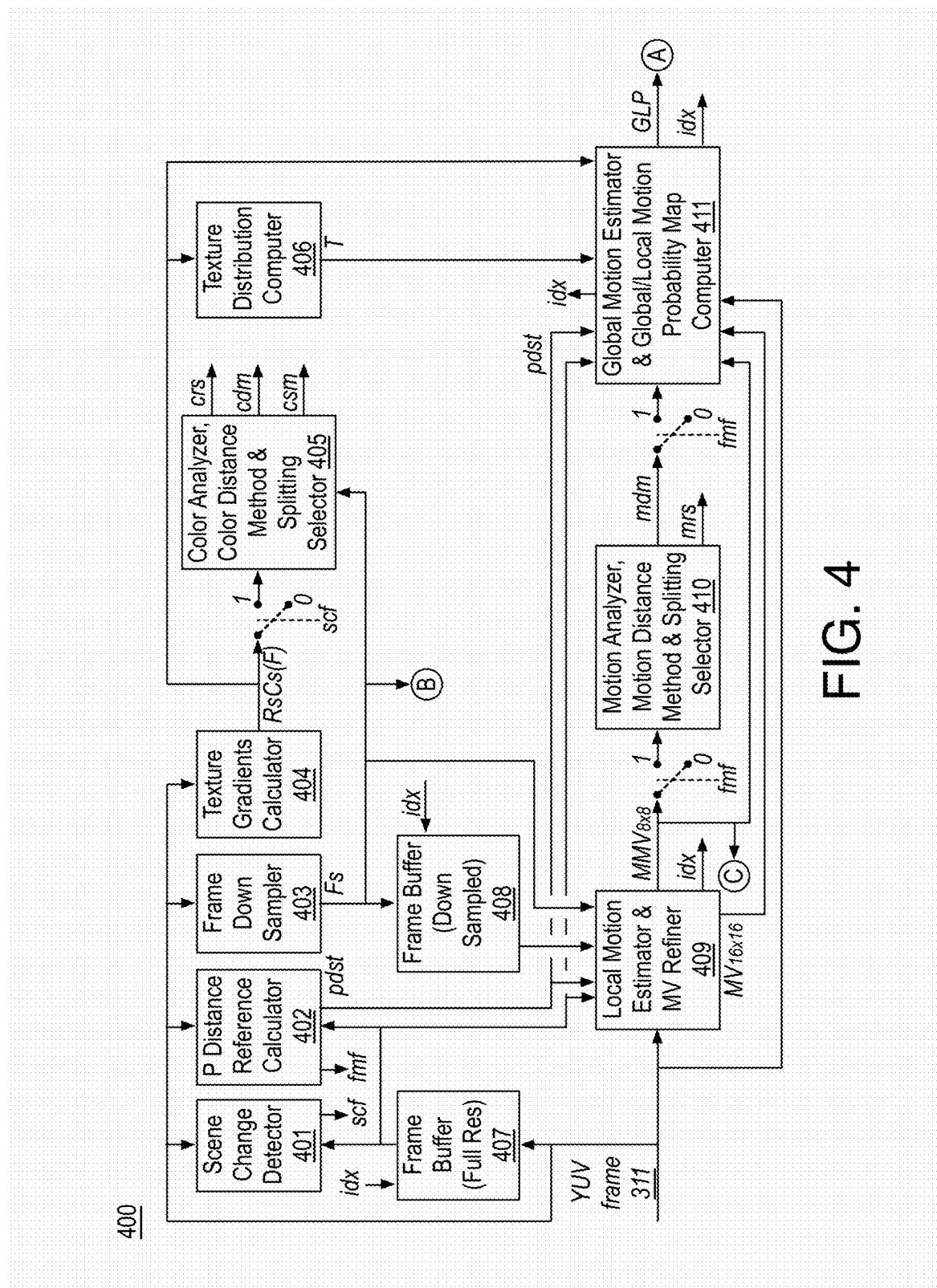
FIG. 4 illustrates an example color based motion assisted region segmentation system.
Figure 4:
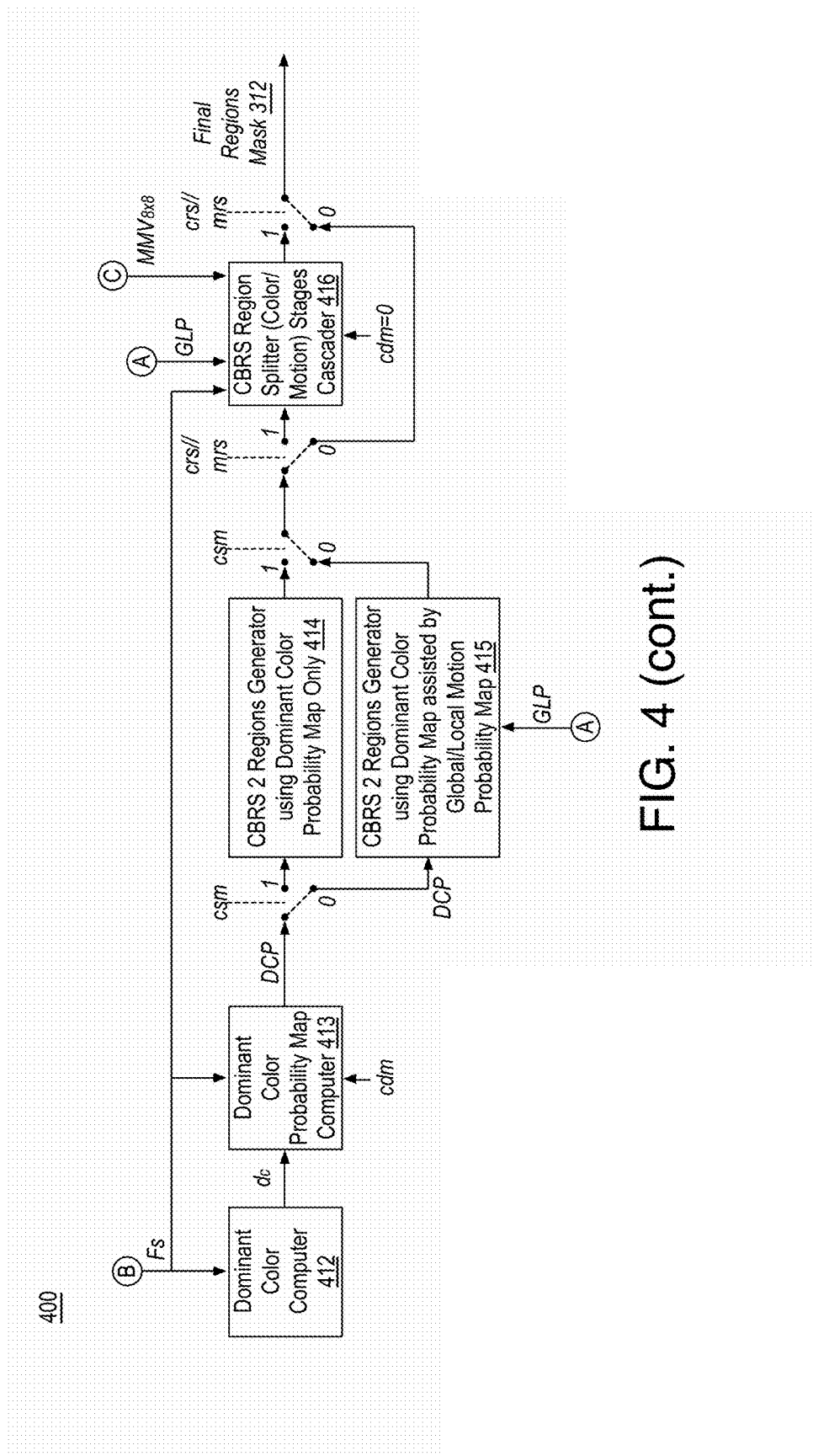

FIG. 4 illustrates an example color based motion assisted region segmentation system 400, arranged in accordance with at least some implementations of the present disclosure. For example, FIG. 4 may provide a detailed system 400 corresponding to the high level system illustrated in FIG. 3A. For example, FIG. 4 provides a further breakdown of processing-block-groups of FIG. 3A into processing-blocks and inter-connections between each of the processing blocks, buffers, as well as control signals.

Before discussing the details of the system of FIG. 4, the overall nomenclature of the various terms employed to describe the operations of this invention are provided below.

Nomenclature of Various Data and Signals Used Herein
b—block size
F—original frame
Fs—subsampled frame
scf—scene change frame
pdst—prediction (P) frame distance
idx—index
$d_c$—dominant color
$d_m$—dominant motion
$t_c$—threshold for dominant color
$t_m$—threshold for dominant motion
$t_b$—threshold for border refinement
$ht_c$—high threshold for color
DCP—Dominant Color probability map; its binarized versions are BDCP, BDCP', BDCP'', $BDCP^a$, $BDCP^b$, $BDCP^c$
GLP—Global/Local Probability map; its binarized versions are BGLP, BGLP1
csm—color separation method
cdm—color differencing method
mdm—motion differencing method
crs—color region splitter
mrs—motion region splitter
fmf—first motion frame (after scene cut to use motion due to pdistance isssues)
cms—color/motion splitting method, also cms2
nas—number of additional segments—its versions are nas2, nas3, nas4
$R_s$—a measure of vertical texture, i.e., vertical (or row) gradient
$C_s$—a measure of horizontal texture, i.e., horizontal (or columns) gradient
$R_sC_s(F)$— a combined measure of $R_sC_s$ based texture for the frame
T—a Texture measure, also represented as T' and T"
H—Histogram
$MD_m$—Motion Difference magnitude; its binarized versions are $BMD_m$ and $BMD'_m$
$MV_{16\times16}$—16×16 motion vector array corresponding to a frame
$MV_{8\times8}$—8×8 motion vector array corresponding to a frame
$MMV_{8\times8}$—updated 8×8 motion vector array after merging of $MV_{16\times16}$ and $MV_{8\times8}$
$GM_{pars}$—Global Motion parameters
$GMV_{8\times8}$—Global motion based 8×8 motion vector array Turning now to FIG. 4, as shown, a YUV frame 311 (F) may be input to system 400 and a number of events may occur, optionally simultaneously. YUV frame 311 (F) may be input to frame buffer (full resolution) 407 (e.g., a frame buffer, BF, of full resolution frames) and YUV frame 311 (F) may be filtered and downsampled by frame down sampler 403 the output of which (e.g., a down sampled frame) Fs is stored in frame buffer (down sampled) 408 (e.g., a frame buffer, BFs, of down sampled frames). Furthermore, YUV frame 311 (F) may be analyzed to determine whether it belongs to a new scene as compared to a previous frame in scene change detector 401, which outputs an scf flag set to 1 when the current frame is a scene change frame (and a 0 or no signal otherwise). YUV frame 311 (F) may be compared against past frames from frame buffer 407 in P distance reference calculator 402 to determine which of the past frames would be the most stable one to use as reference for motion calculations (e.g., which may be signaled as pdst). YUV frame 311 (F) may also be input to texture gradients calculator 404 which may output RsCS(F) as a measure of frame complexity in terms of texture gradients. Such texture gradients measurement RsCS(F) and/or other texture gradient measurements and/or other texture cues may be used by texture distribution computer 406 to determine a map of texture levels (e.g., with emphasis on low texture region) of the entirety of YUV frame 311 (F).

Furthermore, if YUV frame 311 (F) belongs to a new scene, a number of color and motion based parameters may be determined that allow for control of the segmentation process of color based region segmentation. For example, color based parameters may be determined by color analyzer, color distance method and splitting selector 405. Determination of such color based parameters may include determining the choice of color differencing method, cdm, the choice of color separation method, csm, and whether color should be used for region splitting, crs. The influence of these parameters on segmentation is discussed further herein below.

Discussion now turns to the operation of the three motion related processing-blocks in FIG. 4 including the motion based parameters they generate to control segmentation. The current YUV frame 311 (F) and a previous YUV frame (from buffer) are input to local motion estimator and motion vectors (MV) refiner 409 that may determine, for the current YUV frame 311 (F), 16×16 block motion vectors that may then be refined to 8×8 block-size to produce a non-noisy motion vector field (MMV8×8) suitable for region segmentation. The 8×8 motion vector field may be input via a first switch controlled by first motion frame (fmf) control that feeds MMV8×8 to motion analyzer, motion distance method and splitting selector 410, the two outputs of which are motion region splitter (mrs) and motion differencing method (mdm) control signals. The mdm signal is input to global motion estimator and global/local motion probability map computer 411 that computes global motion parameters between the current full size YUV frame 311 (F) and a previous frame from frame buffer 407 and derives a motion estimate for center pixels of each 8×8 block for the current YUV frame 311 (F) resulting in a global motion based 8×8 motion field $GMV_{8\times8}$ for the frame. For every 8×8 block, the motion field may be differenced with a corresponding merged motion vector $MMV_{8\times8}$ motion field based on the differencing method such as magnitude difference or angle difference as indicated by the mdm signal. The absolute value of the differenced motion field may then be scaled and output as a calculated global/local motion probability map, GLP.

Also as shown, dominant color computer 412 may receive as input a downsampled frame and output dominant color $d_c$ which may then be input along with downsampled frame, and the color difference method (cdm) control signal to dominant color probability map computer 413, which may generate a dominant color probability (DCP) map. The DCP map may be input via a switch controlled by the color separation method (csm) flag to two processing blocks in parallel: CBRS 2 regions generator using dominant color probability map only 414, which is the main color based processing path, and CBRS 2 regions generator using dominant color probability map assisted by global/local motion probability map 415, which takes at its second input global/local probability (GLP) map and forms the main color assisted by motion processing path. Either of the color only processing path or color-assisted by motion processing path is enabled at one time and outputs a segmented region map via the switch controlled by csm flag and either this is the final region segmentation (in case of 2 region segmentation) or the segmented region map may be passed via the switch controlled by crs∥mrs control to CBRS regions splitter (color/motion) stages cascader 416 that may split the non-dominant color region further into additional (e.g., 3 or 4)

regions. The switch at the output controlled by the second crs∥mrs control either outputs a 2 region-layer segmentation mask that bypasses CBRS regions splitter (color/motion) stages cascader 416 or a, for example, 3-5 region-layer final segmentation mask (more layers are possible by increasing the size of the cascade).

Discussion now turns to operations of the previously described modules. Scene change detector 401, P distance reference calculator 402, and frame down sampler 403 are general processing blocks known to those of skill in the art and will not be discussed further for the sake of brevity.

As discussed, one or more texture cues as provided by texture gradients calculator 404 may be used to provide increased spatial and temporal stability to color based segmentation of pictures (frames or fields) such that the resulting segmented regions are spatially and temporally consistent. For example, texture gradients calculator 404 may include two components or operations: determination of a spatial activity measure, RsCs, and a determination of a texture distribution measure or a texture map, T. Both measures RsCs and T are described next.

The first measure (e.g., a spatial activity measure) is picture or frame based activity, RsCs, which may be a combined measure of horizontal and vertical gradients of luma (Y) of a picture calculated on, for example, a 4×4 block basis and averaged over the entire picture. For example, the activity of a block $RsCs_{4 \times 4}$ may be derived from a block-wise average vertical gradient $Rs_{4 \times 4}$ and a block-wise average horizontal gradient $Cs_{4 \times 4}$. Such processing may be performed as follows. For a block[i][j] of size 4×4 pixels represented by pel[0 . . . 3][0 . . . 3], horizontal and vertical gradient square sums over each block may first be determined as shown in Equations (1) and (2).

$$HorGradSqSum4x4[i][j] = \sum_{k=0...3} \sum_{l=0...3} \qquad (1)$$
$$(pel[(i \times b) + k][(j \times b) + l] - pel[(i \times b) + k][(j \times b) + l - 1])^2$$

$$VertGradSqSum4x4[i][j] = \sum_{k=0...3} \sum_{l=0...3} \qquad (2)$$
$$(pel[(i \times b) + k][(j \times b) + l] - pel[(i \times b) + k - 1][(j \times b) + l])^2$$

Next, Rs and Cs may be determined for each block (e.g., block=4) using Equations (3) and (4) as follows.

$$Rs_{4 \times 4}[i][j] = \sqrt{(VertGradSqSum4 \times 4[i][j])/(b \times b)} \qquad (3)$$

$$Cs_{4 \times 4}[i][j] = \sqrt{(HorGradSqSum4 \times 4[i][j])/(b \times b)} \qquad (4)$$

$RsCs_{4 \times 4}$ may then be determined as shown in Equation (5).

$$RsCs_{4 \times 4}[i][j] = \sqrt{(Rs_{4 \times 4}[i][j])^2 + (Cs_{4 \times 4}[i][j])^2} \qquad (5)$$

Furthermore, if RsCs is based on a bigger block size (e.g., a 16×16 size is needed), it may be determined by first determining $Rs_{16 \times 16}$ (which may be determined directly from $Rs_{4 \times 4}$) and $Cs_{16 \times 16}$ (which may be determined directly from $Cs_{4 \times 4}$) and then determining $RsCs_{16 \times 16}$ by squaring each of $Rs_{16 \times 16}$ and $Cs_{16 \times 16}$, adding, and taking the square root.

Furthermore, picture based global activity RsCs may then be computed from global Rs and global Cs. For example, assuming a number of 4×4 blocks in a picture-width is nh and a number of 4×4 blocks in the picture-height is nv, the global R, and global Cs of a picture may be determined as shown in Equations (6) and (7).

$$Rs = \sqrt{\sum_{i=0...nv} \sum_{j=0...nh} HorGradSqSum4x4[i][j] / (b \times b \times nh \times nv)} \qquad (6)$$

$$Cs = \sqrt{\sum_{i=0...nv} \sum_{j=0...nh} (VertGradSqSum4x4[i][j]) / (b \times b \times nh \times nv)} \qquad (7)$$

Picture activity based on global RsCs may then be determined as shown in Equation (8):

$$RsCs = \sqrt{Rs^2 + Cs^2} \qquad (8)$$

A second component of the texture cues may be a spatial texture map T that measures the amount of texture and its distribution in the image or frame. Connected flat-area regions, or in general low texture regions may be of special interest so that they may be excluded from motion analysis where they provide unstable results.

Figure 5:
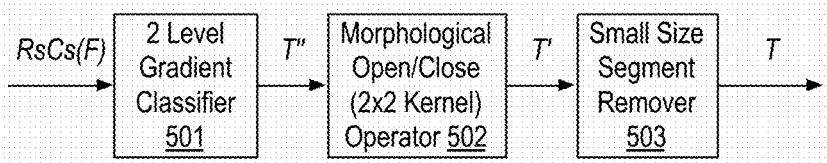
FIG. 5 illustrates a block diagram of an example texture distribution computer.
Figure 5:
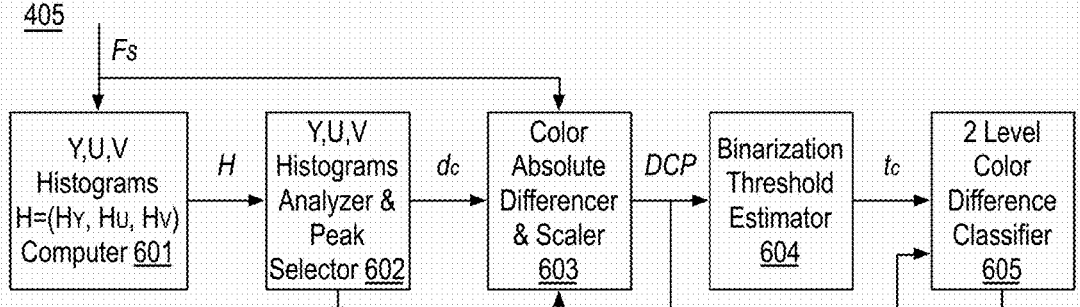

FIG. 5 illustrates a block diagram of an example texture distribution computer 406, arranged in accordance with at least some implementations of the present disclosure. For example, texture distribution computer 406 may determine a texture map T from a two dimensional $RsCs_{4 \times 4}$ array of an image or frame of YUV frames 311 (F). As shown, the RsCs(F) (e.g., $RsCs_{4 \times 4}$) array may first be binarized by 2 level gradient classifier 501 to a two-dimensional T" map. For example, T" map may be generated by providing high texture values to 1 and low texture values to 0 or the like. The two-dimensional T" map may undergo a set of open/close morphological operations by morphological open/close (2×2 kernal) operator 502 to generate a two-dimensional T' map. The two-dimensional T' map may undergo removal of small size segments in small size segments remover 503 processing-block to generate a final 2-dimensional texture map T.

Figure 6:
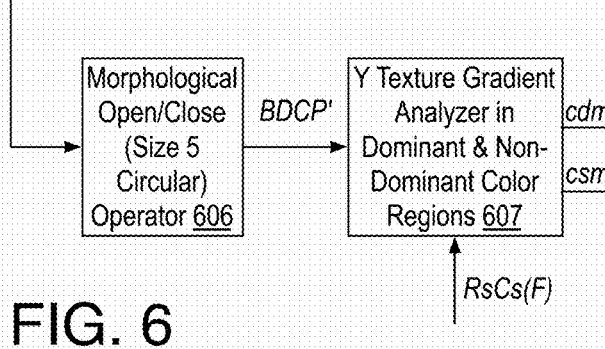
FIG. 6 illustrates a block diagram of an example color analyzer, color distance method and splitting selector.

Discussion now turns to color analysis and color-based splitting determination. FIG. 6 illustrates a block diagram of an example color analyzer, color distance method and splitting selector 405, arranged in accordance with at least some implementations of the present disclosure. For example, color analyzer, color distance method and splitting selector 405 may determine, by color content analysis, the properties and distribution of color, based on which a color separation method (csm), a dominant color differencing method (cdm), and whether color region splitting (crs) can be performed, is selected. As shown in FIG. 6, a downsampled frame may be provided to Y,U,V histograms $H = (H_Y, H_U, H_V)$ computer 601, which may, for each of the Y, U, V components of a subsampled frame Fs, generate individual color histograms ($H_Y$, $H_U$, $H_V$) referred to together as H. The histograms may then form an input to a Y,U,V histograms analyzer and peak selector 602, which may determine the dominant color $d_c$ and a color region splitter flag crs (discussed further herein below). The techniques used for dominant color detection are discussed via example further herein below.

Next, in color absolute differencer and scaler 603, each pixel of the subsampled frame may be differenced with the dominant color and its absolute value may be taken and mapped to an interval 0 to 255 or the like to provide a dominant color probability map (DCP). Based on the dominant color probability map, a threshold for binarization $t_c$ may be determined by binarization threshold estimator 604. The threshold for binarization may be determined using any suitable technique or techniques. As shown, the DCP map and the threshold $t_c$ may be input to 2 level color difference classifier 605, which may binarize the DCP based on threshold $t_c$ and output an initial binarized mask BDCP", which may be input to morphological open/close (size 5 circular) operator 606, which may determine and output a morphologically cleaned up mask BDCP' that forms one input (with the other input being RsCs(F) map) to a Y texture gradient analyzer in dominant and non-dominant color regions generator 607 that may determine and output the determined values of csm and cdm flags.

For example, there may be two choices for csm. If csm=0, the global/local motion probability map, GLP, will be used to enhance segmentation quality. On the other hand, if csm=1, then GLP is not used (e.g., as in low detail blocks motion vectors are random resulting in unstable/less-useful map) to enhance segmentation quality. To determine the value to set for the csm flag, as discussed, on a downsampled frame the dominant color value, the dominant color map, and the RsCs map are determined. If the dominant color area is classified based on RsCs as low-detail, csm is set to 1, else it is set to 0.

Similarly, there may be two choices for cdm. If cdm=0, color differencing with normal weight will be used. On the other hand, if cdm=1, then color differencing method with lower weights is used. To determine the value to set for cdm flag, as discussed, on a downsampled frame, the dominant color value, the dominant color map, and the RsCs map are determined. If the dominant color area is classified based on RsCs as non-low-detail, cdm is set to 1, else it is set to 0.

Similarly, there are two choices for crs. If crs=1, color based region splitting is to be done. On the other hand, if crs=0, then no color based region splitting is done. To determine the value to set for the crs flag, the color histogram generated by Y,U,V histograms H=($H_Y$, $H_U$, $H_V$) computer 601 may be analyzed by Y,U,V histograms analyzer and peak selector 602 for additional dominant color peaks. If additional dominant color peaks are found, crs is set to 1, otherwise crs is to 0.

Figure 7A:
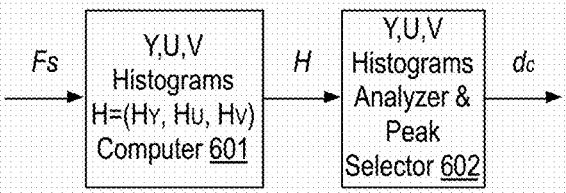
FIG. 7A illustrates a block diagram of an example Y,U,V histograms $H=(H_Y, H_U, H_V)$ computer and an example Y,U,V histograms analyzer and peak selector.

Discussion now turns to the subset of the block diagram of FIG. 6 that is involved in dominant color determination. FIG. 7A illustrates a block diagram of an example Y,U,V histograms H=($H_Y$, $H_U$, $H_V$) computer 601 and an example Y,U,V histograms analyzer and peak selector 602, arranged in accordance with at least some implementations of the present disclosure.

First, Y,U,V histograms H=($H_Y$, $H_U$, $H_V$) computer 601 may generate three histograms, one for each channel of the subsampled YUV 4:4:4 frame. Next, Y,U,V histograms analyzer and peak selector 602 may determine the highest peak (e.g., the most frequently occurring value) of the histograms for each of the Y, U and V channel. This YUV combination color of the peak is determined to be the dominant color, $d_c$.

Figure 7B:
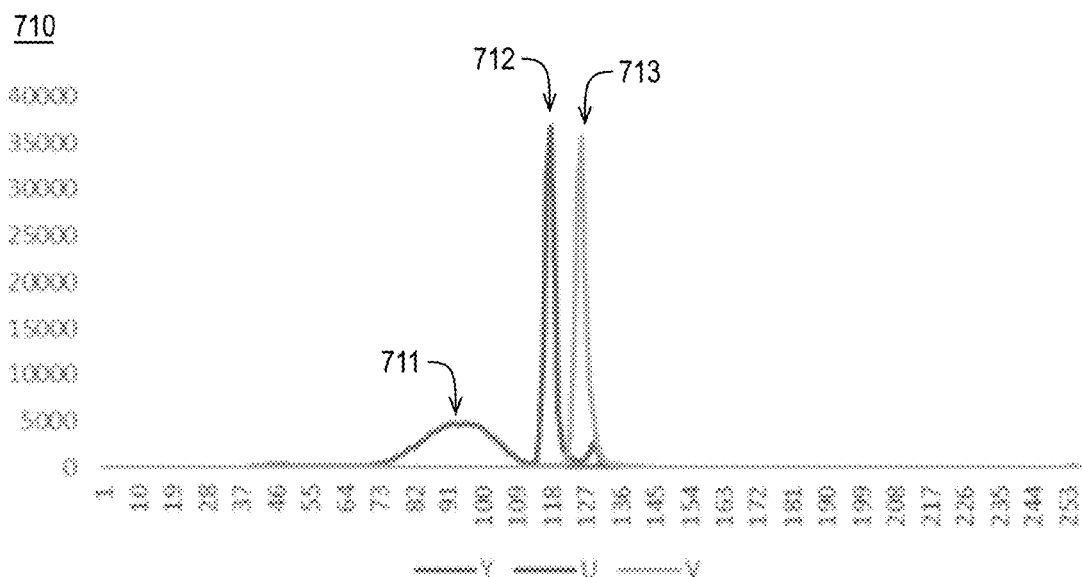
FIGS. 7B and 7C illustrate example $H_Y$, $H_U$, $H_V$ histograms.
Figure 7C:
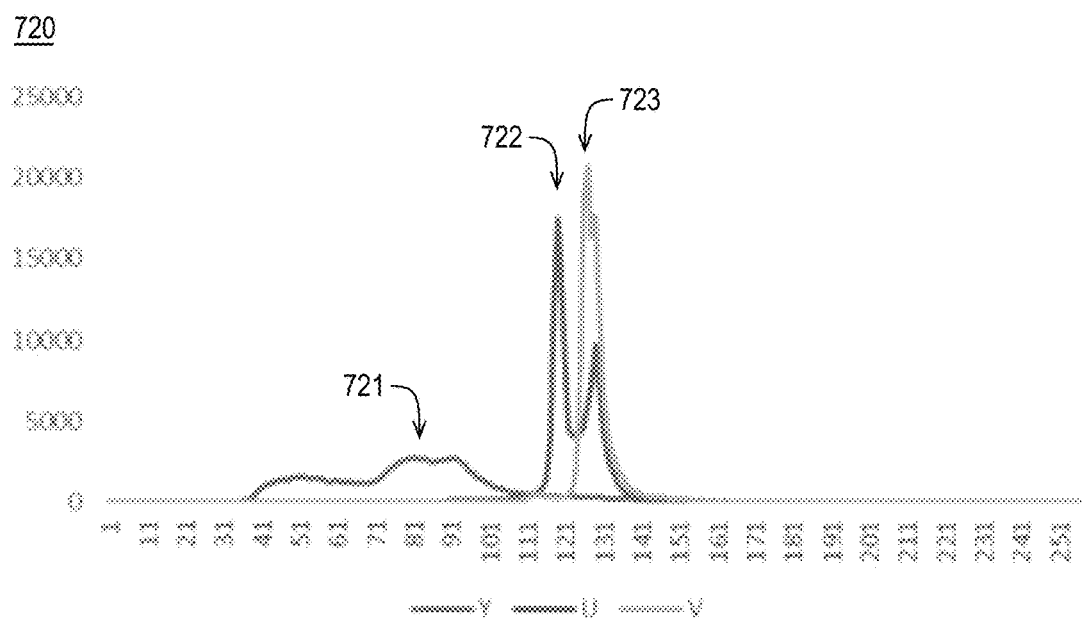

FIGS. 7B and 7C illustrate example $H_Y$, $H_U$, $H_V$ histograms, arranged in accordance with at least some implementations of the present disclosure. For example, FIGS. 7B and 7C illustrate an example $H_Y$, $H_U$, $H_V$ histogram 710 determined based on example YUV 4:4:4 frames of 1080p sequence Touchdown Pass and an example $H_Y$, $H_U$, $H_V$ histogram 720 based on example YUV 4:4:4 frames of 1080p sequence Rush Field Cuts. As shown, $H_Y$, $H_U$, $H_V$ histogram 710 may have a Y peak 711 at 92, a U peak 712 at 117, and a V peak 713 at 125 to provide a dominant color $d_c$ of (92, 117, 125). Similarly, $H_Y$, $H_U$, $H_V$ histogram 720 may have a Y peak 721 at 91, a U peak 722 at 118, and a V peak 723 at 126 to provide a dominant color $d_c$ of (91, 118, 126).

Discussion now turns to the determination of a probability map for a particular dominant color determined as discussed above. For example, the dominant color probability map may be determined at the resolution of an input frame of YUV frames 311 (F). In some embodiments, to keep complexity low, a subsampled frame Fs may be used for the determination of the dominant color probability map so the dominant color probability map is computed at Fs resolution which may be, for example, a 4:1 downsampled version of the frame of YUV frames 311 (F) in each dimension.

Figure 8:
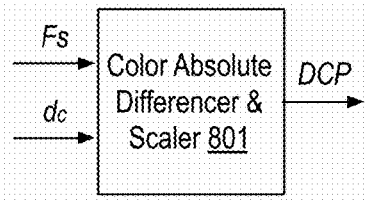
FIG. 8 illustrates a block diagram of an example dominant color probability map computer.

FIG. 8 illustrates a block diagram of an example dominant color probability map computer 413, arranged in accordance with at least some implementations of the present disclosure. As shown, dominant color probability map computer 413 may include a color absolute differencer and scaler 801. For example, to determine a dominant color probability map DCP, the difference between the most dominant color $d_c$ and the actual (subsampled) frame may be determined using the dominant color differencing method according to the signal cdm. For example, if cdm is set to 0, the differencing technique shown in Equation (9) is used to determine the difference D between a color value (y, u, v) and dominant color (yd, ud, vd):

$$D = \frac{\text{ABS}(y - yd)}{Ls} + \text{ABS}(u - ud) + \text{ABS}(v - vd) \quad (9)$$

such that ABS denotes the absolute value function, and Ls denotes luma scaling factor which may be determined as shown in Equation (10).

$$Ls = \begin{cases} 1 & \text{if } y < 20, \\ 2 & \text{if } 20 \le y < 40, \\ 8 & \text{if } 40 \le y < 250, \\ 4 & \text{if } y \ge 250. \end{cases} \quad (10)$$

On the other hand, if cdm is set to 1, the differencing method used to determine the difference D between a color value (y, u, v) and dominant color (yd, ud, vd) may assign a low weight to luma as shown in Equation (11) such that the luma channel is weighted with a lower weight than the chroma channels as shown.

$$D = \frac{\text{ABS}(y - yd)}{64} + \frac{\text{ABS}(u - ud)}{4} + \text{ABS}(v - vd). \quad (11)$$

Once the differences are determined for all pixels in the subsampled YUV444 frame, the dominant color probability map, DCP, may be set to these differences such that difference value of 0 corresponds to 100% probability of a dominant color, while difference value of 255 corresponds to 0% probability of a dominant color.

Figure 9A:
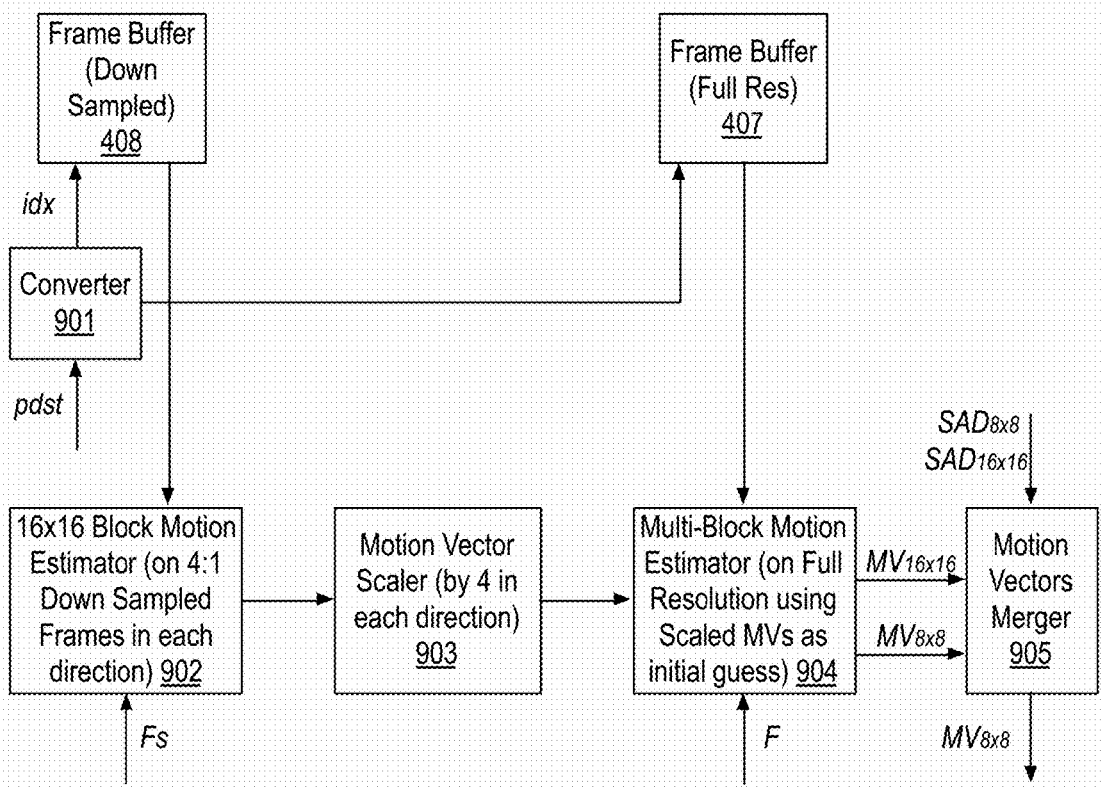
FIG. 9A illustrates a block diagram of an example local motion estimator and motion vectors (MV) refiner.

Discussion now turns to motion cues including local motion estimation. FIG. 9A illustrates a block diagram of an example local motion estimator and motion vectors (MV) refiner 409, arranged in accordance with at least some implementations of the present disclosure. As shown, a downsampled current frame Fs may be input to 16×16 block motion estimator 902, the other input to which is a previous frame (e.g., given by index idx based on the pdst value as provided by converter 901) of the same size from frame buffer (of down sampled frames) 408. 16×16 block motion estimator 902 determines 16×16 block motion vectors and outputs them to motion vector scaler 903 that scales the motion vectors by 4 in each direction such that they are applicable to a full resolution frame.

Next, as shown in FIG. 9A, the upscaled motion vectors as well as the full size current frame and a previous full size frame (e.g., given by index idx, based on pdst value as provided by converter 901) are input to multi-block motion estimator 904 that uses a full resolution video frame F and takes motion vectors output by 16×16 block motion estimator 902 as initial guesses in a hierarchical motion estimation that computes a smooth 16×16 motion vector field ($MV_{16\times16}$) and a smooth 8×8 motion vector field ($MV_{8\times8}$). The two smooth motion vector fields are then input to a motion vectors merger 905 that, based on rate-distortion or error, chooses either the 16×16 motion vectors or the 8×8 motion vectors. Such processing may increase further the stability of the motion vector field by merging, resulting in an even more stable single motion field that provides 8×8 block accuracy at object/region boundaries.

FIG. 9B illustrates an example of merging motion vector fields, arranged in accordance with at least some implementations of the present disclosure. For example, FIG. 9B illustrates an example of merging of motion vector fields to generate a merged 8×8 block motion vectors field ($MMV_{8\times8}$) for a frame of the Touchdown 1080p sequence such that (i) illustrates a current frame 911 for which motion vectors are determined with respect to a previous frame (not shown), (ii) illustrates a 16×16 block motion vector field 912, (iii) illustrates a noisy 8×8 block motion vector field 913, and (iv) illustrates a reduced-noise merged 8×8 block motion vector field 914 generated by merging as discussed herein. FIG. 9B (iii) shows the principle of merging 16×16 and more noisy 8×8 MV fields to create a more stable motion vector field 912.

FIG. 9C illustrates an example of merging motion vector fields, arranged in accordance with at least some implementations of the present disclosure. For example, FIG. 9C illustrates an example of merging of motion vector fields to generate a merged 8×8 block motion vectors field ($MMV_{8\times8}$) for the ParkJoy 1080p sequence such that (i) illustrates a current frame 921 for motion estimation, (ii) illustrates a one-stage motion vector field 922 generated by generating individual 16×16 and 8×8 motion vector fields and merging, (iii) illustrates a low resolution motion vector field 923 generated by a first stage of a two stage motion vector field generation, (iv) illustrates an upsampled low resolution motion vector field 924 used as prediction for a second stage, and (v) illustrates a final merged 8×8 accurate motion field 925 that uses upsampled motion vectors for prediction for a second stage. FIG. 9C (iii) shows an example of a low resolution first stage motion vector field. FIG. 9C (iv) shows an upsampled motion vector field. FIG. 9C (v) shows merged 16×16 and 8×8 motion vector fields.

Figure 10A:
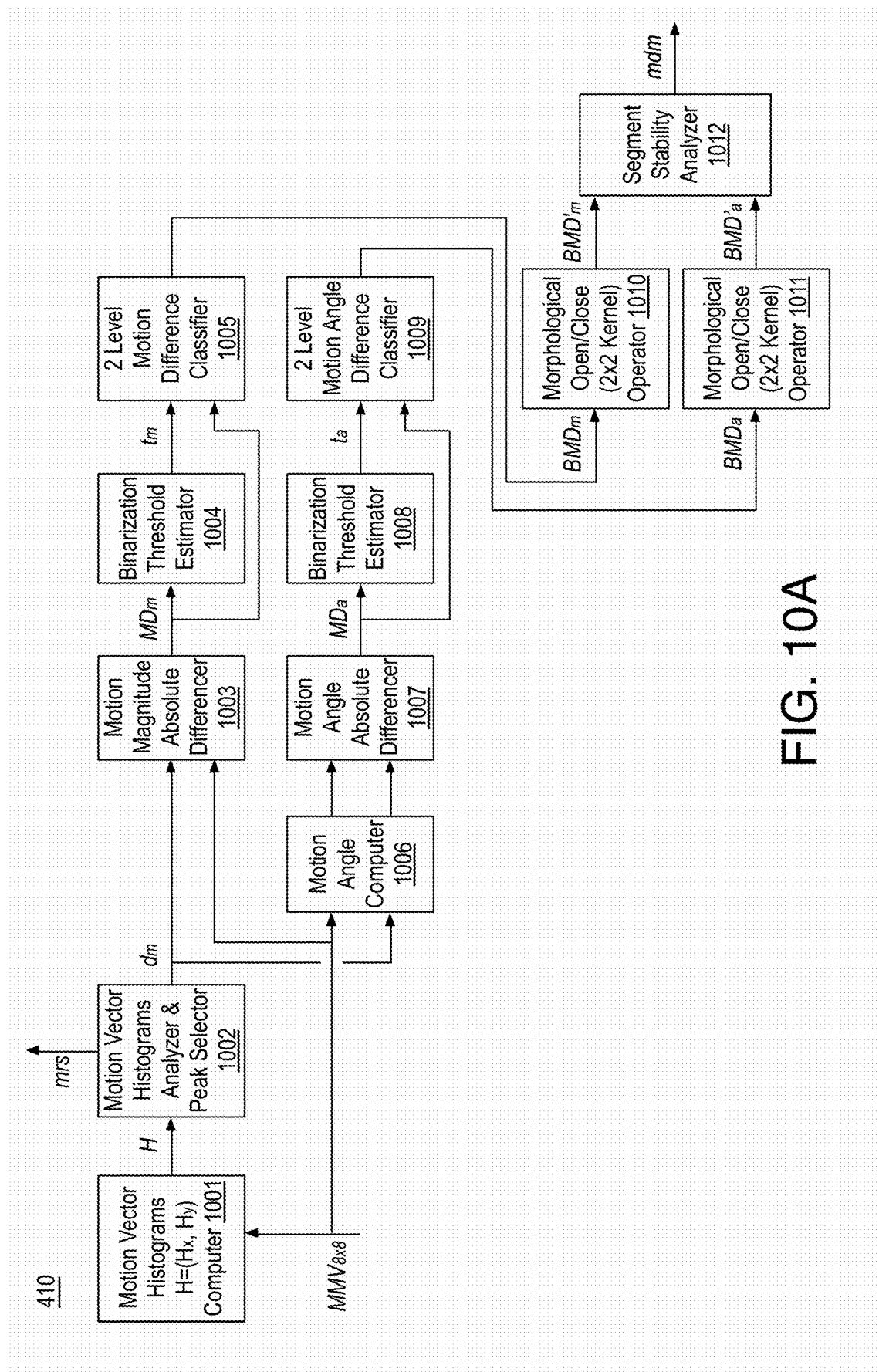
FIG. 10A illustrates a block diagram of an example motion analyzer, motion distance method and splitting selector.

Discussion now turns to motion analysis, motion distance method and splitting selection. FIG. 10A illustrates a block diagram of an example motion analyzer, motion distance method and splitting selector 410, arranged in accordance with at least some implementations of the present disclosure. As shown in FIG. 10A, an 8×8 merged motion vectors ($MMV_{8\times8}$) field is input to motion vectors histograms $H=(H_x, H_y)$ computer 1001 that may determine a histogram of each of x and y components of the motion vectors. The histogram is input to motion vector histograms analyzer and peak selector 1002 that may analyze the histograms to determine peaks of the x and y components of the motion vectors. Motion vector histograms analyzer and peak selector 1002 may output a value of a control signal mrs to control if motion based region splitting should be employed and a majority motion vector, $d_m$. Each 8×8 MV of the motion vector field and the majority motion vector $d_m$ are input to motion magnitude absolute differencer 1003 and to motion angle computer 1006.

Motion magnitude absolute differencer 1003 determines the absolute value of the difference between motion vectors at its two inputs. For example, a difference between a motion vector at each location in the motion vector field and the majority motion vector $d_m$ may be determined resulting in a motion vector absolute difference field $MD_m$.

Motion angle computer 1006 may determine the respective angle between motion vectors at its input, and the computed angles are input to motion angle absolute differencer 1007, which may determine a motion vector angle absolute difference field $MD_a$ in analogy to the generation of $MD_m$. For each of the $MD_m$ and MDa fields, a respective binarization threshold $t_m$ and $t_a$ is determined by binarization threshold estimators 1004, 1008 and used by respective binarizers: 2 level motion difference classifier 1005 and 2 level motion angle difference classifier 1009. 2 level motion difference classifier 1005 outputs a binary mask $BMD_m$ and 2 level motion angle difference classifier 1009 outputs a binary mask $BMD_a$.

Each of the 2 masks may then undergo morphological cleanup in respective morphological operators such as morphological open/close (2×2 kernel) operators 1010, 1011, which respectively output $BMD'_m$ and $BMD'_a$. Next, $BMD'_m$ and $BMD'_a$ are input to segment stability analyzer 1012 that may determine which approach (e.g., motion magnitude or motion angle based) will result in stable results and sets value of motion differencing method mdm accordingly. For example, if motion angle based method is preferred mdm is set to 1, otherwise mdm is set to 0.

Figure 10B:
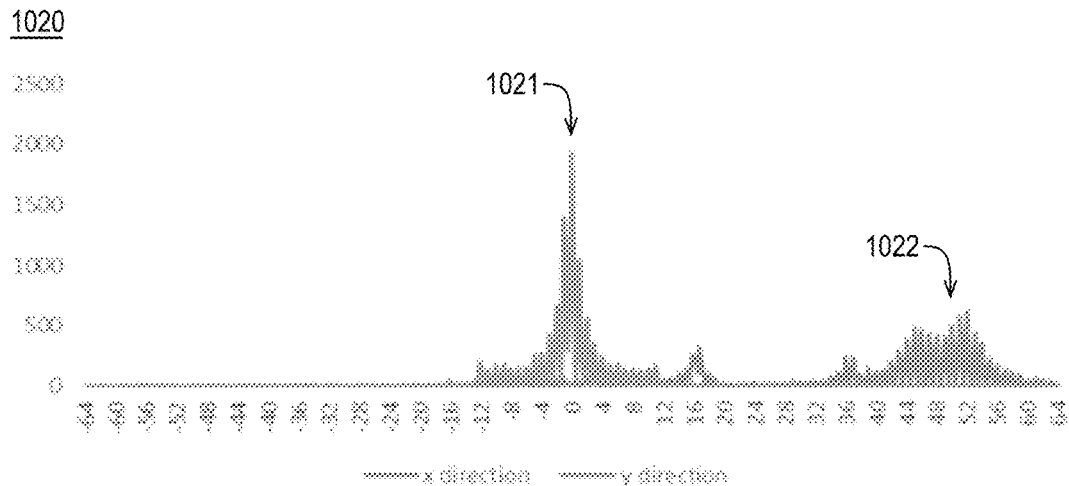
FIG. 10B illustrates an example motion vector histogram.

FIG. 10B illustrates an example motion vector histogram, arranged in accordance with at least some implementations of the present disclosure. For example, FIG. 10B illustrates an example generation of motion vector peaks for x and y components of vectors for the Park Joy sequence. As shown, example motion vector histogram 1020 includes an x component or direction peak 1022 and a y component or direction peak 1021. In the illustrated example, x direction peak 1022 provides a majority x component of the vector at 52 and y direction peak 1021 provides a majority y component of the vector at 0. In such an example, the majority vector or dominant motion vector dm is determined to be (52, 0).

Discussion now turns to motion estimation including global motion estimation. Block based translational motion model regardless of block sizes, how smooth the motion field is or which references are used for motion computation, is based on an underlying assumption of translatory motion which is not always true and thus the block based translational motion model can be inaccurate. In some examples, more appropriate models for more complex scenes can be derived based on the overall global movement of the camera such as its pitch, yaw and roll.

For example, global motion may be modeled for a scene using any suitable technique such as an affine model based technique, a perspective model based technique, or the like. For example, an affine model may use 6 parameters and may address a large range of motion including translation/pan, zoom, shearing, and rotation. A perspective model may, in addition to pan, zoom, shearing, and rotation, may also model changes in perspective. In some embodiments, it may be advantageous to apply an affine based model with increased simplification/reduction of its complexity to region segmentation.

In some embodiments, an affine transformation process may be described by Equations (12) and (13), which use affine parameters a, b, c, d, e, f to map each point (x,y) in a previous or reference picture to a modified point (x', y').

$$x_i' = a \cdot x_i + b \cdot y_i + c \tag{12}$$

$$y_i' = d \cdot x_i + e \cdot y_i + f \tag{13}$$

In some embodiments, the affine parameter coefficients may be provided at double floating point representation for full precision. Furthermore, the points after motion compensation (i.e., (x'y')) may be at non-integer locations and determination of the displaced picture may include interpolation. In some embodiments, to reduce complexity, global motion parameters may be converted to fixed-point integer form and optionally kept at lower precision.

Figure 11A:
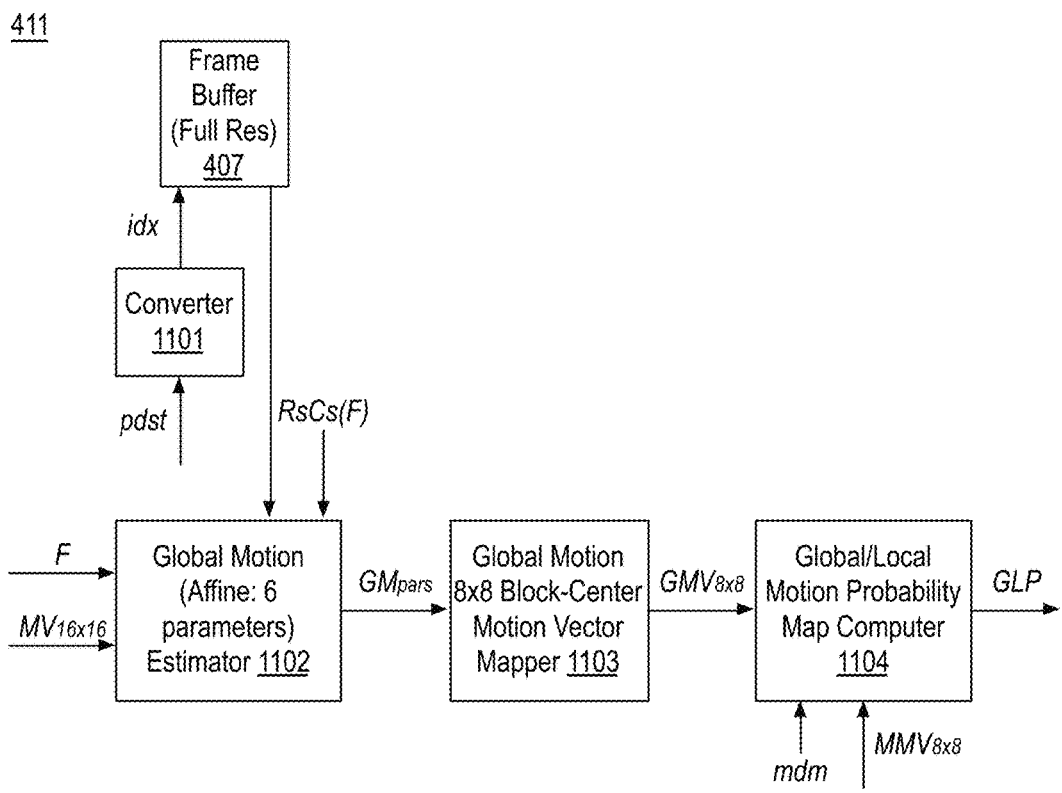
FIG. 11A illustrates a block diagram of an example global motion estimator and global/local motion probability map computer.

FIG. 11A illustrates a block diagram of an example global motion estimator and global/local motion probability map computer 411, arranged in accordance with at least some implementations of the present disclosure. As shown, global motion estimator and global/local motion probability map computer 411 may include a converter 1101, a global motion estimator 1102, a global motion to 8×8 block-center motion mapper 1103, and a global/local motion probability map computer 1104.

In some embodiments, global motion estimator 1102 may determine the global motion 6-parameter affine model using the previously computed motion field ($MV_{16\times16}$) and using the previously determined (flat/low detail) texture map. For example, global motion estimator 1102 may implement the following techniques to efficiently determine the best affine 6-parameter set.

First, the affine 6-parameter model may be estimate iteratively by setting len=wb*hb where wb is block-accurate frame width and hb is block accurate frame height (e.g., for a 1080p frame, wb=1920/16=120, hb=1088/16=68=>len=8160), for i=0 to (3*len)−1 performing the following: pick 3 random block positions from non flat area (as per input flat area map), estimate local 6-parameters using 3 vectors at the selected positions, add to histograms (one 1D histogram for each of 6 params), and for each histogram, get 0-2 peaks and collect all combinations (e.g., a total number of 6-parameter candidates ranges from min=0 to max=64). Then, the prediction candidates (adds prediction candidates from past 6-parameters) may be added by adding a winning 6-parameter set from the previous frame as a candidate to the current candidate set. Next, a winner may be selected from the candidate set by: for each candidate, determining the estimated error by creating a compensated frame from the candidate affine parameter set and getting the SAD between the compensated frame and the original frame, and choosing a candidate with a smallest SAD error. Then, a fast estimate of the global/local binary mask may be created by: determining a global MV (gMV) for each 16×16 block using the winning parameter set, determining sum=ABS(gMV.x−MV.x)+ABS(gMV.y−MV.y) such that ABS is absolute value and MV is the collocated motion vector in the current frame's motion field, and, if sum is less than a preset threshold, then setting the global/local mask at the current block to 1, otherwise setting it to 0 (i.e. 1=global moving block, 0=local moving block). Next, one 6-parameter set may be estimated using the estimated global/local binary mask by collecting motion vectors only of global moving blocks and applying a 6-parameter formula to determine the estimate (using determinant-based affine formula). Then, the SAD error may be determined for the local 6-parameter set. Finally the local 6-parameter set's SAD error may be compared to the SAD error of the winning candidate and the final best candidate may be chosen.

As shown, global motion to 8×8 block-center motion mapper 1103 may receive the best affine parameter set and global motion to 8×8 block-center motion mapper 1103 may use the parameter set to generate a global motion field by applying the affine parameters to a center-pixel of each 8×8 block.

Next, the motion probability may or global/local probability map may be generated. For example, global/local motion probability map computer 1104 may receive the global motion vector field ($GMV_{8\times8}$) and global/local motion probability map computer 1104 may generate a difference map between the global motion field and the actual (local) motion field using a differencing method indicated by the mdm value.

For example, if mdm is set to 0, the difference between the global and local motion vector fields may be determined based on the following differencing method. For example, the difference $D_m$ between a motion vector (x, y) and corresponding global motion vector (xg, yg) may be determined as follows in Equation (14).

$$Dm = ABS(x-xg) + ABS(y-yg) \tag{14}$$

For example, the differencing method of in Equation (14) may emphasize the difference in magnitude between the two motion vectors.

However if mdm is set to 1, the difference between the global and local motion vector fields may be determined based on a differencing method that emphasizes the angular difference of the two motion vectors is used. For example, the difference Dm between a motion vector (x, y) and corresponding global motion vector (xg, yg) may be determined as follows in Equation (15).

$$Dm = MIN(255, d1+d2), \tag{15}$$

In Equation (15), d1 and d2 may be determined as follows in Equations (16) and (17).

$$d1 = MIN(ABS(a-ag), MIN(ABS(a-ag-360), ABS(a-ag+360))), \tag{16}$$

$$d2 = \frac{ABS(r-rg)}{3}, \tag{17}$$

In Equations (16) and (17), (r, a) and (rg, ag) are polar coordinates of the corresponding Cartesian motion vectors (x, y) and (xg, yg).

Once the differences are determined for the motion vectors, the global/local motion probability map, GLP, may be set to or mapped to the determined differences such that 0 represents a 100% probability of pixel being in the global moving or global motion area and 255 represents a 0% probability of pixel being in the global moving or global motion area (i.e., it is a 100% probability of being in a local moving area).

Figure 11B:
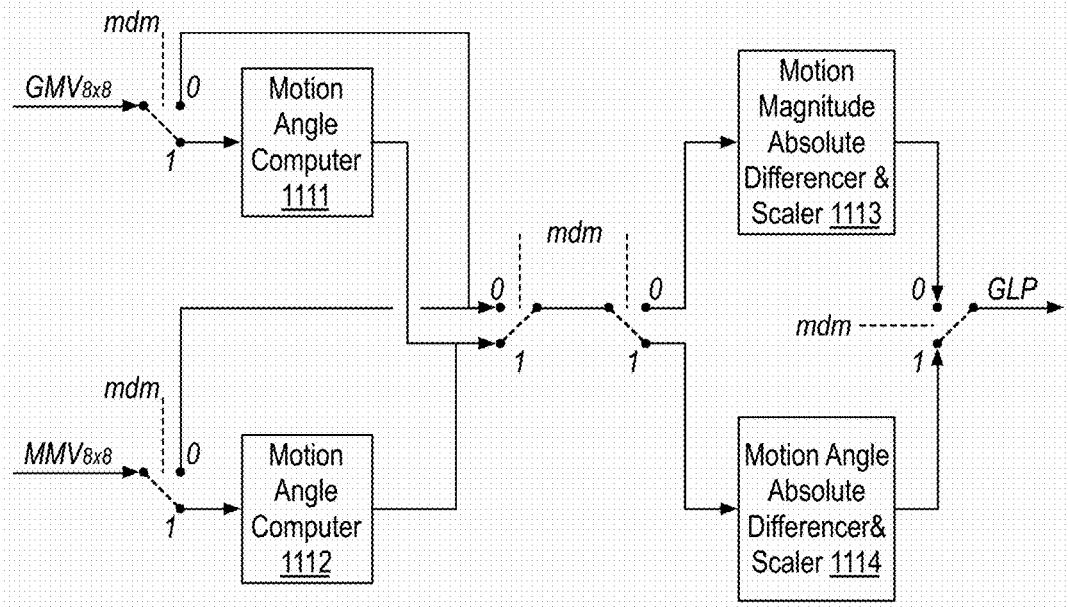
FIG. 11B illustrates a block diagram for the determination of a global/local probability map.

FIG. 11B illustrates a block diagram for the determination of a global/local probability map, arranged in accordance with at least some implementations of the present disclosure. For example, FIG. 11B illustrates an implementation of the discussed approaches in the form of a block diagram of an example global/local motion probability map computer 1104. As shown, global/local motion probability map computer 1104 may receive as input the merged 8×8 motion vectors $MMV_{8\times8}$ and the global motion vectors mapped to 8×8 block center ($GMV_{8\times8}$) and global/local motion probability map computer 1104 may generate a global motion probability map, GLP.

For example, depending on the value of mdm, which controls the two input switches, $GMV_{8\times8}$ and $MMV_{8\times8}$ are used either in the form of magnitude (when mdm=0 and motion angle computers 1111, 1112 are bypassed) or in the form of angle (when mdm=1 and motion angle computers 1111, 1112 are utilized). $GMV_{8\times8}$ and $MMV_{8\times8}$ are also routed through a second pair and a third pair of switches to either motion magnitude absolute differencer and scaler 1113 or to motion angle absolute differencer and scaler 1114, which then determine the absolute difference at its input (e.g., as discussed above) and scales the resultant differences to the 0 to 255 range to generate the global/local motion probability map (GLP) that is then output via another switch controlled by the mdm value.

Discussion now turns to color based region segmentation (CBRS). That is, discussion now turns to the functionality of a color based region segmenter that may be implemented such that, depending on the scene, either color only or color assisted by motion may be used to segment each frame of the scene into two spatially coherent and temporally consistent regions.

Figure 12A:
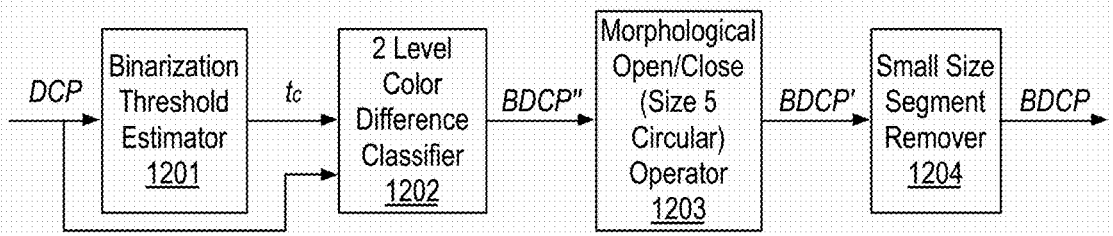
FIG. 12A illustrates a block diagram of an example CBRS 2 regions generator using dominant color probability map only.

First, segmentation of frames of a scene into two regions based on dominant color only is discussed. The processing for main segmentation based on dominant color may be characterized as color based region segmentation (CBRS). FIG. 12A illustrates a block diagram of an example CBRS 2 regions generator using dominant color probability map only 414, arranged in accordance with at least some implementations of the present disclosure. As shown, the dominant color probability map DCP may be input to a binarization threshold estimator 1201 that may determine a binarization threshold $t_c$. The, binarization threshold may be applied to the DCP map in 2 level color difference classifier 1202 to provide a binarized map referred to as BDCP". The BDCP" map may then be cleaned up via morphological processing with a kernel of size 2×2 by morphological open/close (2×2 kernel) operator 1203 to provide an improved map characterized as BDCP'. The improved binarized color probability map may then undergo segmentation noise removal in small size segment remover 1204 to provide a final cleaned up binary DCP map characterized as BDCP mask (e.g., as shown in FIG. 4).

Figure 12B:
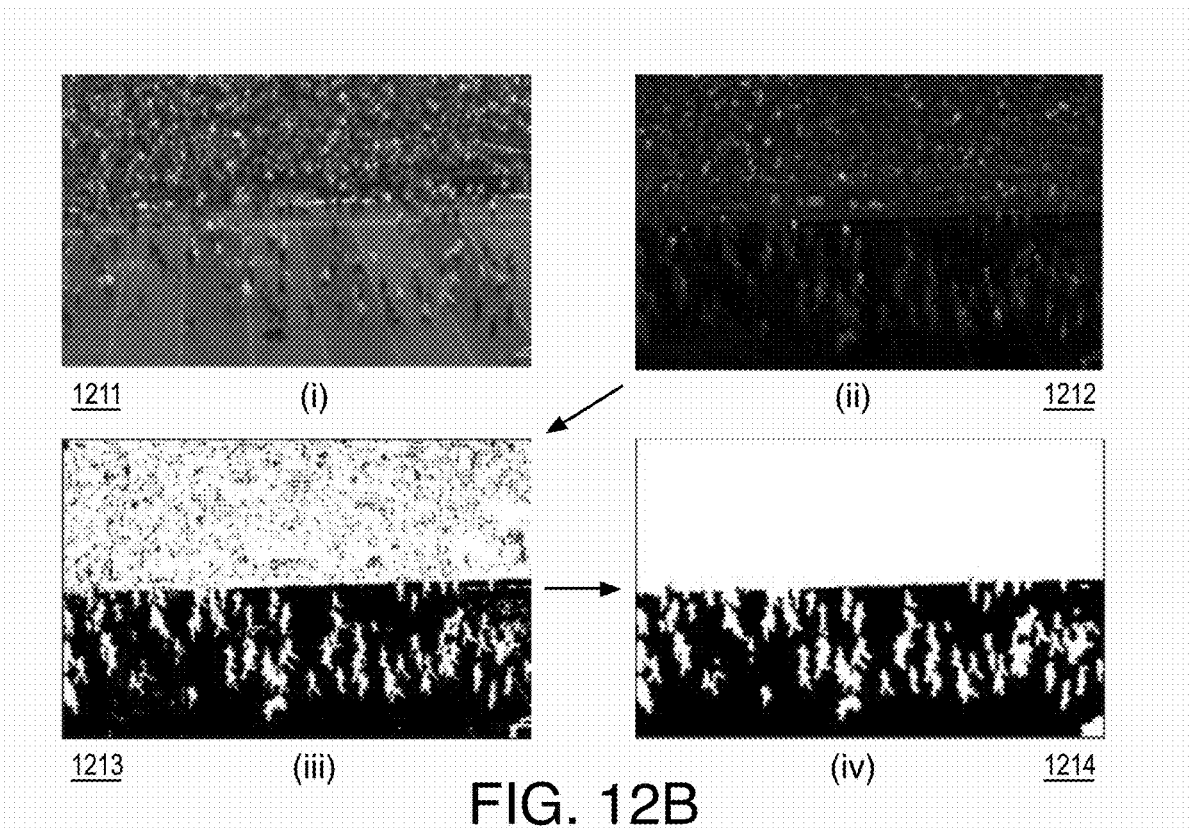
FIG. 12B illustrates example processing results based on dominant color only segmenting techniques.

FIG. 12B illustrates example processing results based on the above described dominant color only segmenting techniques, arranged in accordance with at least some implementations of the present disclosure. For example, the process described above is visually illustrated in FIG. 12B. FIG. 12B(ii) illustrates an example DCP map (dominant color probability map) 1212 (e.g., FIG. 12B(ii) shows an image or frame illustrating a DCP map) for the scene illustrated in FIG. 12B(i) by original frame 1211. The initial binarization of DCP map 1212 is shown the resulting BDCP" map 1213 (binarized dominant color probability map) of FIG. 12B(iii) that illustrates substantial noise pixels and short broken leftover pixel segments, which are then subject to the processing steps of morphological open/close operations and small size segment removal resulting in the cleaned up final binary mask BDCP map 1214 (binarized dominant color probability map) as shown in FIG. 12B(iv). For example, BDCP map 1214 illustrates an example final segmentation (e.g., it identifies which pixels of the original frame belong to which of two region-layers).

Figure 13A:
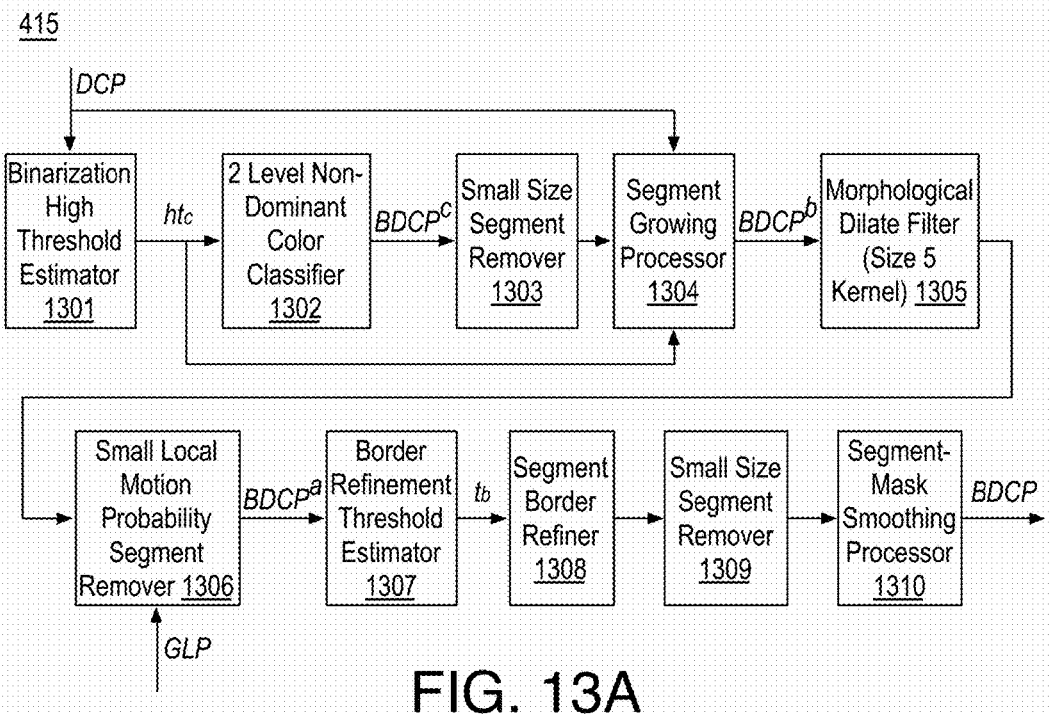
FIG. 13A illustrates a block diagram of an example CBRS 2 regions generator using dominant color probability map assisted by global/local motion probability map.

Discussion now turns to segmentation of a frame of a scene into two regions based on dominant color assisted by motion. FIG. 13A illustrates a block diagram of an example CBRS 2 regions generator using dominant color probability map assisted by global/local motion probability map 415, arranged in accordance with at least some implementations of the present disclosure. As shown, the dominant color probability map DCP may be input to a binarization high threshold estimator 1301 that determines a binarization high threshold $ht_c$ which, when applied to the dominant color probability map in 2 level non-dominant color classifier 1302 results in a binarized map $BDCP^c$. The $BDCP^c$ map may then be cleaned up via small size binary segments removal in a small size segments remover 1303. The output of small size segments remover 1303 may be processed for improved connectedness by a segment growing processor 1304, which also takes as input the high threshold determined by binarization high threshold estimator 1301 to generate a binarized map $BDCP^b$.

The binarized may be morphologically processed by dilation in a morphological dilate filter (size 5 kernel) 1305, the output of which may be input, along with the global/local motion probability map GLP to a small local motion probability segment remover 1306 for cleaning up by removing isolated segments, the output of which is a binarized map $BDCP^a$. The binarized map $BDCP^a$ may be input for estimation of a border refinement threshold by a border refinement threshold estimator 1307, which generates and outputs a threshold $t_b$ used for refining the border of region segments by a segment border refiner 1308. The output of segment border refiner 1308 may undergoes segmentation noise removal in a small size segment remover 1309, the output of which undergoes smoothing of the mask in a segment mask smoothing processor 1310 resulting at the output in the final binary DCP mask, the BDCP map as discussed herein.

Figure 13B:
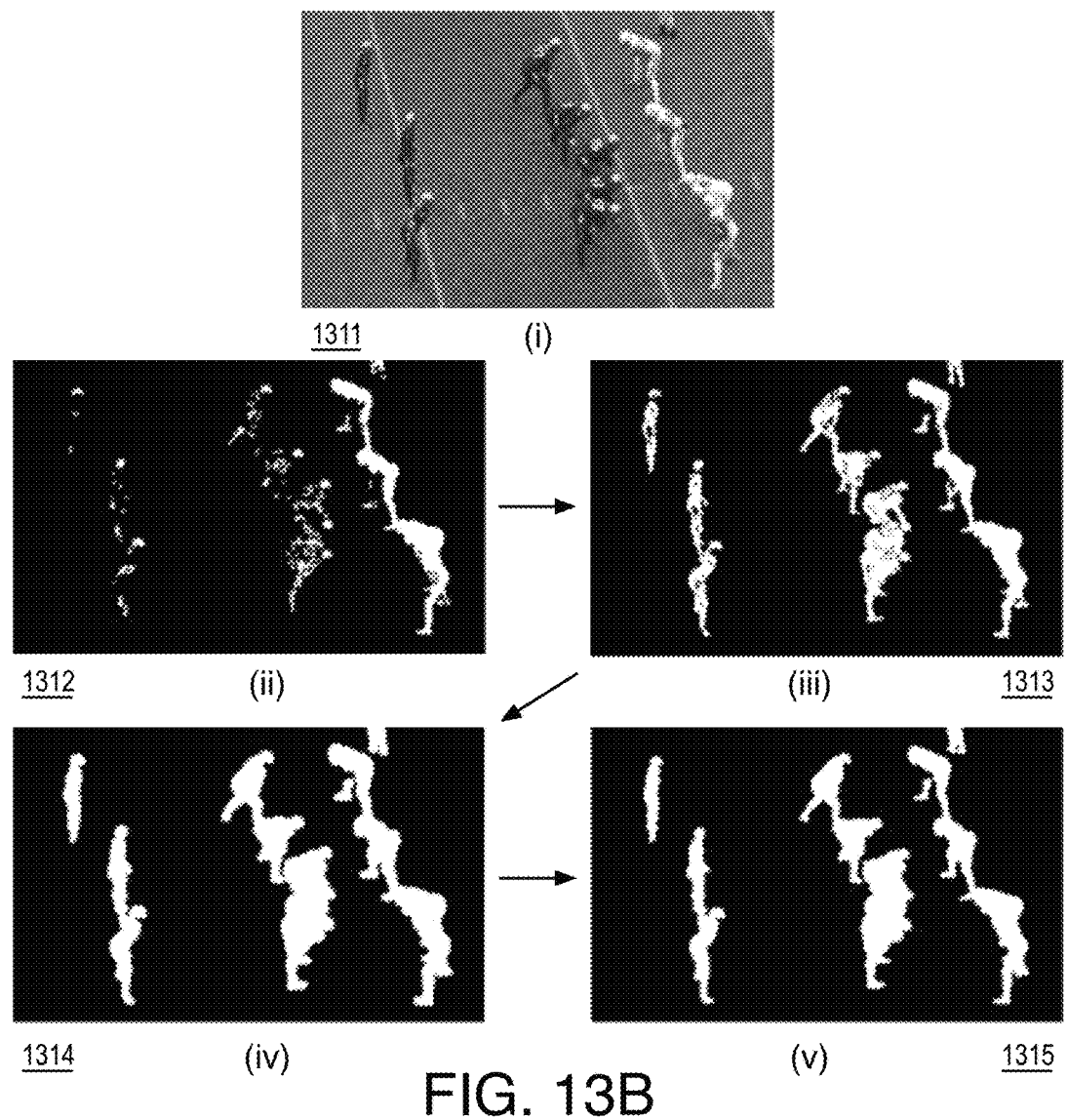
FIG. 13B illustrates example processing results based on dominant color assisted by motion segmenting techniques.

FIG. 13B illustrates example processing results based on the above described dominant color assisted by motion segmenting techniques, arranged in accordance with at least some implementations of the present disclosure. For example, the process described above is visually illustrated in FIG. 13B. FIG. 13B(ii) illustrates an example 2 level binarization map (based on using a high threshold) $BDCP^c$ 1312 for a frame 1311 of the Touch Down scene as shown in FIG. 13B(i). Following this initial binarization, disconnected small segments may be removed and connected broken segments may be filled-in using the segment growing process discussed above resulting in an updated map $BDCP^b$ 1313 as illustrated in FIG. 13B(iii). Next, updated map $BDCP^b$ 1313 may be cleaned up by morphological dilation using a size 5 kernel and small local motion probability segments removal to provide a in cleaned up mask $BDCP^a$ 1314 as illustrated in FIG. 13B(iv). Such processing may be followed by determining a border refinement threshold and performing refinement of the border, small isolated binary segments removal and smoothing of the segment mask to generate a final segmentation mask BDCP 1315 as shown in FIG. 13B(v) that identifies which pixels of the original frame belong to the 2 possible region-layers.

Discussion now turns to extending the core functionality of the color based (or color assisted by motion) region segmenter from segmentation of two regions to segmentation of many regions such that the segmented regions are not only spatially consistent but are also temporally coherent (e.g., CBRS segmentation into multiple regions by a region splitting stages cascader). For the purpose of example, the discussion provides for extending the 2 region segmentation to (up to) 5 region-layers, depending on the scene. However, a frame may be segmented into any number of region-layers.

Figure 14A:
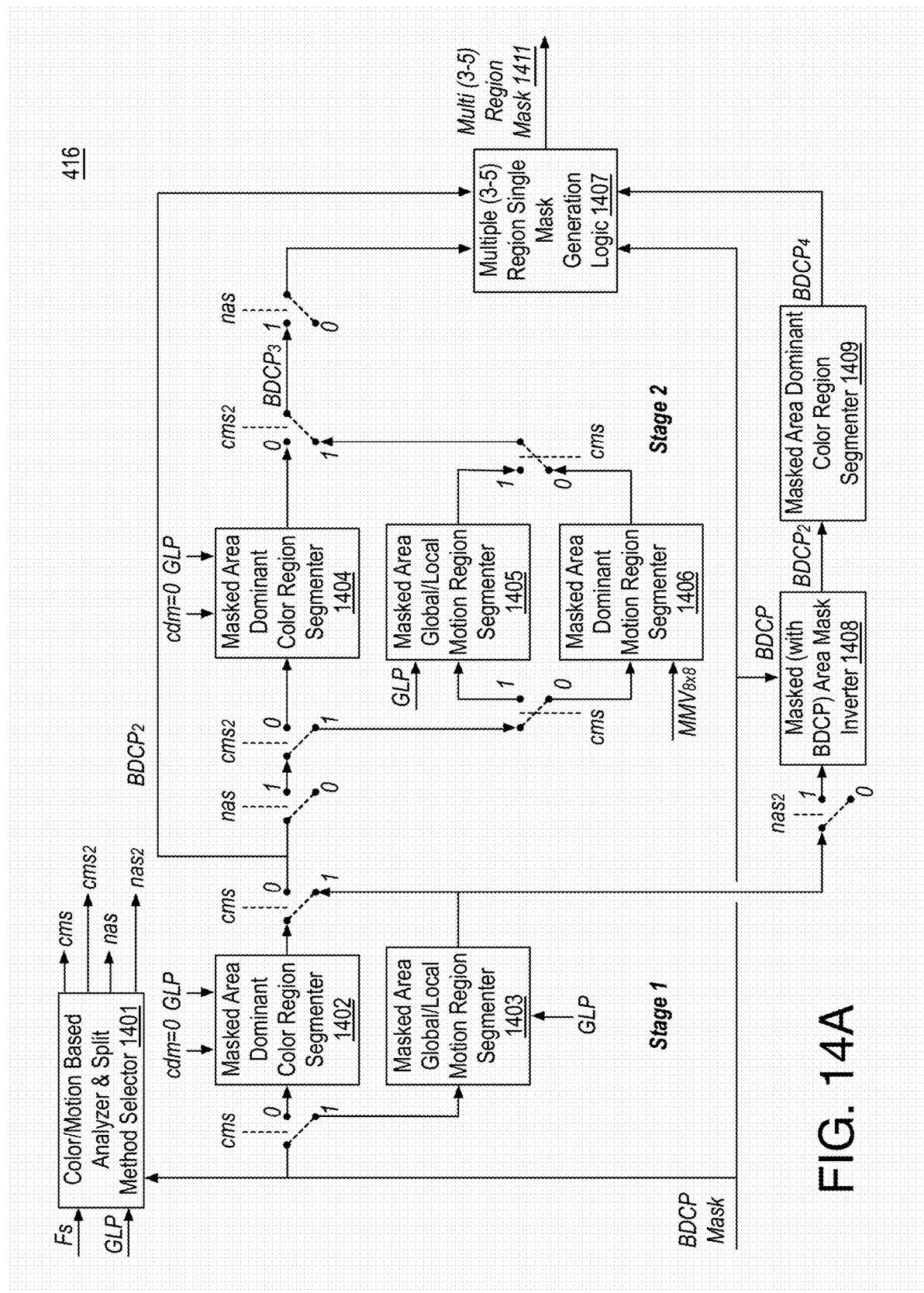
FIG. 14A illustrates a block diagram of an example CBRS regions splitter (color/motion) stages cascader.

FIG. 14A illustrates a block diagram of an example CBRS regions splitter (color/motion) stages cascader 416, arranged in accordance with at least some implementations of the present disclosure. As shown, CBRS regions splitter (color/motion) stages cascader 416 may include a number of stages that may be cascaded such that the greater the number of stages that are cascaded, the greater the number of regions that the scene may be segmented into. For example, each cascade stage may typically have 2 or 3 possible processing choices (although a single processing path is also allowed).

As discussed, the main segmentation process (e.g., color only or color with motion assistance) for color based region segmentation results in 2 regions. As shown in FIG. 14A, since stage 1 splitting is performed on a non-dominant color region only, main segmentation with stage 1 splitting provides segmentation into 3 regions. When the first and second stage cascading are combined, up to 5 valid region segmentation may be provided. With the illustrated 2 stage cascading structure, a color based region segmenter may allow segmentation of a frame into 2 to 5 regions.

With this overview of the functionality of CBRS regions splitter (color/motion) stages cascader 416, discussion now turns to an example implementation as shown in FIG. 14A. As shown, the binary dominant color probability mask BDCP (which may be characterized as $BDCP_1$) at the input of CBRS regions splitter (color/motion) stages cascader 416 may be provided to a splitter and, along with subsampled frame Fs, and global/local motion probability mask GLP, is input to a color/motion based analyzer and split method selector 1401 that analyzes these inputs and generates a number of control signals such as a color/motion split processing path given collectively by cms, and $cms_2$, and number of additional segments path given by nas, and $nas_2$, for the case of a two stage splitter. If nas or $nas_2$ are 0, the path for region splitting that is controlled by switches using these signals as controls is disabled and no region splitting occurs.

As shown, in the first stage, the cms signal is examined. If cms is 0 the BDCP mask is sent to a masked area dominant color region segmenter 1402 for splitting of the area where BDCP mask is 1 resulting in a $BDCP_2$ mask (e.g., a sub mask of the foreground or background BDCP mask region-layer). If cms is 1, the BDCP mask is sent to a masked area global/local motion region segmenter 1403 that may use the dominant color to split the area of BDCP where mask is 1 resulting in a $BDCP_2$ mask. The output of this stage results in 3 regions. If both nas and $nas_2$ are 0 no additional segmentation is necessary and the region segmentation so far is the final segmentation.

If nas is 1, in the second stage, splitting is be performed and so the $cms_2$ signal is examined. If $cms_2$ is 0, region splitting is performed using dominant color using a masked area dominant color region segmenter 1404 that uses dominant color to split the area of $BDCP_2$ where mask is 1 resulting in a $BDCP_3$ mask. If $cms_2$ is 1, region splitting is performed via a motion path using either global/local motion or using dominant motion. If cms is 0, region splitting is performed via a global/local motion path using a masked area global/local motion region segmenter 1405 that uses global/local motion to split the area of $BDCP_2$ where the mask is 1 resulting in a $BDCP_3$ mask. If cms is 1, region splitting is performed via a dominant motion path using a masked area dominant motion region segmenter 1406 that uses dominant motion to split the area of $BDCP_2$ where the mask is 1 resulting in a $BDCP_3$ mask.

If $nas_2$ is 1, further splitting of region that resulted from stage 1 segmentation is performed. To achieve this, the BDCP mask for the frame is first bit-wise inverted by masked area mask inverter 1408 resulting in a mask $BDCP'_2$ which then passes through a masked area dominant color region segmenter 1409 for splitting of the area where the $BDCP'_2$ mask is 1 resulting in a $BDCP_4$ mask.

The BDCP mask, the $BDCP_2$ mask, the $BDCP_3$ mask, and the $BDCP_4$ mask (as applicable) are then input to multiple region single mask generation logic 1407 that combines the aforementioned binary masks to generate a single multi-region mask of segmented regions. Since having a second stage is optional, on the minimum, at least the BDCP and $BDCP_2$ mask are merged by multiple region single mask generation logic 1407 to generate a final single multi-region mask 1411. When the second stage is also implemented, either $BDCP_3$, or both $BDCP_3$ and $BDCP_4$ may also be merged with BDCP and $BDCP_2$ to generate the final single multi-region mask final single multi-region mask 1411.

Figure 14B:
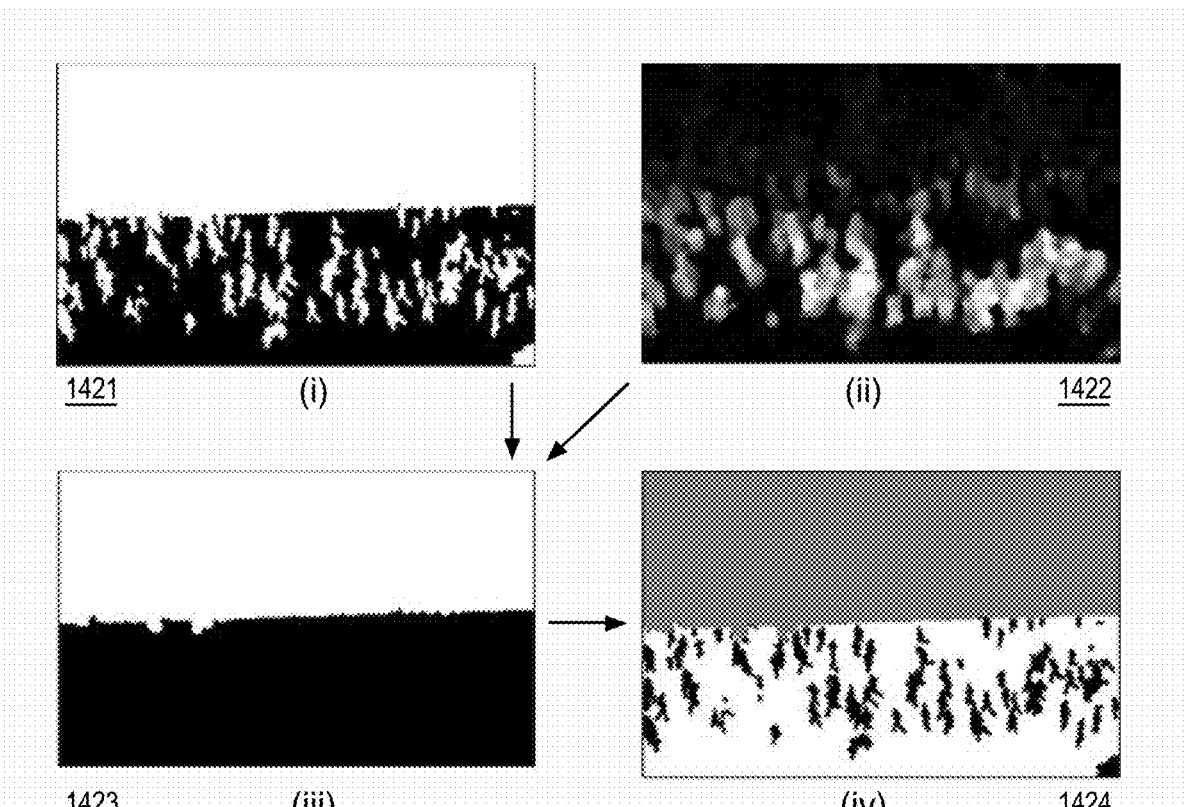
FIG. 14B illustrates example processing results based on multiple region splitting techniques.

FIG. 14B illustrates example processing results based on the above described multiple region splitting techniques, arranged in accordance with at least some implementations of the present disclosure. FIG. 14B presents an example illustrating steps in the region-splitting per CBRS region splitter. In the illustrated example, a binary (2 region) dominant color based probability (BDCP) mask 1421 that results from the main 2 region segmentation discussed herein is shown in FIG. 14B(i) and a corresponding example global/local motion probability (GLP) map 1422 is shown in FIG. 14B(ii). FIG. 14B(iii) illustrates an example $BDCP_2$ mask 1423 that results from splitting the masked area of BDCP mask 1421 further based on GLP map 1422. Furthermore, FIG. 14B(iv) illustrates an example 3 region mask 1424 that results from merging BDCP mask 1421 and $BDCP_2$ mask 1423 by multiple region single mask generation logic 1407.

Earlier, the operation of CBRS regions splitter (color/motion) stages cascader 416 was described. As discussed, CBRS regions splitter (color/motion) stages cascader 416 may include masked area dominant color region segmenter 1402, masked area global/local motion region segmenter 1403, and masked area dominant color region segmenter 1404 that are cascaded in various stages to obtain a final segmentation. Besides these components, CBRS regions splitter (color/motion) stages cascader 416 also includes other components such as masked area mask inverter 1408 and multiple region single mask generation logic 1407. For example, masked area mask inverter 1408 may perform a pre-processing function of bits inversion ensuring the region being split is represented as 1s in the mask. Multiple region single mask generation logic 1407 may perform a post-processing function to combine several binary masks to generate a single coherent multi-level mask where each region is represented by a value or the like. Discussion now turns to the other components of CBRS regions splitter (color/motion) stages cascader 416.

Figure 14C:
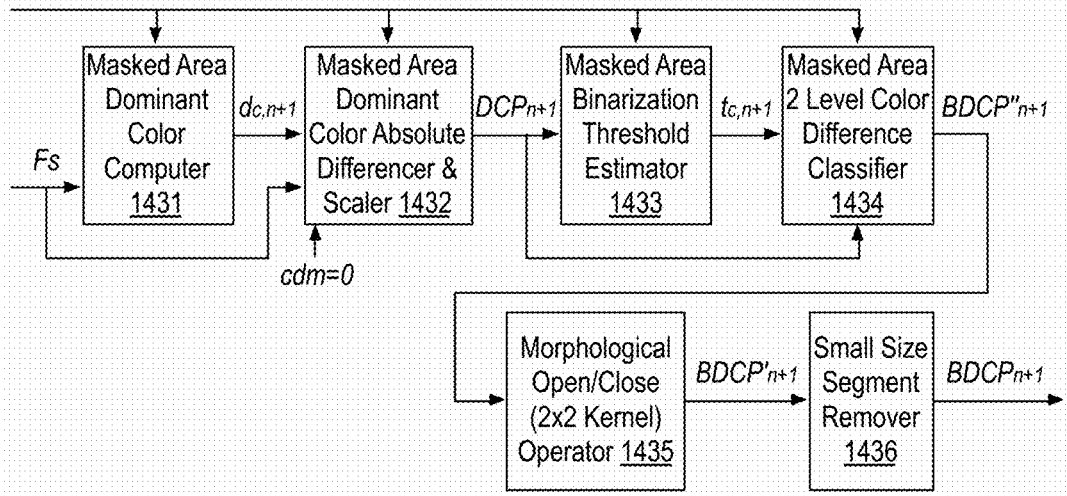
FIG. 14C illustrates a block diagram of an example masked area dominant color region segmenter.

FIG. 14C illustrates a block diagram of an example masked area dominant color region segmenter 1402, 1404, 1409, arranged in accordance with at least some implementations of the present disclosure. As shown, the binary dominant color probability ($BDCP_n$) mask may be input along with the downsampled frame to a masked area dominant color computer 1431 that may use the portion of the BDCP mask that is 1 to determine and output the dominant color $d_{c\ n+1}$. For example, the dominant color may be determined by using the masked area (e.g., where the mask is 1) in $BDCP_n$ to determine a (YUV) three color $H=(H_Y, H_U, H_V)$ histogram and correlating the three histograms to select peak values to find a single corresponding dominant color $d_{c\ n+1}$ as discussed elsewhere herein.

As shown, the dominant color $d_{c\ n+1}$, the downsampled image Fs, and the BDCP mask are input to a masked area dominant color absolute differencer and scaler 1432 where, for the masked region (e.g., the region of is in BDCP), the YUV pixels of the downsampled frame are subtracted from the dominant color $d_{c\ n+1}$, an absolute value is taken and the value is scaled, resulting in dominant color probability map $DCP_{n+1}$ in analogy to the techniques for a full frame as discussed herein. A binarization threshold $t_{c\ n+1}$ may be determined based on the color histogram (e.g., the threshold may correspond to a valley or valleys in the histogram) by masked area binarization threshold estimator 1433, which also takes as an input the BDCP mask. Next, the binarization threshold $t_{c\ n+1}$ is applied to the $DCP_{n+1}$ mask in the masked area (e.g., where it is 1) given by BDCP by masked area 2 level color difference classifier 1434 to generate a new binarized mask $BDCP''_{n+1}$. The binarized mask $BDCP''_{n+1}$ mask may then undergo morphological processing cleanup by morphological open/close operator 1435, resulting in an improved $BDCP'_{n+1}$ mask. The $BDCP'_{n+1}$ mask may undergo further processing to remove small segments by a small size segments remover 1436 resulting in the $BDCP_{n+1}$ mask at the output of the segmenter.

Figure 14D:
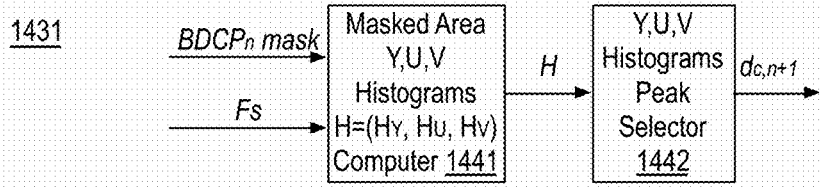
FIG. 14D illustrates a block diagram of an example masked area dominant color computer.

Discussion now turns to the subset of the block diagram of FIG. 14C that is involved in dominant color determination for the masked area. FIG. 14D illustrates a block diagram of an example masked area dominant color computer 1431, arranged in accordance with at least some implementations of the present disclosure. As shown, masked area dominant color computer 1431 may include a masked area Y,U,V histograms $H=(H_Y, H_U, H_V)$ computer 1441 and a Y,U,V histograms peak selector 1442. First, masked area Y,U,V histograms $H=(H_Y, H_U, H_V)$ computer 1441 may generate three histograms, one for each channel of the masked area of the subsampled YUV 4:4:4 frame. Next, Y,U,V histograms peak selector 1442 may determine the highest peak (e.g., the most frequently occurring value) of the histograms for each of the Y, U and V channel. This YUV combination color of the peak is determined to be the dominant color, $d_c$. Such processing may be analogous to the full frame processing discussed herein.

Figure 14E:
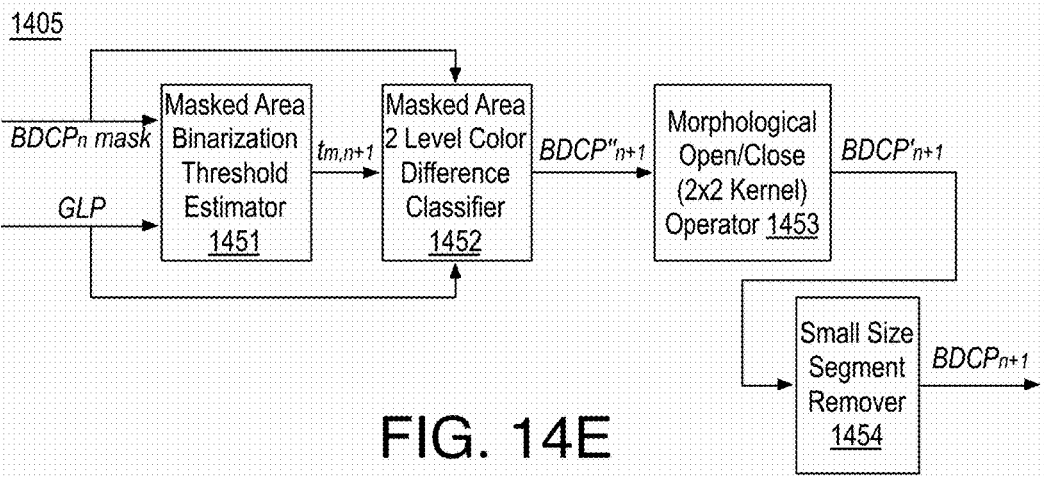
FIG. 14E illustrates a block diagram of an example masked area global/local motion region segmenter.

FIG. 14E illustrates a block diagram of an example masked area global/local motion region segmenter 1405, arranged in accordance with at least some implementations of the present disclosure. As shown, the binary dominant color probability $BDCP_n$ (in this use case $BDCP_n$ is same as $BDCP_1$ which is same as BDCP) mask may be input along with the global/local motion probability mask (GLP) to a masked area binarization threshold estimator 1451 that determines and outputs a binarization threshold $t_{m2}$ ($t_{m,n+1}$) on the portion of BDCP mask that is 1. Next, both the binarization threshold $t_{m2}$ and the global/local motion based probability mask GLP are input to a masked area 2 level color difference classifier 1452 that binarizes the GLP in the masked area and outputs a new mask characterized as $BDCP''_{n+1}$ mask. Next, the $BDCP''_{n+1}$ mask undergoes morphological clean up by a morphological open/close operator 1453 resulting in an improved mask $BDCP'_{n+1}$ which is then further cleaned up by removal of small size fragments by a small size segment remover 1454, resulting in a final $BDCP_{n+1}$ (in this use case $BDCP_{n+1}$ is same as $BDCP_2$) mask at the output of masked area global/local motion region segmenter 1405. For example, final $BDCP_{n+1}$ mask may provide an additional mask for the previously masked area of the $BDCP_n$ mask.

Figure 14F:
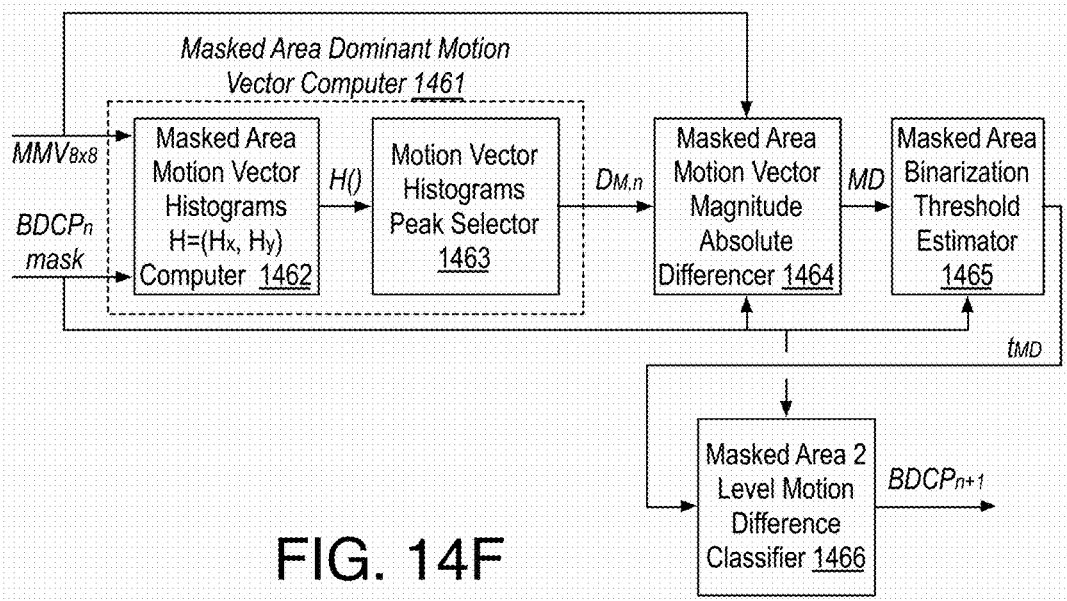
FIG. 14F illustrates a block diagram of an example masked area dominant motion region segmenter.
Figure 15A:
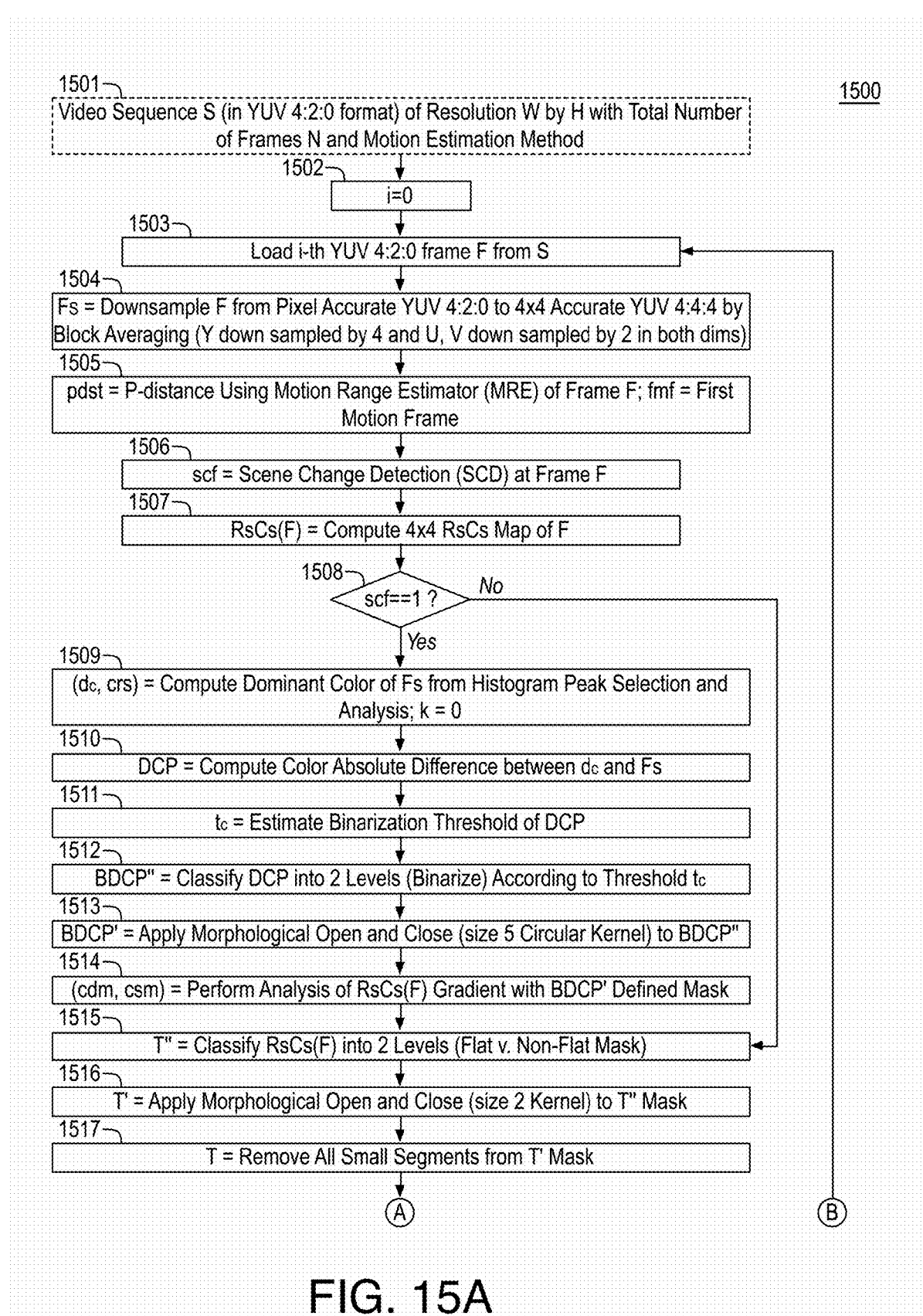
FIGS. 15A, 15B, 15C, and 15D illustrates an example method for segmenting video frames into region-layers.
Figure 15B:
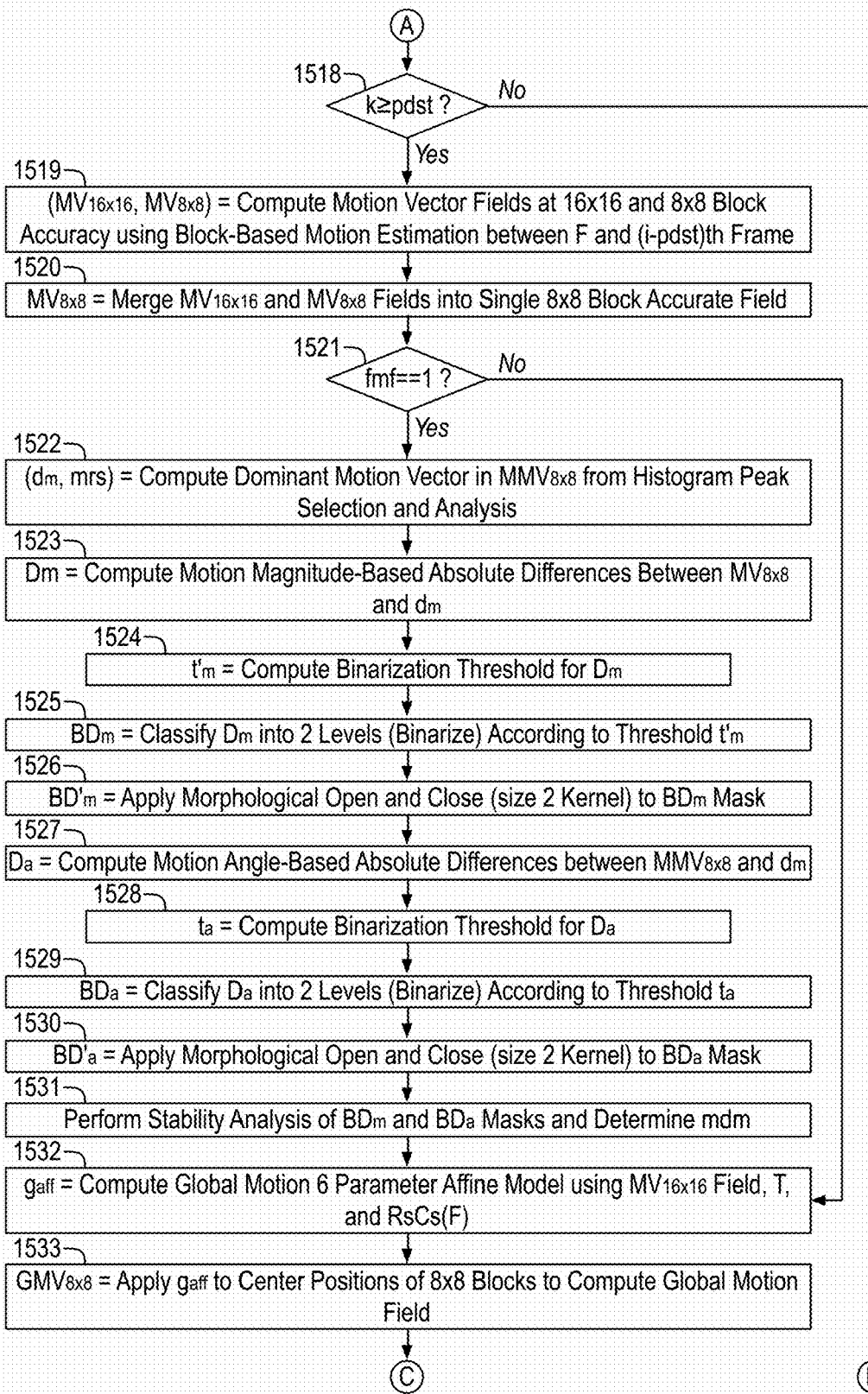
Figure 15C:
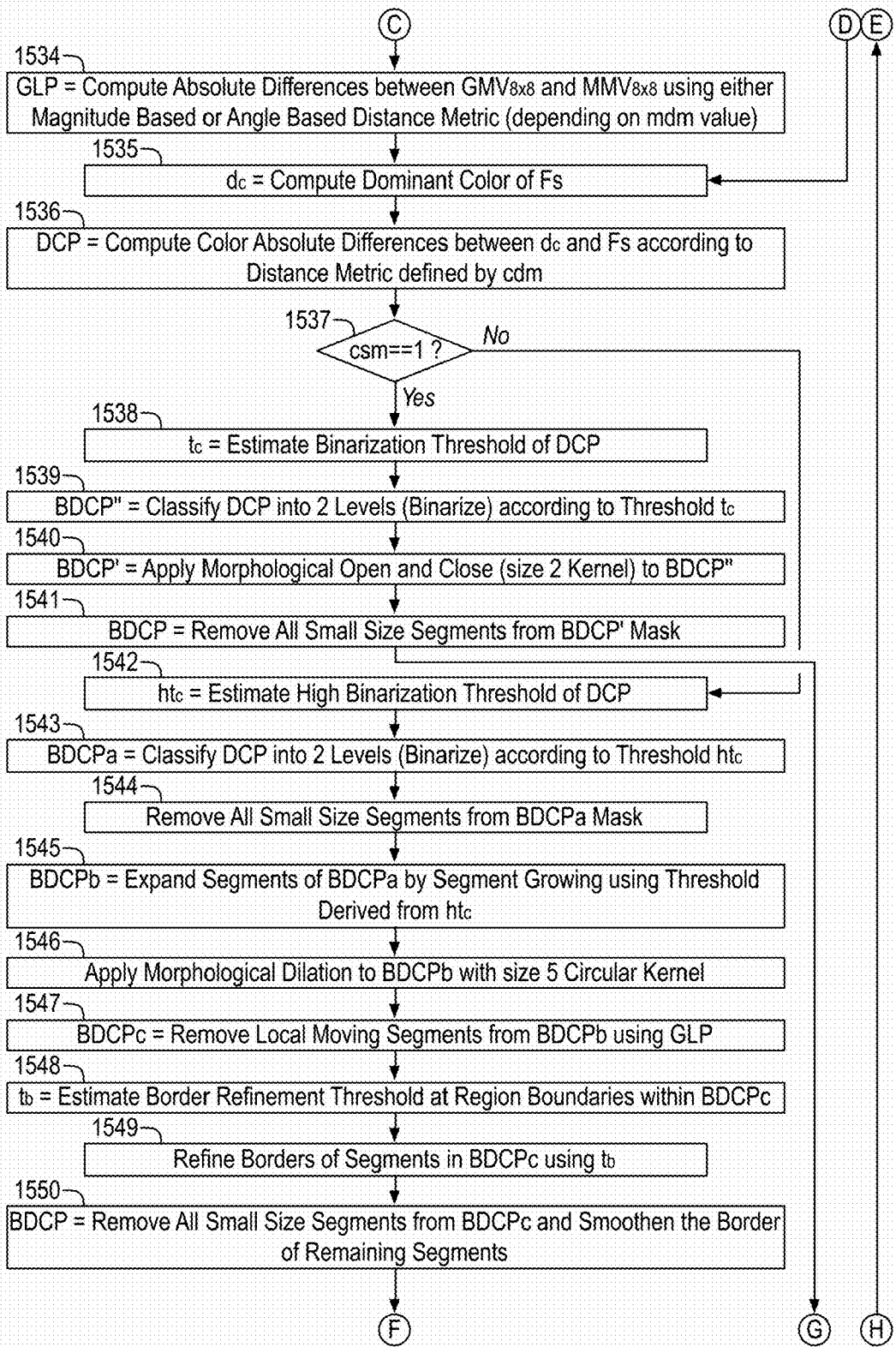
Figure 15D:
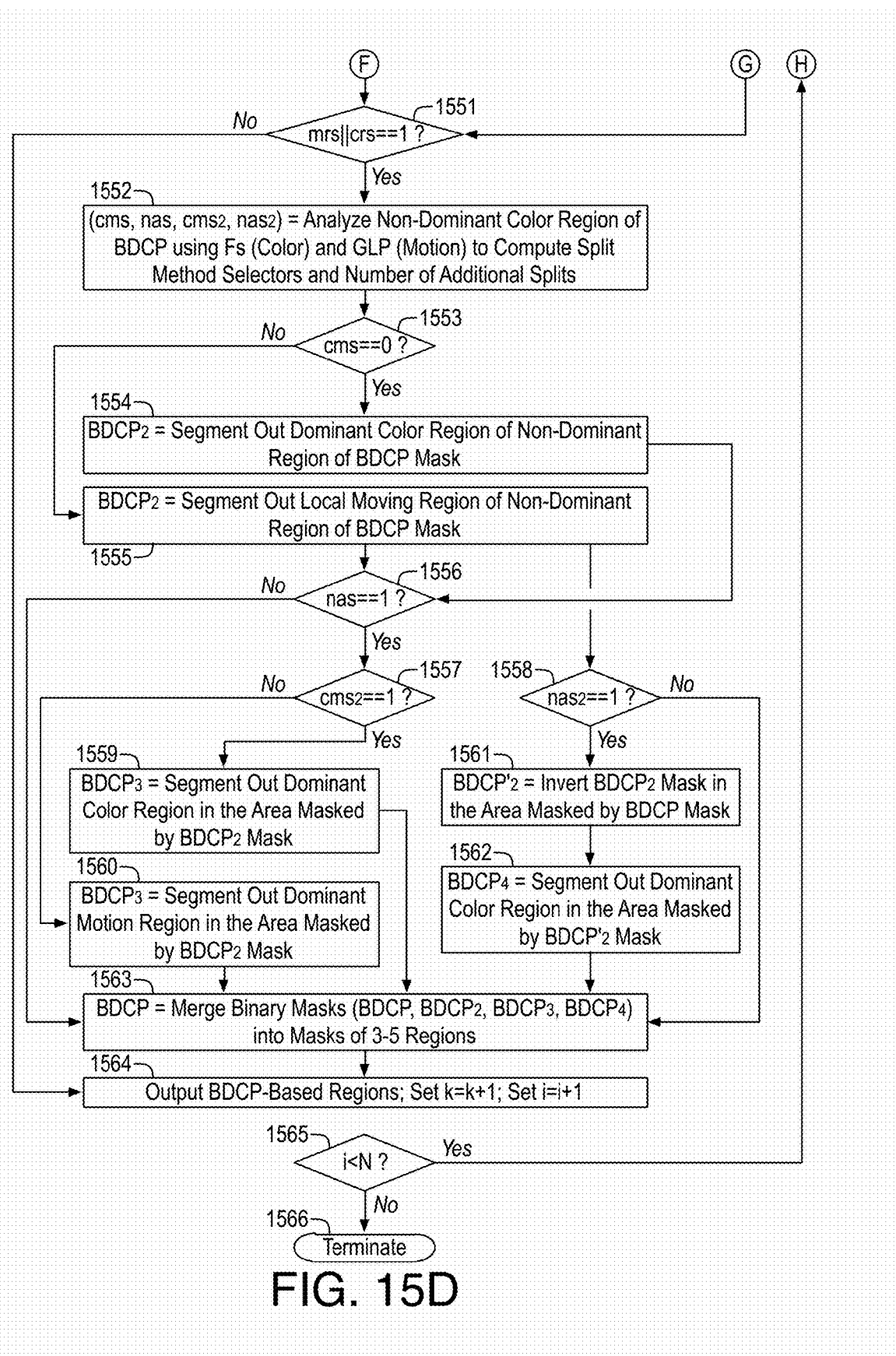

FIG. 14F illustrates a block diagram of an example masked area dominant motion region segmenter 1406, arranged in accordance with at least some implementations of the present disclosure. As shown, the binary dominant color probability mask $BDCP_n$ (in our specific use case $BDCP_n$ is $BDCP_2$) may be input along with 8×8 block motion vectors (e.g., the merged motion vectors $MMV_{8\times8}$ as discussed herein) to a masked area motion vector histogram $H=(Hx, Hy)$ computer 1462 that determines the histogram $H( )$ for the region in which $BDCP_n$ mask is 1, which is provided to a motion vector histograms peak selector 1463 that determines and correlates the x and y motion vector histograms peaks and outputs a dominant motion vector $d_{M,n}$ (e.g., $d_{M,2}$ in the use case). For example, the dominant motion vector may be the motion vector that corresponds to the peaks of the x and y motion vector histograms. As shown, masked area motion vector histogram $H=(Hx, Hy)$ computer 1462 and motion vector histograms peak selector 1463 may form a masked area dominant motion vector computer 1462. As shown, masked area motion vector histogram $H=(Hx, Hy)$ computer 1462 and motion vector histograms peak selector 1463 may be implemented via a masked area dominant motion vector computer 1461.

Next, the $BDCP_n$ mask, the 8×8 block motion vectors $MMV_{8\times8}$, and the dominant motion vector $d_{M,2}$ are input to a masked area motion vector magnitude absolute differencer 1464 that calculates for the area under the mask (e.g., masked area represented by 1), the difference between a magnitude of each 8×8 motion vector and the dominant motion vector and further determines its absolute value to generate a dominant motion difference field MD. The MD field is then input along with the $BDCP_n$ mask to a masked area binarization threshold estimator 1465 that determines a dominant motion threshold $T_{MD}$ and inputs it along with the $BDCP_2$ mask to masked area 2 level motion difference classifier 1466 that outputs a modified mask characterized as $BDCP_{n+1}$ (e.g., in our specific use case $BDCP_{n+1}$ is $BDCP_3$) that provides a dominant motion based splitting of the input $BDCP_n$ mask.

FIGS. 15A, 15B, 15C, and 15D illustrates an example method 1500 for segmenting video frames into region-layers, arranged in accordance with at least some implementations of the present disclosure. For example, process 1500 may be implemented to segment video frames or pictures into any number of region-layers as discussed herein. In the illustrated implementation, process 1500 may include one or more operations as illustrated by operations 1501-1566. However, embodiments herein may include additional operations, certain operations being omitted, or operations being performed out of the order provided.

In the example method 1500, a detailed flowchart is provided that illustrates the flow of data and control signals through six functional processing groups: a preprocessing group, a color and texture analysis group, a local and global motion analysis group, a dominant color and dominant color probability map group, a dominant color 2 regions segmentation group, and a non-dominant color region splitting segmentation group. Each processing group may include one or more processing subgroups and or processing functions as follows. The preprocessing group may include downsampling, p distance determination, scene change detection, and texture gradient (Rs,Cs) map determination. The color and texture analysis group may include color analysis and color distance method selection and texture distribution computation. The local and global motion analysis group may include 16×16 and 8×8 block motion estimation, 8×8 block motion merging, global motion estimation, and global/local motion probability map computation. The dominant color and dominant color probability map group may include dominant color computation and dominant color probability map computation. The dominant color main 2 regions segmentation group may include 2 regions segmentation based on dominant color probability map and 2 regions segmentation based on dominant color probability map and global/local motion probability map. The non dominant color region splitting segmentation group may include color/motion analysis and splitting method selection, masked area dominant color region segmentation, masked area global/local motion region segmentation, masked area dominant motion region segmentation, and merging masks for single multi-color map generation.

As shown, processing may begin at operation 1501, where a video sequence S of video frames in any format such as a YUV 4:2:0 format at any resolution (e.g., W×H) having any number of frames (e.g., N frames) and a motion estimation method selection may be received. Processing may continue at operation 1502, where a counter variable i may be initialized to 0. Processing may continue at operation 1503, where the i-th frame may be loaded or received for processing. Processing may continue at operation 1504, where a downsampled frame Fs may be determined or downsampled from the pixel accurate YUV 4:2:0 frame to a 4×4 accurate YUV 4:4:4 frame by block averaging (Y downsampled by 4 and U, V downsampled by 2 in both dimensions). Processing may continue at operation 1505, where a p-distances pdst may be determined using a motion range estimator based on frame F to determine a best reference frame for motion estimation for the current frame F. When the current frame is a first frame or the like a control signal fmf may be set to indicate the current frame is a first motion frame. Processing may continue at operation 1506, where a scene change detection may be performed for frame F to determine whether the current frame is a scene change frame. If so, a control signal scf may be set to indicate the current frame is a scene change frame. Processing may continue at operation 1507, where vertical texture (or gradients) Rs, horizontal texture (or gradients) Cs, and combined texture (or gradients) RsCs may be determined for the current frame on a 4×4 block basis or the like. Such operations may provide a preprocessing group of operations.

Processing may continue at decision operation 1508, where a determination may be made as to whether the current frame is a scene change frame. If not, processing may continue at operation 1515 as discussed below. If so, processing may continue at operation 1509, where a dominant color $d_c$ and a color region splitting signal may be determined for the current frame. For example, the dominant color may be determined based on a color histogram generation and histogram peak selection and analysis as discussed herein.

Processing may continue at operation 1510, where a dominant color probability map DCP may be determined for the current frame based on a determination of a color absolute difference between the downsampled frame and the dominant color. Processing may continue at operation 1511, where a dominant color binarization threshold $t_c$ may be determined for the current frame. Processing may continue at operation 1512, where a binarized dominant color probability map BDCP" may be determined for the current frame by classifying each probability of the dominant color probability map into two levels according to the dominant color binarization threshold. Processing may continue at operation 1513, where a morphological open and close operation (e.g., size 5 circular kernel) may be applied to the binarized dominant color probability map from operation 1512 to generate a binarized dominant color probability map BDCP'. Processing may continue at operation 1514, where a color differencing method cdm control signal and a color/motion splitting method csm control signal may be determined based on an analysis of the combined texture (or gradients) RsCs generated at operation 1507. Processing may continue at operation 1515, where a texture measure or map T" may be generated by classifying each block of RsCs into two levels (e.g., a flat or non-flat mask) based on a flat/non-flat threshold. Processing may continue at operation 1516, where a morphological open and close operation (e.g., size 2 kernel) may be applied to the texture map T" to generate a texture map T'. Processing may continue at operation 1517, where small segments may be removed from the texture map T' to generate a final texture map T for the current frame. Such operations may provide a color and texture analysis group of operations.

Processing may continue at decision operation 1518, where a determination may be made as to whether a counter variable k is greater than or equal to the p distance determined at operation 1505. If not, processing may continue at operation 1535 as discussed below. If so, processing may continue at operation 1519, where motion vector fields at 16×16 ($MV_{16\times 16}$) and 8×8 ($MV_{8\times 8}$) block accuracy may be determined using block-based motion estimation between the current frame F and a reference fame (e.g., the frame at i minus pdst). Processing may continue at operation 1520, where the 16×16 motion vector field and the 8×8 motion vector field may be merged into a single 8×8 block accurate motion vector field $MV_{8\times 8}$.

Processing may continue at decision operation 1521, where a determination may be made as to whether the current frame is a first motion frame. If not, processing may continue at operation 1532 as discussed below. If so, processing may continue at operation 1522, where a dominant motion vector $d_m$ in the motion vector field and a motion region splitting control flag may be determined based on a motion vector field histogram peak selection and analysis. Processing may continue at operation 1523, where motion magnitude-based absolute differences Dm may be determined based on the motion vector field and the dominant motion vector by differencing each motion vector in the motion vector field with the dominant motion vector. Processing may continue at operation 1524, where a binarization threshold $t'_m$ (magnitude-based) for the motion vector differences may be determined. Processing may continue at operation 1525, where the motion vector differences may be binarized by 2 level classification according to the binarization threshold to generate a binary motion vector differences mask $BD_m$ (magnitude-based). Processing may continue at operation 1526, where a morphological open and close operation (e.g., size 2 kernel) may be applied to the binary motion vector differences mask $BD_m$ to generate a binary motion vector differences mask $BD'_m$ (magnitude-based). Processing may continue at operation 1527, where motion angle-based absolute differences Da may be determined based on the motion vector field and the dominant motion vector. Processing may continue at operation 1528, where a binarization threshold $t_a$ (angle-based) for the motion vector differences may be determined. Processing may continue at operation 1529, where the motion vector differences may be binarized by 2 level classification according to the binarization threshold to generate a binary motion vector differences mask $BD_a$ (angle-based). Processing may continue at operation 1530, where a morphological open and close operation (e.g., size 2 kernel) may be applied to the binary motion vector differences mask $BD_a$ to generate a binary motion vector differences mask $BD'_a$ (angle-based). Processing may continue at operation 1531, where a stability analysis of the binary motion vector differences mask $BD_m$ (magnitude-based) and the binary motion vector differences mask $BD_a$ (angle-based) may be performed and a motion differencing method mdm signal may be generated. Processing may continue at operation 1532, where a global motion model (e.g., 6 parameter affine model $g_{aff}$ or 8 parameter perspective model $g_{persp}$) may be fit to the current frame based on the 16×16 block accuracy motion vector field, the final texture map T, and the combined texture (or gradients) RsCs. Processing may continue at operation 1533, where the global motion model may be applied to center positions of 8×8 blocks to generate a global motion vector field $GMV_{8\times 8}$. Processing may continue at operation 1534, where absolute differences between the global motion vector field and the local motion vector field may be determined using the magnitude-based or angle-based (e.g., depending on the motion differencing method value) differencing method or distance metric to generate and/or map to a global/local probability map GLP. Such operations may provide a local and global analysis group of operations.

Processing may continue at operation 1535, where a dominant color dc may be determined for the frame when the counter variable k is not greater than or equal to the p distance as determined at decision operation 1518. Processing may continue at operation 1536, where a dominant color probability map DCP may be determined for the current frame based on a determination of a color absolute difference between the downsampled frame and the dominant color based on the color differencing method. Such operations may provide a dominant color and dominant color probability map group of operations.

Processing may continue at decision operation 1537, where a determination may be made as to whether the color separation method indicates separation based on dominant color only. If not, processing may continue at operation 1542 as discussed below. If so, processing may continue at operation 1538, where a binarization threshold $t_c$ for the dominant color probability map may be determined based on color histograms analysis (e.g., with the binarization threshold corresponding to valleys in the color histograms). Processing may continue at operation 1539, where a binarized dominant color probability map BDCP''' may be determined by classifying each probability of the dominant color probability map into two levels according to the binarization threshold. Processing may continue at operation 1540, where a morphological open and close operation (e.g., size 2 kernel) may be applied to the binarized dominant color probability map BDCP''' to generate a binarized dominant color probability map BDCP'. Processing may continue at operation 1541, where small segments may be removed from the binarized dominant color probability map BDCP' to generate a final binarized dominant color probability map BDCP.

Processing may continue at operation 1542 from decision operation 1537, where a high binarization threshold $ht_c$ for the dominant color probability map may be determined based on color histograms analysis (e.g., with the binarization threshold corresponding to valleys in the color histograms). Processing may continue at operation 1543, where a binarized dominant color probability map BDCPa may be determined by classifying each probability of the dominant color probability map into two levels according to the high binarization threshold. Processing may continue at operation 1544, where small segments may be removed from the binarized dominant color probability map BDCPa. Processing may continue at operation 1545, where segments of the binarized dominant color probability map BDCPa may be expanded by segment growing using a threshold determined based on the high binarization threshold $ht_c$ to generate a binarized dominant color probability map BDCPb. Processing may continue at operation 1546, where a morphological dilation may be applied to the binarized dominant color probability map BDCPb (e.g., size 5 circular kernel). Processing may continue at operation 1547, where local moving segments may be removed from the binarized dominant color probability map BDCPb based on the global/local probability map GLP determined at operation 1534 to generate a binarized dominant color probability map BDCPc. Processing may continue at operation 1548, where a border refinement threshold $t_b$ may be estimated for refinement of boundaries within the binarized dominant color probability map BDCPc. Processing may continue at operation 1549, where boundaries or borders of segments within the binarized dominant color probability map BDCPc. may be refined using the border refinement threshold $t_b$. Processing may continue at operation 1550, where small segments may be removed from the binarized dominant color probability map BDCPc and borders of remaining segments may be smoothed to generate a binarized dominant color probability map BDCP, which may be characterized as a final binarized dominant color probability map. Such operations may provide a dominant color main 2 regions segmentation group of operations.

Processing may continue at decision operation 1551, where a determination may be made as to whether the motion region splitting signal and/or the color region splitting signal is true. If not, processing may continue at operation 1563 as discussed below. If so, processing may continue at operation 1552, where the non-dominant color region of binarized dominant color probability map BDCP may be analyzed to determine split method selectors or signals and the number of additional splits as indicated by the control signals color/motion splitting method cms, control signals color/motion splitting method $cms_2$, number of additional segments nas, and number of additional segments $nas_2$.

Processing may continue at decision operation 1553, where a determination may be made as to whether the control signal color/motion splitting method cms indicates dominant color only splitting. If so, processing may continue at operation 1554, where a dominant color region may be split out or segmented from the non-dominant region of the binarized dominant color probability map BDCP to generate a binarized dominant color probability map $BDCP_2$ that further segments the non-dominant region of the binarized dominant color probability map BDCP. If not, processing may continue at operation 1555, where local motion region may be split out or segmented from the non-dominant region of the binarized dominant color probability map BDCP to generate a binarized dominant color probability map $BDCP_2$ that further segments the non-dominant region of the binarized dominant color probability map BDCP.

In either case, processing may continue at decision operation 1556, where a determination may be made as to whether segmenting into additional segments is indicated based on nas. If not, processing may continue at operation 1563 as discussed below. If so, processing may continue at decision operation 1557, where a determination may be made as to whether the control signals color/motion splitting method $cms_2$ indicates dominant color only splitting. If so, processing may continue at operation 1559, where a dominant color region may be split out or segmented from the area masked by the binarized dominant color probability map $BDCP_2$ to generate a binarized dominant color probability map $BDCP_3$ that further segments the binarized dominant color probability map $BDCP_2$. If not, processing may continue at operation 1560, where dominant motion regions may be split out or segmented from the area masked by the binarized dominant color probability map $BDCP_2$ to generate a binarized dominant color probability map $BDCP_3$ that further segments the binarized dominant color probability map $BDCP_2$. In either case, processing may continue at operation 1563 as discussed below.

Furthermore, processing may continue from operation 1555 at decision operation 1558, where a determination may be made as to whether segmenting into additional segments is indicated based on $nas_2$. If not, processing may continue at operation 1563 as discussed below. If so, processing may continue at decision operation 1561, where the binarized dominant color probability map $BDCP_2$ may be bit-wise inverted to generate a binarized dominant color probability map $BDCP'_2$. Processing may continue at operation 1562, where a dominant color region may be split out or segmented from the area masked by the binarized dominant color probability map $BDCP'_2$ to generate a binarized dominant color probability map $BDCP_4$ (e.g., further splitting the dominant color region based on a dominant color within that region) that further segments the binarized dominant color probability map $BDCP'_2$. Processing may continue at operation 1563 (as well as from decision operation 1556, operation 1559, and operation 1560), where the binarized dominant color probability maps (e.g., binary masks) as applicable may be merged into masks of 3-5 regions. Such operations may provide a non-dominant color region splitting segmentation group of operations.

Processing may continue at operation 1564 from operation 1563 or decision operation 1551, where the binarized dominant color probability map BDCP-based region-layers may be output (e.g., to provide a final region-layer mask having 2-5 regions and indicating the region-layer of each pixel in the current frame F). Furthermore, the counter variables k and i are incremented. Processing may continue at decision operation 1565, where a determination may be made as to whether the current frame is the last frame in the sequence. If not, processing may continue at operation 1503. If so, processing may end at termination operation 1566.

Discussion now turns to example implementations and results using the systems and techniques discussed herein.

FIG. 16A illustrates an example conceptual block diagram of a system 1600 that is a subset of system 400 that performs color based two primary region segmentation using color only, arranged in accordance with at least some implementations of the present disclosure. For example, FIG. 16A illustrates a color based 2 region segmenter using color only. As shown, system 1600 may include a CBRS 2 regions generator using dominant color probability map only module 1601 that may receive and segment the dominant color probability map of a frame or picture into two regions or region-layers: a color based background region 1 and a remaining foreground region 2.

FIG. 16B illustrates example processing results attained by system 1600, arranged in accordance with at least some implementations of the present disclosure. In the illustrated example, system 1600 may operate on a Ritual Dance video sequence (e.g., at 1080p) including an original frame 1611 of the video sequence. Original frame 1611 as shown in FIG. 16B(i) may be segmented based on a dominant color probability mask (e.g., at 4-pixel accuracy) into two regions or region-layers as shown in FIGS. 16B(ii) and 16B(iii). FIG. 16B(ii) illustrates an example color based background region 1 1612 (e.g., the sky area of original frame 1611) and FIG. 16B(iii) illustrates an example remaining foreground region 2 1613 (e.g., the ritual dancers of original frame 1611).

FIG. 16C illustrates additional example processing results attained by system 1600, arranged in accordance with at least some implementations of the present disclosure. In the illustrated example, system 1600 may operate on a video sequence of Star Wars II (e.g., at 1080p) including an original frame 1621 of the video sequence. Original frame 1621 as shown in FIG. 16C(i) may be segmented based on a dominant color probability mask (e.g., at 4-pixel accuracy) into two regions or region-layers as shown in FIGS. 16C(ii) and 16C(iii). FIG. 16C(ii) illustrates an example color based background region 1 1622 (e.g., the grass-field area of original frame 1621), and FIG. 16C(iii) illustrates an example remaining foreground region 2 (e.g., the non-grass-field or a couple talking area of original frame 1621).

Figure 17A:
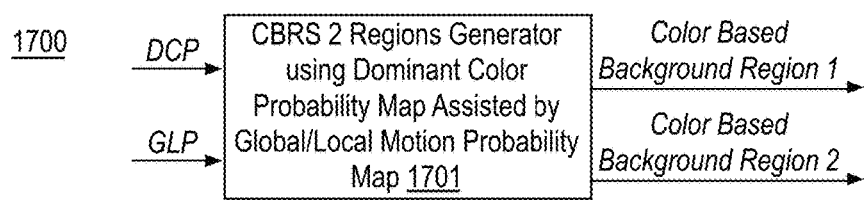
FIG. 17A illustrates an example conceptual block diagram of a system that performs color based two primary region segmentation using color assisted by motion.

FIG. 17A illustrates an example conceptual block diagram of a system 1700 that is a subset of system 400 that performs color based two primary region segmentation using color assisted by motion, arranged in accordance with at least some implementations of the present disclosure. For example, FIG. 17A illustrates a color based 2 region segmenter using color assisted by motion such that in addition to a dominant color probability map, system 1700 also uses a global/local motion probability map for segmentation. As shown, system 1700 may include a CBRS 2 regions generator using dominant color probability map assisted by global/local motion probability map module 1701 that may receive and segment the dominant color probability map of a frame or picture assisted by a received global/local motion probability map into two regions or region-layers: a color based background region 1 and a remaining foreground region 2.

Figure 17B:
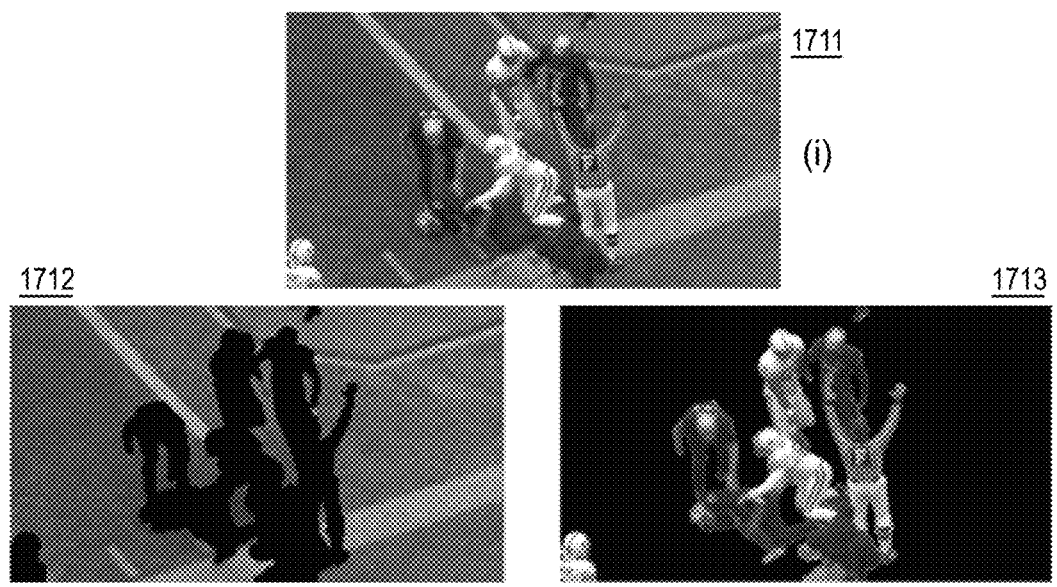
FIG. 17B illustrates example processing results attained by the system of FIG. 17A.

FIG. 17B illustrates example processing results attained by system 1700, arranged in accordance with at least some implementations of the present disclosure. In the illustrated example, system 1700 may operate on a Touchdown video sequence (e.g., at 1080p) including an original frame 1711 of the video sequence. Original frame 1711 as shown in FIG. 17B(i) may be segmented based on a dominant color probability mask (e.g., at 4-pixel accuracy) assisted by a global/local motion probability mask (e.g., at 4- or 8-pixel accuracy) into two regions or region-layers as shown in FIGS. 17B(ii) and 17B(iii). FIG. 17B(ii) illustrates an example color based background region 1 1712 (e.g., the football-field area of original frame 1711) and FIG. 17B(iii) illustrates an example remaining foreground region 2 1713 (e.g., the non-football-field or football players area of original frame 1711).

Figure 17C:
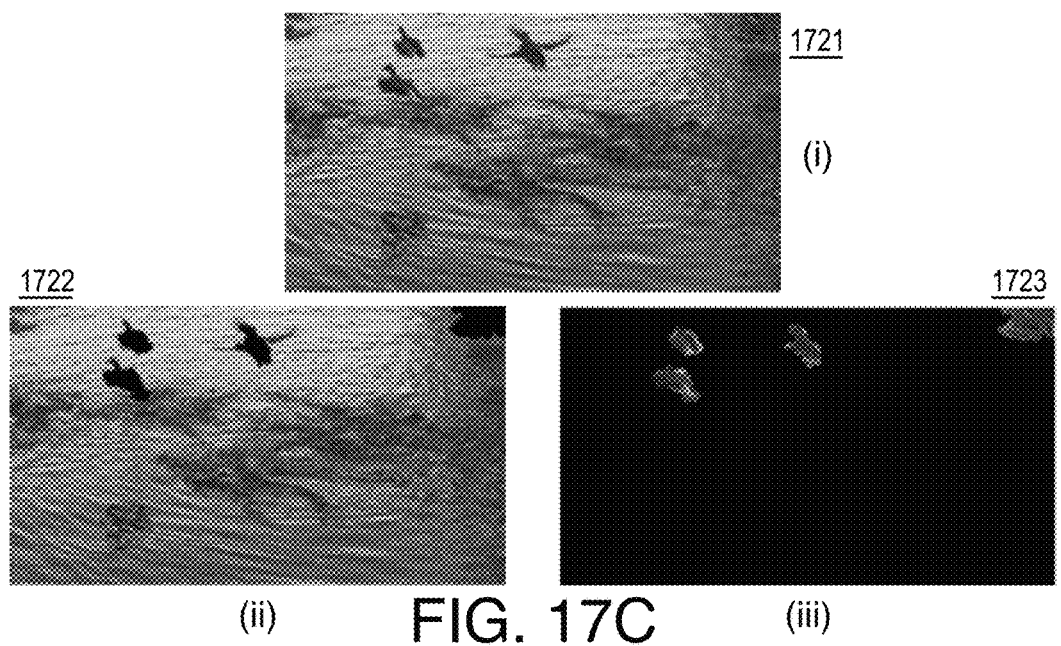
FIG. 17C illustrates additional example processing results attained by the system of FIG. 17A.

FIG. 17C illustrates additional example processing results attained by system 1700, arranged in accordance with at least some implementations of the present disclosure. In the illustrated example, system 1700 may operate on a Ducks Takes Off video sequence (e.g., at 1080p) including an original frame 1721 of the video sequence. Original frame 1721 as shown in FIG. 17C(i) may be segmented based on a dominant color probability mask (e.g., at 4-pixel accuracy) assisted by a global/local motion probability mask (e.g., at 4- or 8-pixel accuracy) into two regions or region-layers as shown in FIGS. 17C(ii) and 17C(iii). FIG. 17C(ii) illustrates an example color based background region 1 1722 (e.g., the lake area of original frame 1711) and FIG. 17B(iii) illustrates an example remaining foreground region 2 1723 (e.g., the non-lake or ducks area of original frame 1711).

Figure 18A:
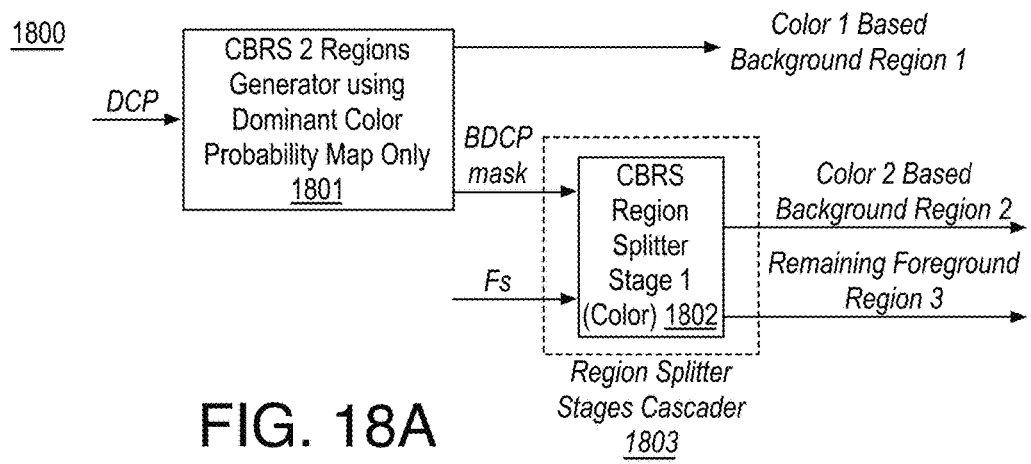
FIG. 18A illustrates an example conceptual block diagram of a system that performs color based three region segmentation.

FIG. 18A illustrates an example conceptual block diagram of a system 1800 that is a subset of system 400 that performs color based three region segmentation, arranged in accordance with at least some implementations of the present disclosure. For example, FIG. 18A illustrates a color only segmentation followed by segmentation of one resultant region-layer based on color only. As shown, system 1800 may include CBRS 2 regions generator using dominant color probability map only module 1801 and a CBRS region splitter stage 1 (color) module 1802 implemented as a component of a regions splitter stages cascader 1803. As shown, color based two primary region segmentation may be performed using color-only as based on a received dominant color probability map at dominant color probability map only module 1801. Dominant color probability map only module 1801 segments the dominant color probability map of a picture or frame into two regions or region-layers: a color 1 based background region 1 and a remaining foreground region (as provided by the BDCP mask). Next, one of the primary regions (e.g., the remaining foreground region in this example) may be split or segmented again based on color-only and use of a subset of the dominant color probability map corresponding to the primary region by CBRS region splitter stage 1 (color) module 1802 to cause the foreground (e.g., the remaining foreground region) to be segmented or split into two regions: a color 2 based background region 2 and a final remaining foreground region 3.

Figure 18B:
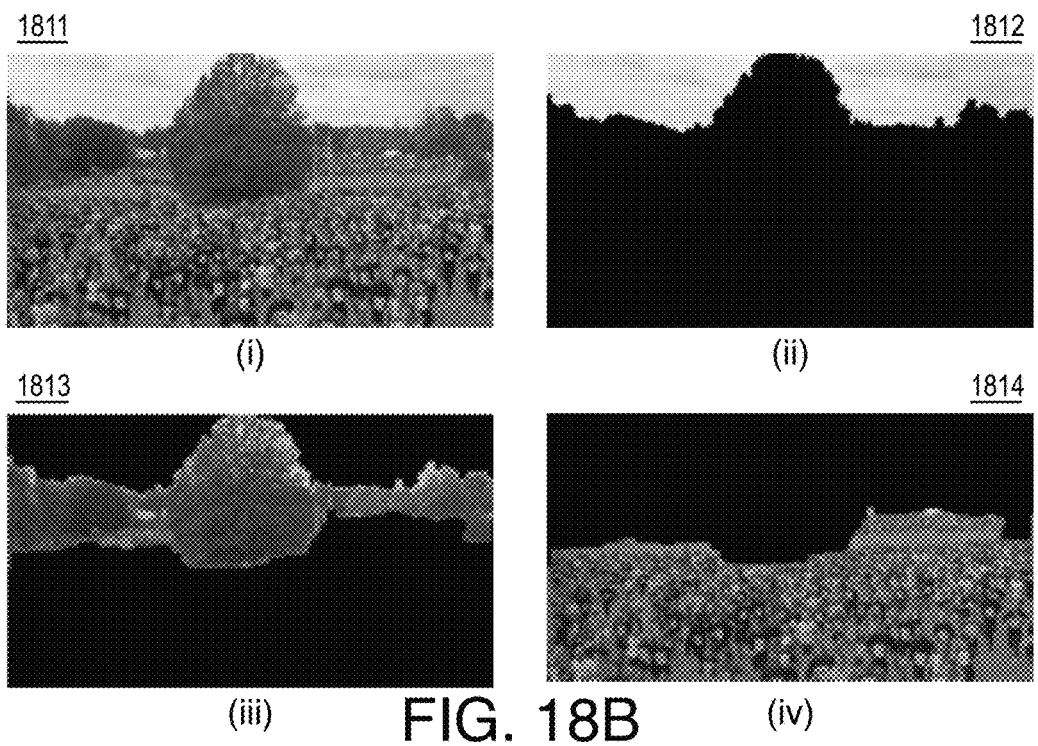
FIG. 18B illustrates example processing results attained by the system of FIG. 18A.

FIG. 18B illustrates example processing results attained by system 1800, arranged in accordance with at least some implementations of the present disclosure. In the illustrated example, system 1800 may operate on a Crowd Run video sequence (e.g., at 1080p) including an original frame 1811 of the video sequence. Original frame 1811 as shown in FIG. 18B(i) may be segmented based on a dominant color probability mask only (e.g., at 4-pixel accuracy) into two regions or region-layers: a color 1 based background region 1 1812 (e.g., the sky area of original frame 1811) as shown in FIG. 18B(ii) and a remaining region (the blacked out portion shown in FIG. 18B(ii)). The remaining region may be further segmented based on color only into a color 2 based background region 2 1813 as shown in FIG. 18B(iii) (e.g., the dark green tree area of original frame 1811) and a remaining foreground region 3 1814 as shown in FIG. 18B(iv) (e.g., the runners and some green grass area of original frame 1811).

Figure 19A:
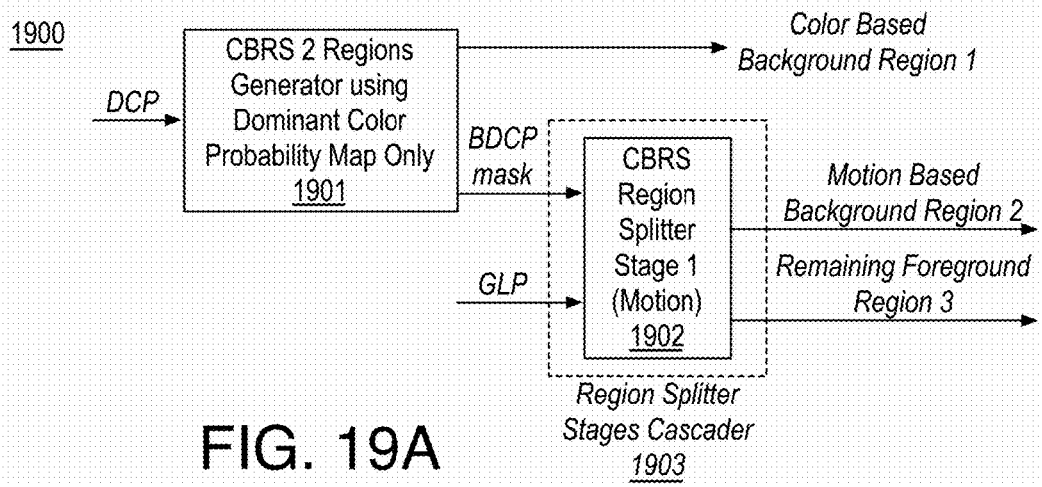
FIG. 19A illustrates an example conceptual block diagram of a system that performs color and motion based three region segmentation.

FIG. 19A illustrates an example conceptual block diagram of a system 1900 that is a subset of system 400 that performs color and motion based three region segmentation, arranged in accordance with at least some implementations of the present disclosure. For example, FIG. 19A illustrates a color only segmentation followed by segmentation of one resultant region-layer using motion. As shown, system 1900 may include a CBRS 2 regions generator using dominant color probability map only module 1901 and a CBRS region splitter stage 1 (motion) module 1902 implemented as a component of a regions splitter stages cascader 1903. As shown, color based two primary region segmentation may be performed using color-only as based on a received dominant color probability map at CBRS 2 regions generator using dominant color probability map only module 1901. CBRS 2 regions generator using dominant color probability map only module 1901 segments the dominant color probability map of a picture or frame into two regions or region-layers: a color 1 based background region 1 and a remaining foreground region (as provided by the BDCP mask). Next, one of the primary regions (e.g., the remaining foreground region in this example) may be split or segmented again based on color (e.g., using a subset of the dominant color probability map corresponding to the primary region) assisted by motion (e.g., as provided by the global/local motion probability map) to cause the foreground (e.g., the remaining foreground region) to be segmented or split into two regions: a motion based background region 2 and a final remaining foreground region 3.

Figure 19B:
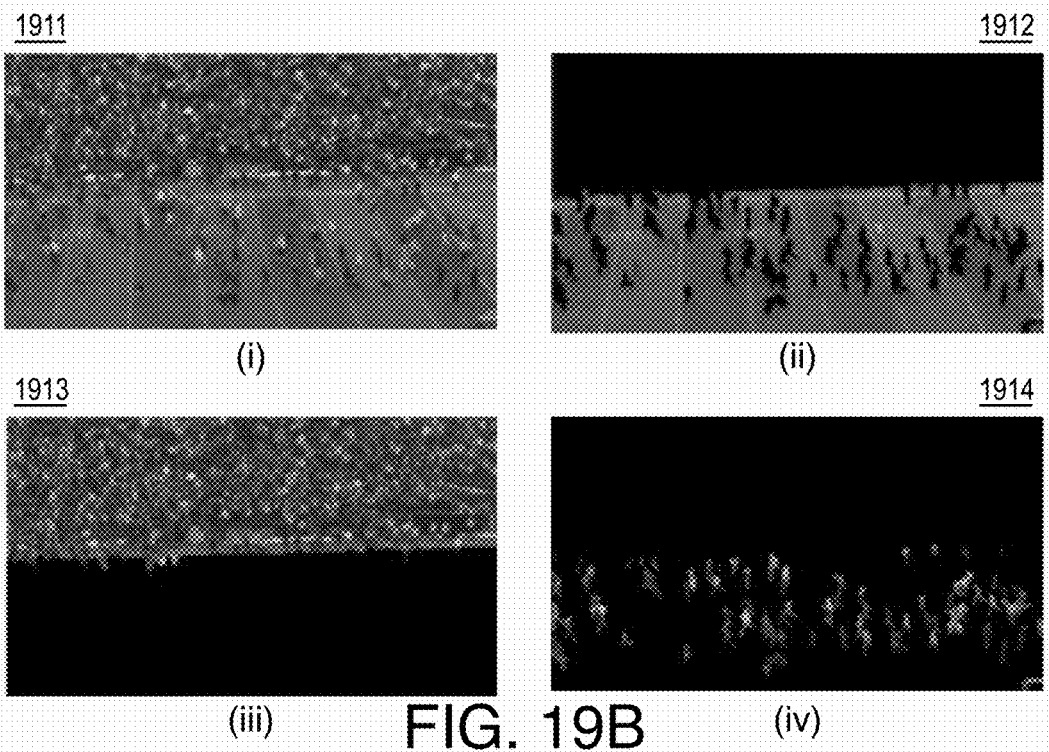
FIG. 19B illustrates example processing results attained by the system of FIG. 19A.

FIG. 19B illustrates example processing results attained by system 1900, arranged in accordance with at least some implementations of the present disclosure. In the illustrated example, system 1900 may operate on a Rush Field video sequence (e.g., at 1080p) including an original frame 1911 of the video sequence. Original frame 1911 as shown in FIG. 19B(i) may be segmented based on a dominant color probability mask only (e.g., at 4-pixel accuracy) into two regions or region-layers: a color based background region 1 1912 (e.g., the football field area of original frame 1911) as shown in FIG. 19B(ii) and a remaining region (the blacked out portion shown in FIG. 19B(ii)). The remaining region may be further segmented based on color assisted by motion into a motion based background region 2 1913 as shown in FIG. 19B(iii) (e.g., the football stadium with seated viewers area of original frame 1911) and a remaining foreground region 3 1914 as shown in FIG. 19B(iv) (e.g., the viewers running onto football field area of original frame 1911).

Figure 19C:
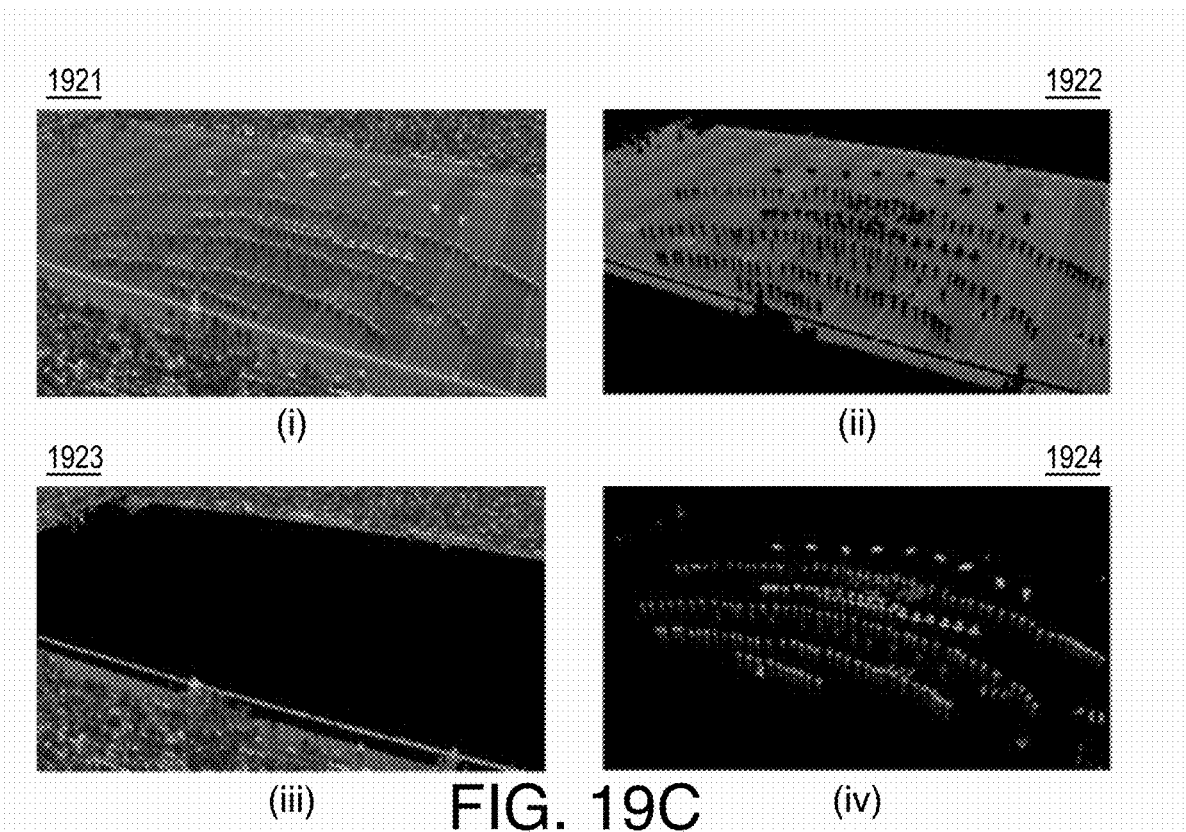
FIG. 19C illustrates additional example processing results attained by the system of FIG. 19A.

FIG. 19C illustrates additional example processing results attained by system 1900, arranged in accordance with at least some implementations of the present disclosure. In the illustrated example, system 1900 may operate on a Football Band video sequence (e.g., at 1080p) including an original frame 1921 of the video sequence. Original frame 1921 as shown in FIG. 19C(i) may be segmented based on a dominant color probability mask only (e.g., at 4-pixel accuracy) into two regions or region-layers: a color based background region 1 1922 (e.g., the football field area of original frame 1921) as shown in FIG. 19C(ii) and a remaining region (the blacked out portion shown in FIG. 19C(ii)). The remaining region may be further segmented based on color assisted by motion into a motion based background region 2 1923 as shown in FIG. 19C(iii) (e.g., the football stadium with seated viewers area of original frame 1921) and a remaining foreground region 3 1924 as shown in FIG. 19C(iv) (e.g., the band members performing area original frame 1811).

Figure 20A:
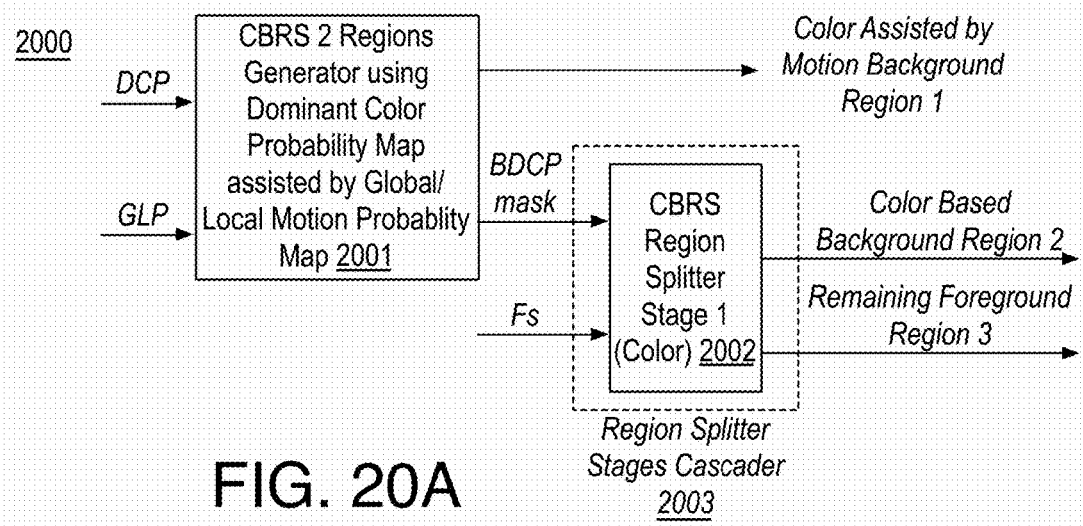
FIG. 20A illustrates an example conceptual block diagram of a system that performs color and motion based three region segmentation.

FIG. 20A illustrates an example conceptual block diagram of a system 2000 that is a subset of system 400 that performs color and motion based three region segmentation, arranged in accordance with at least some implementations of the present disclosure. For example, FIG. 20A illustrates a color assisted by motion segmentation followed by segmentation of one resultant region-layer using color only. As shown, system 2000 may include a CBRS 2 regions generator using dominant color probability map assisted by global/local motion probability map module 2001 and a CBRS region splitter stage 1 (color) module 2002 implemented as a component of a regions splitter stages cascader 2003. As shown, color based two primary region segmentation may be performed using color assisted by motion as based on a received dominant color probability map and a received global/local probability map at CBRS 2 regions generator using dominant color probability map assisted by global/local motion probability map module 2001. CBRS 2 regions generator using dominant color probability map assisted by global/local motion probability map module 2001 segments the dominant color probability map of a picture or frame into two regions or region-layers (assisted by motion): a color assisted by motion background region 1 and a remaining foreground region (as provided by the BDCP mask). Next, one of the primary regions (e.g., the remaining foreground region in this example) may be split or segmented again based on color (e.g., using a subset of the dominant color probability map corresponding to the primary region) to cause the foreground (e.g., the remaining foreground region) to be segmented or split into two regions: a color based background region 2 and a final remaining foreground region 3.

Figure 20B:
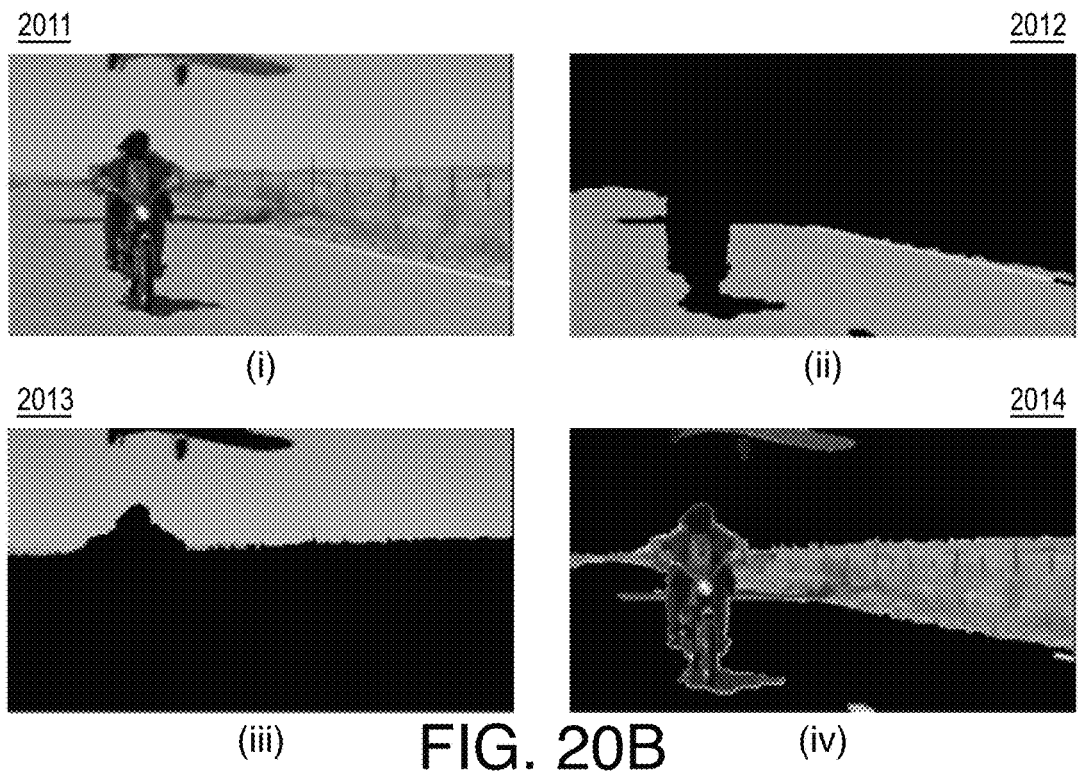
FIG. 20B illustrates example processing results attained by the system of FIG. 20A.

FIG. 20B illustrates example processing results attained by system 2000, arranged in accordance with at least some implementations of the present disclosure. In the illustrated example, system 2000 may operate on an Independence Day video sequence (e.g., at 1080p) including an original frame 2011 of the video sequence. Original frame 2011 as shown in FIG. 20B(i) may be segmented based on a dominant color probability mask (e.g., at 4-pixel accuracy) assisted by a global/local motion probability mask (e.g., at 4- or 8-pixel accuracy) into two regions or region-layers: a color assisted by motion background region 1 2012 (e.g., the road area of original frame 2011) as shown in FIG. 20B(ii) and a remaining region (the blacked out portion shown in FIG. 20B(ii)). The remaining region may be further segmented based on color only into a color based background region 2 2013 as shown in FIG. 20B(iii) (e.g., the sky area of original frame 2011) and a remaining foreground region 3 2014 as shown in FIG. 20B(iv) (e.g., the motorcyclist, the airplane and the roadside fence and bushes area of original frame 2011).

Figure 21A:
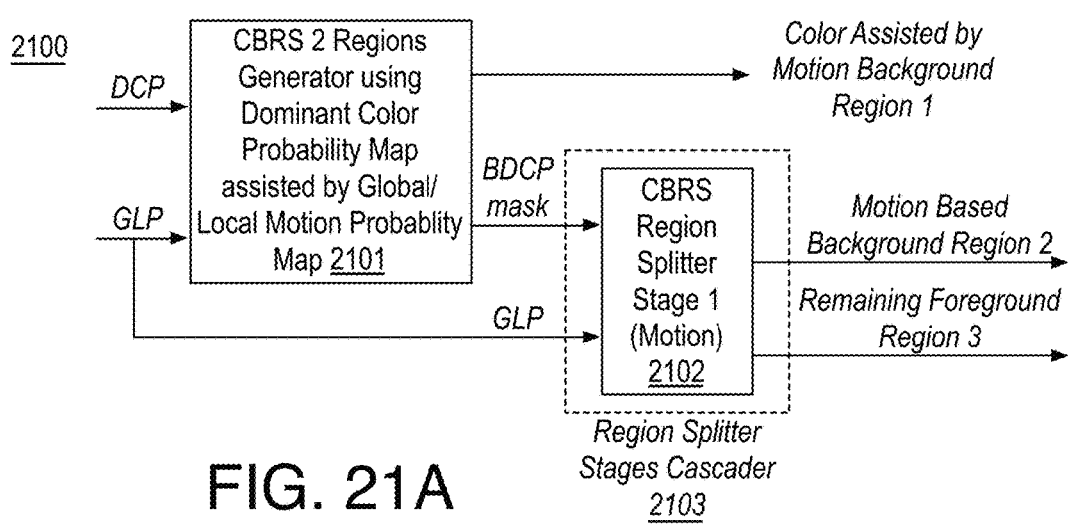
FIG. 21A illustrates an example conceptual block diagram of a system that performs color and motion based three region segmentation.

FIG. 21A illustrates an example conceptual block diagram of a system 2100 that is a subset of system 400 that performs color and motion based three region segmentation, arranged in accordance with at least some implementations of the present disclosure. For example, FIG. 21A illustrates a color based 3 regions segmenter using color assisted by motion, with further region splitting using motion. As shown, system 2100 may include CBRS 2 regions generator using dominant color probability map assisted by global/local motion probability map 2101 and a region splitter stage 1 (motion) module 2102 implemented as a component of a regions splitter stages cascader 2103. As shown, CBRS 2 regions generator using dominant color probability map assisted by global/local motion probability map 2101 may receive and segment a dominant color probability map of a picture or frame with the assistance of a global/local motion probability map of the picture or frame into two regions: a color assisted by motion based background region 1 and a remaining region (as provided by the BDCP mask). Next, the remaining region (e.g., the remaining foreground region in this example) may be segmented or split via region splitter stage 1 (motion) module 2102 that segments the remaining region into a motion based (e.g., using GLP map with area to be segmented indicated by the BDCP mask) into two regions: motion based background region 2 and remaining foreground region 3.

Figure 21B:
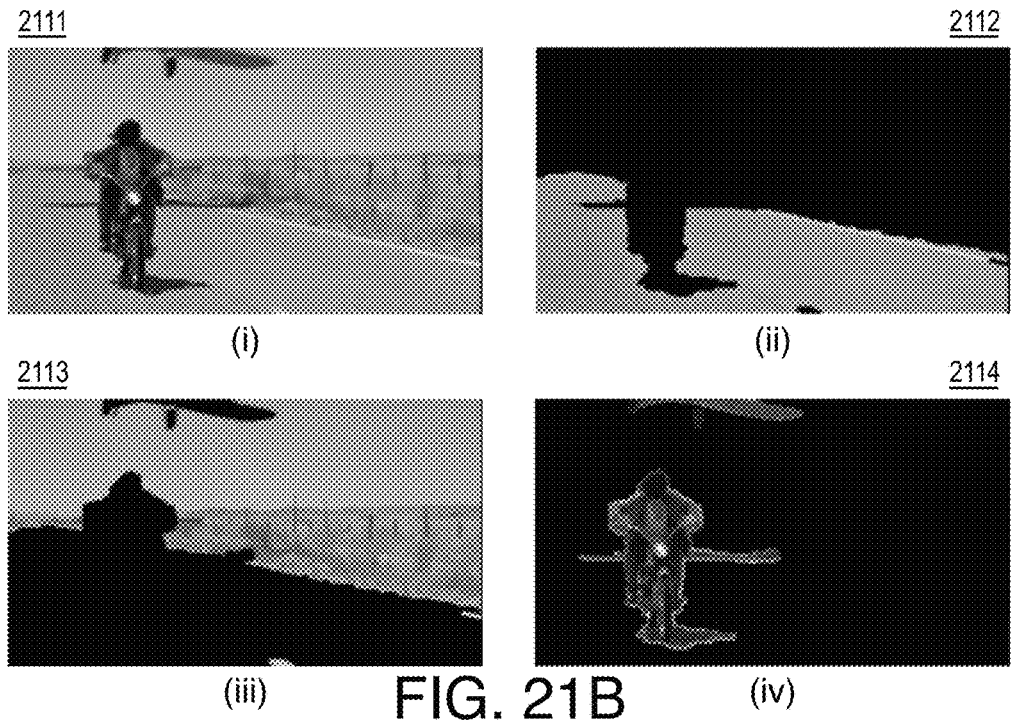
FIG. 21B illustrates example processing results attained by the system of FIG. 21A.

FIG. 21B illustrates example processing results attained by system 2100, arranged in accordance with at least some implementations of the present disclosure. In the illustrated example, system 2100 may operate on an Independence Day video sequence (e.g., at 1080p) including an original frame 2111 of the video sequence. Original frame 2111 as shown in FIG. 21B(i) may be segmented based on a dominant color probability mask (e.g., at 4-pixel accuracy) assisted by a global/local motion probability mask (e.g., at 4- or 8-pixel accuracy) into two regions or region-layers: a color assisted by motion background region 1 2112 (e.g., the road area including the white markings on the road of original frame 2111) as shown in FIG. 21B(ii) and a remaining region (the blacked out portion shown in FIG. 21B(ii)). The remaining region may be further segmented based on motion into a motion based background region 2 2113 as shown in FIG. 21B(iii) (e.g., the sky area and the roadside fence and bushes of original frame 2111) and a remaining foreground region 3 2114 as shown in FIG. 21B(iv) (e.g., the motorcyclist and the airplane area of original frame 2111).

Figure 22A:
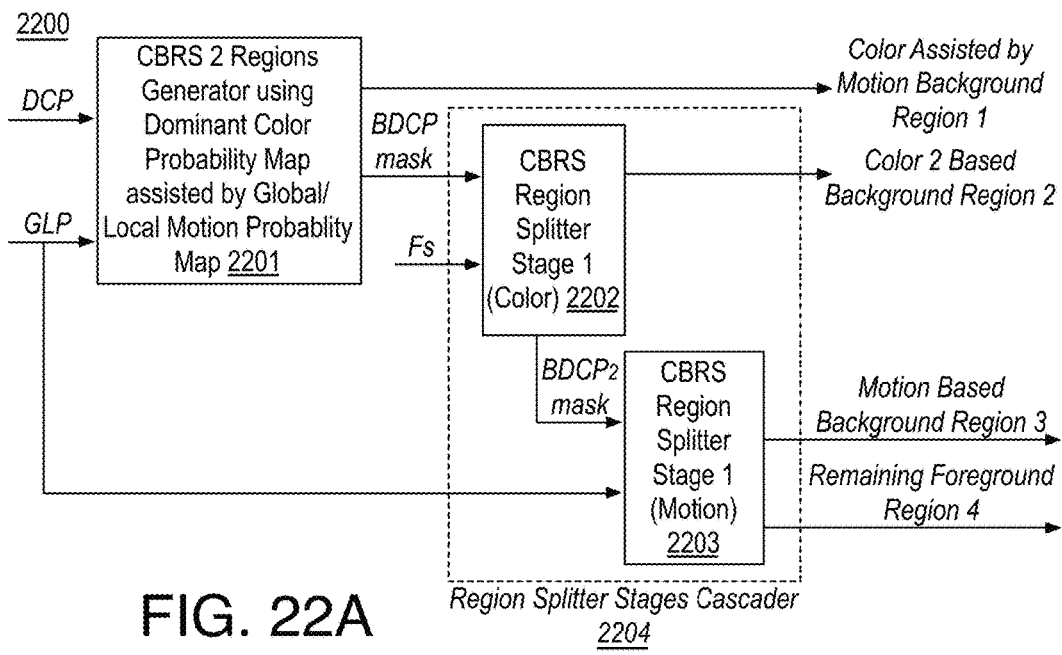
FIG. 22A illustrates an example conceptual block diagram of a system that performs color based four region segmentation.

FIG. 22A illustrates an example conceptual block diagram of a system 2200 that is a subset of system 400 that performs color based four region segmentation, arranged in accordance with at least some implementations of the present disclosure. For example, FIG. 22A illustrates an example color based 4 regions segmenter using color assisted by motion with a region splitting stage 1 using color and a region splitting stage 2 using motion. For example, system 2200 illustrates 4 region segmentation by using first dominant color assisted by motion followed by second dominant color segmentation, followed by a motion based segmentation. As shown, system 2200 may include a CBRS 2 regions generator using dominant color probability map assisted by global/local probability map module 2201 and a region splitter stage 1 (Color) module 2202 and a region splitter stage 2 (motion) module 2203 both implemented via a region splitter stages cascader 2204. As shown, CBRS 2 regions generator using dominant color probability map assisted by global/local probability map module 2201 may receive and segment a picture or frame using dominant color probability (DCP) map with the assistance of a global/local motion probability map of the picture or frame into two regions: a color assisted by motion based background region 1 and a remaining region (as provided by the BDCP mask). Next, the remaining region (e.g., the remaining foreground region in this example) may be segmented or split via region splitter stage 1 (Color) module 2202 that segments the remaining region based on color into a color 2 based background region 2 and a remaining foreground region (as provided by the BDCP$_2$ mask). Next, the remaining foreground region may be segmented or split via region splitter stage 2 (motion) module 2203 that segments the remaining region based on motion into a motion based background region 3 and a final remaining foreground region 4.

Figure 22B:
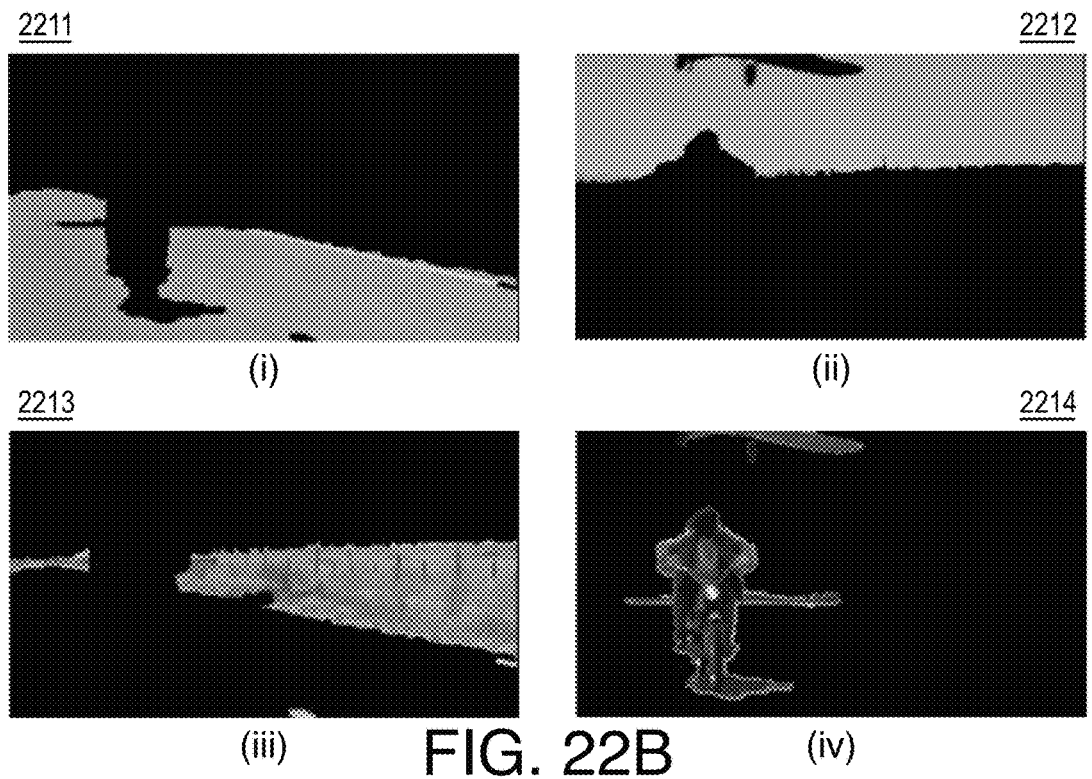
FIG. 22B illustrates example processing results attained by the system of FIG. 22A.

FIG. 22B illustrates example processing results attained by system 2200, arranged in accordance with at least some implementations of the present disclosure. In the illustrated example, system 2200 may operate on an Independence Day video sequence (e.g., at 1080p) including an original frame 2111 of the video sequence (please refer to FIG. 21B(i)). Original frame 2111 may be segmented based on a dominant color probability mask (e.g., at 4-pixel accuracy) assisted by a global/local motion probability mask (e.g., at 4- or 8-pixel accuracy) into two regions or region-layers: a color assisted by motion background region 1 2211 (e.g., the road area of original frame 2111) as shown in FIG. 22B(i) and a remaining region (the blacked out portion shown in FIG. 22B(i)). The remaining region may be further segmented based on color into a color 2 based background region 2 2212 as shown in FIG. 22B(ii) (e.g., the sky area of original frame 2111) and another remaining region (the blacked out portion shown in FIG. 22B(ii)). This remaining region may be further segmented based on motion into a motion based background region 3 2213 as shown in FIG. 22B(iii) (e.g., the roadside fence and bushes area of original frame 2111) and a remaining foreground region 4 2214 as shown in FIG. 22B(iv) (e.g., the motorcyclist and the airplane area of original frame 2111).

In some embodiments, color based region segmentation may be extended to 5 regions or beyond. For example, without loss of generality the techniques discussed herein may be modularly expanded to provide up to 5, 6 or more regions or region-layers. In some embodiments, additional cascading stage(s) may be provided in analogy to those discussed herein. In some embodiments, the techniques discussed herein may be extended to splitting each of the two primary region segmentation paths (e.g., instead of non-dominant color region based path only) to expand the scope of each stage.

Furthermore, without loss of generality the regions or region-layers segmented as discussed herein may be labeled to identify the content of each region. Such labeling may include attaching an index to each region and keeping a small codebook to look up a name or type of each region when an index identifying the region is presented. Such labeling of each region may be performed manually or automatically depending on its statistical or visual characteristics or other parameters (e.g., such parameters may be derived from machine learning or deep learning or the like). For application of region segmentation such as in autonomous driving, identifying a region's content by context and/or pattern matching (e.g. road signs, road markers, traffic lights, pedestrian crossing, crosswalk, pedestrians, bridges, sidewalks, road, cars, other vehicles, road, buildings, etc.) and attaching an index to label of the region may be useful. The region-layers discussed herein may be used in a wide variety of applications such as object detection, object tracking, computer vision, video encode/decode, or the like.

The techniques discussed herein may provide segmentation of video frames into two spatially coherent and temporally consistent regions based on color such as by determining dominant color probability mask. In some embodiments, segmentation of video frames into two spatially coherent and temporally consistent regions may be based on color assisted by motion such as by determining a dominant color probability mask and taking assistance from a global/local motion probability map. In some embodiments, video frames may be segmented into 3 spatially coherent and temporally consistent regions based on color and using a one-stage region splitting of the background region by using dominant color or global/local motion. In some embodiments, video frames may be segmented into 3 spatially coherent and temporally consistent regions based on color assisted by motion and using a one-stage region splitting of the background region by using dominant color or global/local motion. In some embodiments, video frames may be segmented into 4 or 5 spatially coherent and temporally consistent regions based on color and using a two-stage region splitting of the background region by using dominant color or global/local motion in the first stage and dominant color or global/local motion or dominant motion in the second stage. In some embodiments, video frames may be segmented into 4 or 5 spatially coherent and temporally consistent regions based on color assisted by motion and using a two-stage region splitting of the background region by using dominant color or global/local motion in the first stage and dominant color or global/local motion or dominant motion in the second stage.

Figure 23:
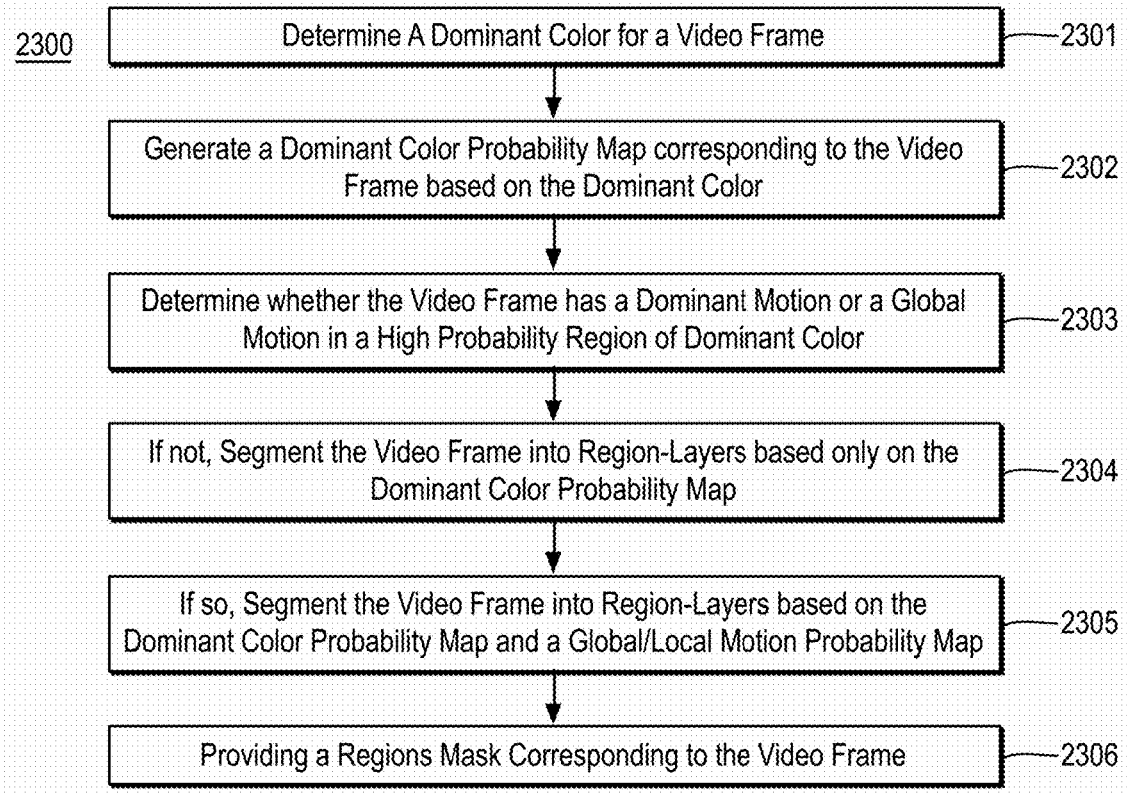
FIG. 23 is a flow diagram illustrating an example process for performing video frame segmentation.

FIG. 23 is a flow diagram illustrating an example process 2300 for performing video frame segmentation, arranged in accordance with at least some implementations of the present disclosure. Process 2300 may include one or more operations 2301-2303 as illustrated in FIG. 23. Process 2300 may form at least part of a video frame segmentation process. Furthermore, process 2300 will be described with reference to system 2400 of FIG. 24.

Figure 24:
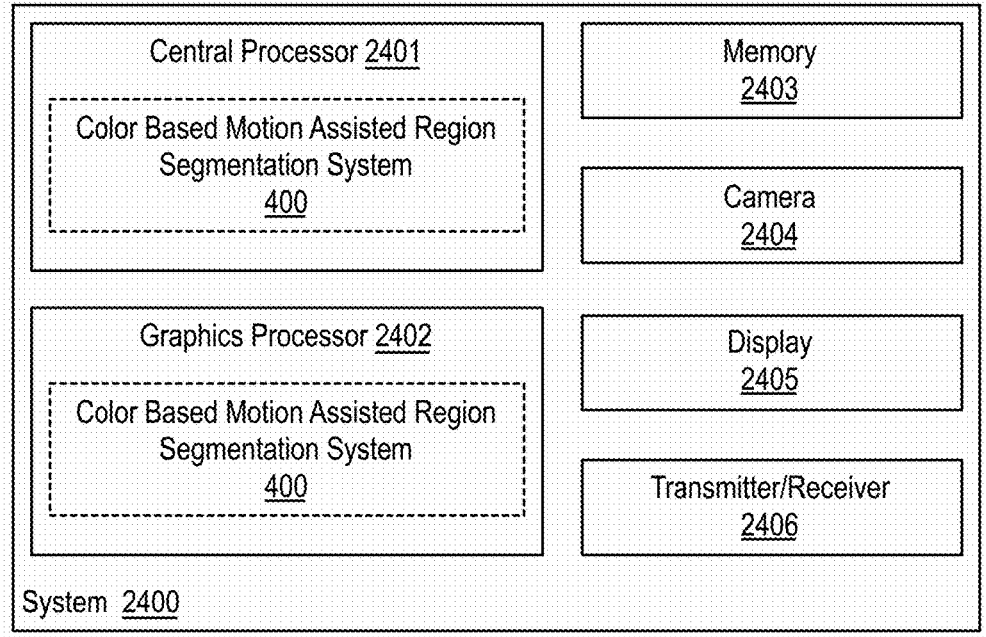
FIG. 24 is an illustrative diagram of an example system 2400 for performing video frame segmentation.

FIG. 24 is an illustrative diagram of an example system 2400 for performing video frame segmentation, arranged in accordance with at least some implementations of the present disclosure. For example, system 2400 may perform one or more operations discussed with respect to process 1500 or any other operations discussed herein. As shown in FIG. 24, system 2400 may include a central processor 2401, a graphics processor 2402, a memory 2403, a camera 2404, a display 2405, and a transmitter/receiver 2406. In some embodiments system 2400 may not include camera 2404, display 2405, and/or transmitter/receiver 2406. As shown, central processor 2401 and/or graphics processor 2402 may implement color based motion assisted region segmentation system 400. System 2400 and implement color based motion assisted region segmentation system 400 may include any system and encoder as discussed herein or combinations thereof. In the example of system 2400, memory 2403 may store frame data, image data, segmentation data, or any related data such as any other data discussed herein.

As shown, in some embodiments, color based motion assisted region segmentation system 400 may be implemented via central processor 2401. In other embodiments, one or more or portions of color based motion assisted region segmentation system 400 may be implemented via graphics processor 2402. In yet other embodiments, color based motion assisted region segmentation system 400 may be implemented by a video processing unit, a video processing pipeline, or the like. In some embodiments, color based motion assisted region segmentation system 400 may be implemented in hardware as a system-on-a-chip (SoC).

Graphics processor 2402 may include any number and type of graphics processing units that may provide the operations as discussed herein. Such operations may be implemented via software or hardware or a combination thereof. For example, graphics processor 2402 may include circuitry dedicated to manipulate and/or analyze images or frames obtained from memory 2403. Central processor 2401 may include any number and type of processing units or modules that may provide control and other high level functions for system 2400 and/or provide any operations as discussed herein. Memory 2403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2403 may be implemented by cache memory. In an embodiment, one or more or portions of color based motion assisted region segmentation system 400 may be implemented via an execution unit (EU) of graphics processor 2402 or another processor. The EU may include, for example, programmable logic or circuitry such as a logic core or cores that may provide a wide array of programmable logic functions. In an embodiment, one or more or portions of color based motion assisted region segmentation system 400 may be implemented via dedicated hardware such as fixed function circuitry or the like. Fixed function circuitry may include dedicated logic or circuitry and may provide a set of fixed function entry points that may map to the dedicated logic for a fixed purpose or function. Camera 2404 may be any suitable camera or device that may obtain image or frame data for processing as discussed herein. Display 2405 may be any display or device that may present image or frame data. Transmitter/receiver 2406 may include any suitable transmitter and/or receiver that may transmit or receive bitstream data as discussed herein.

System 2400 may implement any devices, systems, modules, units, or the like as discussed herein. Furthermore, system 2400 may implement any processes, operations, or the like as discussed herein. System 2400 may have any suitable form factor. For example, system 2400 may be implemented by a camera, a smartphone, an ultrabook, a tablet, a wearable device, a monitor, a desktop computer, a set top box, or the like.

Returning to discussion of FIG. 23, process 2300 may begin at operation 2301, where a dominant color may be determined for a video frame of a sequence of video frames. The dominant color may be determined using any suitable technique or techniques. In an embodiment, determining the dominant color for the video frame includes generating a histogram corresponding to each color channel of the video frame, determining a peak for each of the histograms, and defining the dominant color as a color corresponding to the peaks of each of the histograms.

Processing may continue at operation 2302, where a dominant color probability map corresponding to the video frame may be generated based on the dominant color. The dominant color probability map may include any suitable data or information and may be generated using any suitable technique or techniques. In an embodiment, the dominant color probability map comprises a plurality of probabilities, each probability corresponding to a location within the video frame and indicating, via the probability, a measure of closeness to the dominant color. In an embodiment, generating the dominant color probability map includes determining a dominant color area of the video frame corresponding to the dominant color, determining whether the dominant color area is a low detail region, when the dominant color area is a low detail region, determining a first plurality of differences between the dominant color and pixel colors for pixel locations of the video frame each as a first sum of a first scaled luma channel difference, a first luma channel difference, and a second luma channel difference such that the first scaled luma channel difference is a luma channel difference scaled by a first scaling factor that is a function of the luma value of the pixel location and when the dominant color area is not a low detail region, determining a second plurality of differences between the dominant color and the pixel colors for the pixel locations of the video frame as a second sum of a second scaled luma channel difference, a scaled first chroma channel difference, and the second chroma channel difference such that the second luma channel difference is scaled by a second scaling factor that is less than the first scaling factor, and mapping the first or second plurality of differences to the plurality of probabilities.

Processing may continue at operation 2303, where a determination may be made as to whether the video frame has a dominant motion or a global motion corresponding to a high probability region of dominant color within the video frame. For example, a region or regions of the video frame may be determined that has a high probability of having the dominant color (e.g., the region or regions include those areas of the dominant color probability map having a probability greater than a threshold or the like). A determination may then be made as to whether the high probability region of dominant color has a dominant motion or a global motion using any suitable technique or techniques. In an embodiment, determining whether the high probability region of dominant color has a dominant motion includes generating a histogram corresponding to a local motion vector field of the high probability region of dominant color and indicating a dominant motion for the high probability region of dominant color when the histogram corresponding to the local motion vector field has a peak or indicating no dominant motion for the high probability region of dominant color when the histogram corresponding to the local motion vector field does not have a peak.

Processing may continue at operation 2304, where, when the video frame does not have a dominant motion nor a global motion corresponding to the high probability region (e.g., when the high probability region of dominant color does not have a dominant motion or a global motion), the video frame may be segmented into region-layers based only on the dominant color probability map. The video frame may be segmented into region-layers based only on the dominant color probability map using any suitable technique or techniques. In an embodiment, segmenting the video frame into region-layers based only on the dominant color probability map includes generating a binary dominant color map by generating a histogram corresponding to each color channel of the video frame, generating a dominant color map binarization threshold based on the histogram, applying the dominant color map binarization threshold to the dominant color probability map to generate a first binary dominant color map, and applying at least one of a morphological open/close operator or an isolated small size segment removal to the first binary dominant color map to generate the binary dominant color map.

Processing may continue at operation 2305, where, when the video frame has a dominant motion or a global motion corresponding to the high probability region (e.g., when the high probability region of dominant color does not have a dominant motion or a global motion), the video frame may be segmented into region-layers based on the dominant color probability map and a global/local motion probability map corresponding to the video frame. The global/local motion probability map may be generated using any suitable technique or techniques. In an embodiment, generating the global/local motion probability includes determining a local motion vector field based on the video frame and a reference video frame, determining global motion parameters based on the video frame, the reference video frame, and the local motion vector field, mapping the global motion parameters to a global motion vector field, when a motion differencing method is a first value, determining a first plurality of differences between the local motion vector field and the global motion vector field each as a first sum of absolute value differences x and y values of local and global motion vectors and when a motion differencing method is a second value, determining a second plurality of differences between the local motion vector field and the global motion vector field each based on differences of local and global motion vectors in a polar coordinate domain, and mapping the first or second plurality of differences to the global/local probability map.

In some embodiments, processing may continue such that the region-layers may be further segmented as discussed below. In some embodiments, segmentation processing may terminate after segmentation into two region-layers. In an embodiment, determination may be made as to whether a region-layer that is a non-dominant color region-layer has a second dominant color and, when the non-dominant color region-layer does not have a second dominant color, segmentation processing for the video frame is terminated.

Processing may continue at operation 2306, where a regions mask corresponding to the video frame may be provided based on the region-layers. The regions mask may include any suitable information, data, or data structure such as pixel wise labeling or the like that indicates region-layers within the video frame. In an embodiment, the regions mask indicates pixels of the video frame are included in one of a first or second region-layer. However, as discussed herein, the regions mask may indicate pixels of the video frame are in any number of region-layers.

As discussed, in some embodiments, processing may continue such that the first, second, or both region-layers are further segmented. Such segmentation is discussed in the following with respect to the second region-layer. However, the segmentation may be provided for the first region-layer or both region-layers. In some embodiments, the segmentation may be provided in a cascading fashion. In an embodiment, process 2300 further includes determining a second dominant color for the second region-layer and segmenting the second region-layer based on the second dominant color into third and fourth region-layers such that the regions mask indicates the pixels of the video frame are included in one of three region-layers: the first, third, or fourth region-layer. In an embodiment, process 2300 further includes segmenting the second region-layer based on a global/local motion probability map into third and fourth region-layers such that the regions mask indicates the pixels of the video frame are included in one of three region-layers: the first, third, or fourth region-layer. In an embodiment, process 2300 further includes segmenting the second region-layer, based on one of a second dominant color of the second region-layer or a global/local motion probability map, into third and fourth region-layers and segmenting the third region-layer into fifth and sixth region-layers based on a third dominant color of the third region-layer such that the regions mask indicates the pixels of the video frame are included in one of four region-layers: the first, fourth, fifth, or sixth region-layer. In an embodiment, process 2300 further includes segmenting the second region-layer, based on one of a second dominant color of the second region-layer or a global/local motion probability map, into third and fourth region-layers and segmenting the third region-layer into fifth and sixth region-layers based on the global/local motion probability map such that the regions mask indicates the pixels of the video frame are included in one of four region-layers: the first, fourth, fifth, or sixth region-layer. In an embodiment, process 2300 further includes segmenting the second region-layer, based on one of a second dominant color of the second region-layer or the global/local motion probability map, into third and fourth region-layers and segmenting the third region-layer into fifth and sixth region-layers based on a dominant motion of the video frame such that the regions mask indicates the pixels of the video frame are included in one of four region-layers: the first, fourth, fifth, or sixth region-layer.

Process 2300 may be performed in series or at least partially in parallel for any number of video frames, video sequences, or the like. Process 2300 may provide improved video frame segmentation.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 25:
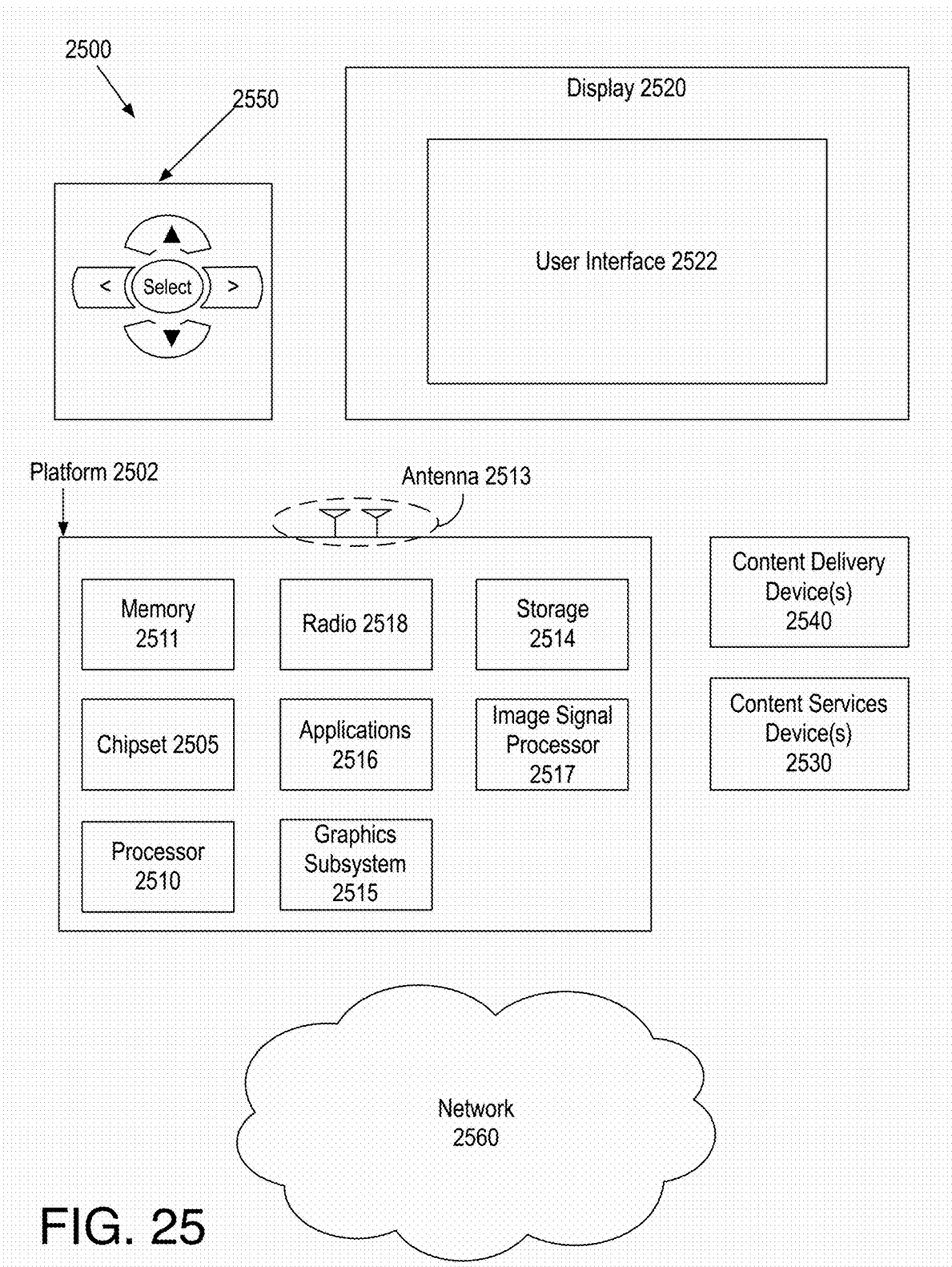
FIG. 25 is an illustrative diagram of an example system.

FIG. 25 is an illustrative diagram of an example system 2500, arranged in accordance with at least some implementations of the present disclosure. In various implementations, system 2500 may be a mobile device system although system 2500 is not limited to this context. For example, system 2500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2500 includes a platform 2502 coupled to a display 2520. Platform 2502 may receive content from a content device such as content services device(s) 2530 or content delivery device(s) 2540 or other content sources such as image sensors 2519. For example, platform 2502 may receive image data as discussed herein from image sensors 2519 or any other content source. A navigation controller 2550 including one or more navigation features may be used to interact with, for example, platform 2502 and/or display 2520. Each of these components is described in greater detail below.

In various implementations, platform 2502 may include any combination of a chipset 2505, processor 2510, memory 2511, antenna 2513, storage 2514, graphics subsystem 2515, applications 2516, image signal processor 2517 and/or radio 2518. Chipset 2505 may provide intercommunication among processor 2510, memory 2511, storage 2514, graphics subsystem 2515, applications 2516, image signal processor 2517 and/or radio 2518. For example, chipset 2505 may include a storage adapter (not depicted) capable of providing intercommunication with storage 2514.

Processor 2510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2510 may be dual-core processor(s), dual-core mobile processor(s), and so forth.

Memory 2511 may be implemented as a volatile memory device such as, but not limited to, a Random Access Memory (RAM), Dynamic Random Access Memory (DRAM), or Static RAM (SRAM).

Storage 2514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2514 may include technology to increase the storage performance enhanced protection for valuable digital media when multiple hard drives are included, for example.

Image signal processor 2517 may be implemented as a specialized digital signal processor or the like used for image processing. In some examples, image signal processor 2517 may be implemented based on a single instruction multiple data or multiple instruction multiple data architecture or the like. In some examples, image signal processor 2517 may be characterized as a media processor. As discussed herein, image signal processor 2517 may be implemented based on a system on a chip architecture and/or based on a multi-core architecture.

Graphics subsystem 2515 may perform processing of images such as still or video for display. Graphics subsystem 2515 may be a graphics processing unit (GPU) or a visual processing unit (VPU), for example. An analog or digital interface may be used to communicatively couple graphics subsystem 2515 and display 2520. For example, the interface may be any of a High-Definition Multimedia Interface, DisplayPort, wireless HDMI, and/or wireless HD compliant techniques. Graphics subsystem 2515 may be integrated into processor 2510 or chipset 2505. In some implementations, graphics subsystem 2515 may be a stand-alone device communicatively coupled to chipset 2505.

The image and/or video processing techniques described herein may be implemented in various hardware architectures. For example, image and/or video functionality may be integrated within a chipset. Alternatively, a discrete graphics and/or video processor may be used. As still another implementation, the image and/or video functions may be provided by a general purpose processor, including a multi-core processor. In further embodiments, the functions may be implemented in a consumer electronics device.

Radio 2518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2518 may operate in accordance with one or more applicable standards in any version.

In various implementations, display 2520 may include any television type monitor or display. Display 2520 may include, for example, a computer display screen, touch screen display, video monitor, television-like device, and/or a television. Display 2520 may be digital and/or analog. In various implementations, display 2520 may be a holographic display. Also, display 2520 may be a transparent surface that may receive a visual projection. Such projections may convey various forms of information, images, and/or objects. For example, such projections may be a visual overlay for a mobile augmented reality (MAR) application. Under the control of one or more software applications 2516, platform 2502 may display user interface 2522 on display 2520.

In various implementations, content services device(s) 2530 may be hosted by any national, international and/or independent service and thus accessible to platform 2502 via the Internet, for example. Content services device(s) 2530 may be coupled to platform 2502 and/or to display 2520. Platform 2502 and/or content services device(s) 2530 may be coupled to a network 2560 to communicate (e.g., send and/or receive) media information to and from network 2560. Content delivery device(s) 2540 also may be coupled to platform 2502 and/or to display 2520.

Image sensors 2519 may include any suitable image sensors that may provide image data based on a scene. For example, image sensors 2519 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 2519 may include any device that may detect information of a scene to generate image data.

In various implementations, content services device(s) 2530 may include a cable television box, personal computer, network, telephone, Internet enabled devices or appliance capable of delivering digital information and/or content, and any other similar device capable of uni-directionally or bi-directionally communicating content between content providers and platform 2502 and/display 2520, via network 2560 or directly. It will be appreciated that the content may be communicated uni-directionally and/or bi-directionally to and from any one of the components in system 2500 and a content provider via network 2560. Examples of content may include any media information including, for example, video, music, medical and gaming information, and so forth.

Content services device(s) 2530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2502 may receive control signals from navigation controller 2550 having one or more navigation features. The navigation features of navigation controller 2550 may be used to interact with user interface 2522, for example. In various embodiments, navigation controller 2550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2550 may be replicated on a display (e.g., display 2520) by movements of a pointer, cursor, focus ring, or other visual indicators displayed on the display. For example, under the control of software applications 2516, the navigation features located on navigation controller 2550 may be mapped to virtual navigation features displayed on user interface 2522, for example. In various embodiments, navigation controller 2550 may not be a separate component but may be integrated into platform 2502 and/or display 2520.

The present disclosure, however, is not limited to the elements or in the context shown or described herein.

In various implementations, drivers (not shown) may include technology to enable users to instantly turn on and off platform 2502 like a television with the touch of a button after initial boot-up, when enabled, for example. Program logic may allow platform 2502 to stream content to media adaptors or other content services device(s) 2530 or content delivery device(s) 2540 even when the platform is turned "off." In addition, chipset 2505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2500 may be integrated. For example, platform 2502 and content services device(s) 2530 may be integrated, or platform 2502 and content delivery device(s) 2540 may be integrated, or platform 2502, content services device(s) 2530, and content delivery device(s) 2540 may be integrated, for example. In various embodiments, platform 2502 and display 2520 may be an integrated unit. Display 2520 and content service device(s) 2530 may be integrated, or display 2520 and content delivery device(s) 2540 may be integrated, for example. These examples are not meant to limit the present disclosure.

In various embodiments, system 2500 may be implemented as a wireless system, a wired system, or a combination of both. When implemented as a wireless system, system 2500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 25.

Figure 26:
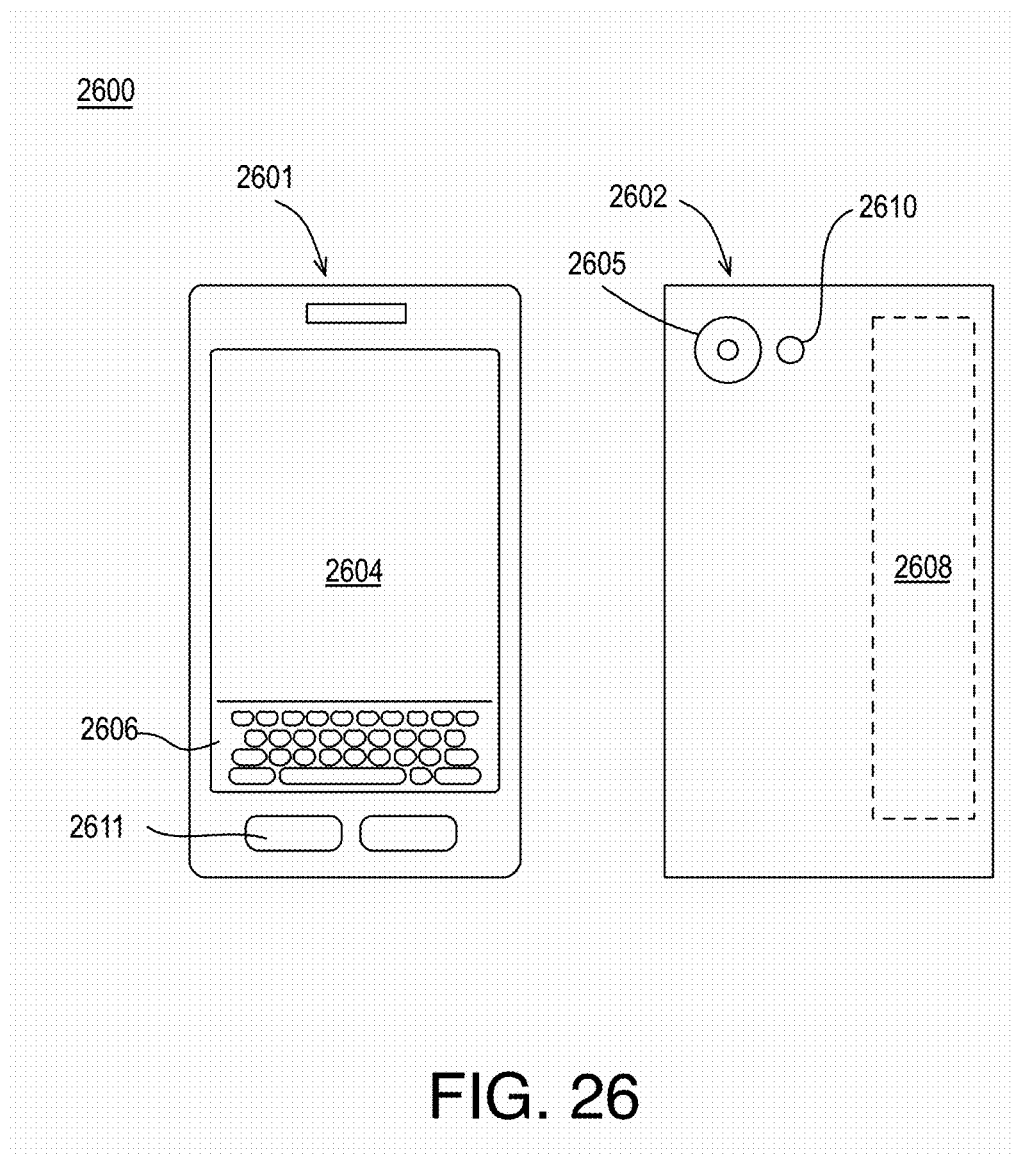
FIG. 26 illustrates an example small form factor device, all arranged in accordance with at least some implementations of the present disclosure.

As described above, system 2500 may be embodied in varying physical styles or form factors. FIG. 26 illustrates an example small form factor device 2600, arranged in accordance with at least some implementations of the present disclosure. In some examples, system 2500 may be implemented via device 2600. In various embodiments, for example, device 2600 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 26, device 2600 may include a housing with a front 2601 and a back 2602. Device 2600 includes a display 2604, an input/output (I/O) device 2606, and an integrated antenna 2608. Device 2600 also may include navigation features 2611. I/O device 2606 may include any suitable I/O device for entering information into a mobile computing device. Examples for I/O device 2606 may include an alphanumeric keyboard, a numeric keypad, a touch pad, input keys, buttons, switches, microphones, speakers, voice recognition device and software, and so forth. Information also may be entered into device 2600 by way of microphone (not shown), or may be digitized by a voice recognition device. As shown, device 2600 may include a camera 2605 (e.g., including a lens, an aperture, and an imaging sensor) and a flash 2610 integrated into back 2602 (or elsewhere) of device 2600. In other examples, camera 2605 and/or flash 2610 may be integrated into front 2601 of device 2600 and/or additional cameras (e.g., such that device 2600 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer implemented method for segmenting video frames into region-layers comprises determining a dominant color for a video frame of a sequence of video frames, generating a dominant color probability map corresponding to the video frame based on the dominant color such that the dominant color probability map comprises a plurality of probabilities, each probability corresponding to a location within the video frame and indicating, via the probability, a measure of closeness to the dominant color, determining whether the video frame has a dominant motion or a global motion corresponding to a high probability region of dominant color within the video frame, when the video frame does not have a dominant motion nor a global motion corresponding to the high probability region, segmenting the video frame into region-layers based only on the dominant color probability map, and providing a regions mask corresponding to the video frame based on the region-layers, the regions mask indicating pixels of the video frame are included in one of a first or second region-layer.

Further to the first embodiments, the second region-layer comprises a non-dominant color region-layer and the method further comprises determining whether the second region-layer has a second dominant color and when the second region-layer does not have a second dominant color, terminating segmentation processing for the video frame.

Further to the first embodiments, segmenting the video frame into region-layers based only on the dominant color probability map comprises generating a binary dominant color map by generating a histogram corresponding to each color channel of the video frame, generating a dominant color map binarization threshold based on the histogram, applying the dominant color map binarization threshold to the dominant color probability map to generate a first binary dominant color map, and applying at least one of a morphological open/close operator or an isolated small size segment removal to the first binary dominant color map to generate the binary dominant color map.

Further to the first embodiments, the method further comprises, when the video frame has a dominant motion or a global motion corresponding to the high probability region, segmenting the video frame into region-layers based on the dominant color probability map and a global/local motion probability map corresponding to the video frame.

Further to the first embodiments, the method further comprises, when the video frame has a dominant motion or a global motion corresponding to the high probability region, segmenting the video frame into region-layers based on the dominant color probability map and a global/local motion probability map corresponding to the video frame and generating the global/local motion probability map by determining a local motion vector field based on the video frame and a reference video frame, determining global motion parameters based on the video frame, the reference video frame, and the local motion vector field, mapping the global motion parameters to a global motion vector field, when a motion differencing method is a first value, determining a first plurality of differences between the local motion vector field and the global motion vector field each as a first sum of absolute value differences x and y values of local and global motion vectors and when a motion differencing method is a second value, determining a second plurality of differences between the local motion vector field and the global motion vector field each based on differences of local and global motion vectors in a polar coordinate domain, and mapping the first or second plurality of differences to the global/local probability map.

Further to the first embodiments, determining the dominant color for the video frame comprises generating a histogram corresponding to each color channel of the video frame, determining a peak for each of the histograms, and defining the dominant color as a color corresponding to the peaks of each of the histograms.

Further to the first embodiments, determining whether the high probability region of dominant color has a dominant motion comprises generating a histogram corresponding to a local motion vector field of the high probability region of dominant color and indicating a dominant motion for the high probability region of dominant color when the histogram corresponding to the local motion vector field has a peak or indicating no dominant motion for the high probability region of dominant color when the histogram corresponding to the local motion vector field does not have a peak.

Further to the first embodiments, generating the dominant color probability map comprises determining a dominant color area of the video frame corresponding to the dominant color, determining whether the dominant color area is a low detail region, when the dominant color area is a low detail region, determining a first plurality of differences between the dominant color and pixel colors for pixel locations of the video frame each as a first sum of a first scaled luma channel difference, a first luma channel difference, and a second luma channel difference, wherein the first scaled luma channel difference is a luma channel difference scaled by a first scaling factor that is a function of the luma value of the pixel location and when the dominant color area is not a low detail region, determining a second plurality of differences between the dominant color and the pixel colors for the pixel locations of the video frame as a second sum of a second scaled luma channel difference, a scaled first chroma channel difference, and the second chroma channel difference, wherein the second luma channel difference is scaled by a second scaling factor that is less than the first scaling factor, and mapping the first or second plurality of differences to the plurality of probabilities.

Further to the first embodiments, the method further comprises determining a second dominant color for the second region-layer and segmenting the second region-layer based on the second dominant color into third and fourth region-layers such that the regions mask indicates the pixels of the video frame are included in one of three region-layers: the first, third, or fourth region-layer.

Further to the first embodiments, the method further comprises segmenting the second region-layer based on a global/local motion probability map into third and fourth region-layers such that the regions mask indicates the pixels of the video frame are included in one of three region-layers: the first, third, or fourth region-layer.

Further to the first embodiments, the method further comprises segmenting the second region-layer, based on one of a second dominant color of the second region-layer or a global/local motion probability map, into third and fourth region-layers and segmenting the third region-layer into fifth and sixth region-layers based on a third dominant color of the third region-layer such that the regions mask indicates the pixels of the video frame are included in one of four region-layers: the first, fourth, fifth, or sixth region-layer.

Further to the first embodiments, the method further comprises segmenting the second region-layer, based on one of a second dominant color of the second region-layer or a global/local motion probability map, into third and fourth region-layers and segmenting the third region-layer into fifth and sixth region-layers based on the global/local motion probability map such that the regions mask indicates the pixels of the video frame are included in one of four region-layers: the first, fourth, fifth, or sixth region-layer.

Further to the first embodiments, the method further comprises segmenting the second region-layer, based on one of a second dominant color of the second region-layer or the global/local motion probability map, into third and fourth region-layers and segmenting the third region-layer into fifth and sixth region-layers based on a dominant motion of the video frame such that the regions mask indicates the pixels of the video frame are included in one of four region-layers: the first, fourth, fifth, or sixth region-layer.

Further to the first embodiments, the method further comprises segmenting the second region-layer, based on one of a second dominant color of the second region-layer or a global/local motion probability map, into third and fourth region-layers and segmenting the third region-layer into fifth and sixth region-layers based on at least one of a third dominant color of the third region-layer, the global/local motion probability map, or a dominant motion of the video frame such that the regions mask indicates the pixels of the video frame are included in one of four region-layers: the first, fourth, fifth, or sixth region-layer.

In one or more second embodiments, a system for segmenting video frames into region-layers comprises memory configured to store a video frame of a sequence of video frames and a processor coupled to the memory, the processor to determine a dominant color for the video frame, to generate a dominant color probability map corresponding to the video frame based on the dominant color, such that the dominant color probability map comprises a plurality of probabilities, each probability corresponding to a location within the video frame and indicating, via the probability, a measure of closeness to the dominant color, to determine whether the video frame has a dominant motion or a global motion corresponding to a high probability region of dominant color within the video frame, when the video frame does not have a dominant motion nor a global motion corresponding to the high probability region, to segment the video frame into region-layers based only on the dominant color probability map, and to provide a regions mask corresponding to the video frame based on the region-layers, the regions mask indicating pixels of the video frame are included in one of a first or second region-layer.

Further to the second embodiments, the second region-layer comprises a non-dominant color region-layer, and the processor is further to determine whether the second region-layer has a second dominant color and, when the second region-layer does not have a second dominant color, terminate segmentation processing for the video frame.

Further to the second embodiments, to segment the video frame into region-layers based only on the dominant color probability map comprises the processor to generate a binary dominant color map, the processor to generate the binary dominant color map comprising the processor to generate a histogram corresponding to each color channel of the video frame, to generate a dominant color map binarization threshold based on the histogram, to apply the dominant color map binarization threshold to the dominant color probability map to generate a first binary dominant color map, and to apply at least one of a morphological open/close operator or an isolated small size segment removal to the first binary dominant color map to generate the binary dominant color map.

Further to the second embodiments, the processor is further to, when the video frame has a dominant motion or a global motion corresponding to the high probability region, segment the video frame into region-layers based on the dominant color probability map and a global/local motion probability map corresponding to the video frame.

Further to the second embodiments, the processor is further to, when the video frame has a dominant motion or a global motion corresponding to the high probability region, segment the video frame into region-layers based on the dominant color probability map and a global/local motion probability map corresponding to the video frame and the processor to generate the global/local motion probability map, wherein the processor to generate the global/local motion probability map comprises the processor to determine a local motion vector field based on the video frame and a reference video frame, to determine global motion parameters based on the video frame, the reference video frame, and the local motion vector field, to map the global motion parameters to a global motion vector field, when a motion differencing method is a first value, to determine a first plurality of differences between the local motion vector field and the global motion vector field each as a first sum of absolute value differences x and y values of local and global motion vectors and, when a motion differencing method is a second value, to determine a second plurality of differences between the local motion vector field and the global motion vector field each based on differences of local and global motion vectors in a polar coordinate domain, and to map the first or second plurality of differences to the global/local probability map.

Further to the second embodiments, the processor to determine the dominant color for the video frame comprises the processor to generate a histogram corresponding to each color channel of the video frame, to determine a peak for each of the histograms, and to define the dominant color as a color corresponding to the peaks of each of the histograms.

Further to the second embodiments, the processor to determine whether the high probability region of dominant color has a dominant motion comprises the processor to a histogram corresponding to a local motion vector field of the high probability region of dominant color and to indicate a dominant motion for the high probability region of dominant color when the histogram corresponding to the local motion vector field has a peak or indicating no dominant motion for the high probability region of dominant color when the histogram corresponding to the local motion vector field does not have a peak.

Further to the second embodiments, the processor is further to segment the second region-layer, based on one of a second dominant color of the second region-layer or a global/local motion probability map, into third and fourth region-layers and to segment the third region-layer into fifth and sixth region-layers based on at least one of a third dominant color of the third region-layer, the global/local motion probability map, or a dominant motion of the video frame, wherein the regions mask indicates the pixels of the video frame are included in one of four region-layers: the first, fourth, fifth, or sixth region-layer.

In one or more third embodiments, a system comprises means for determining a dominant color for a video frame of a sequence of video frames, means for generating a dominant color probability map corresponding to the video frame based on the dominant color, such that the dominant color probability map comprises a plurality of probabilities, each probability corresponding to a location within the video frame and indicating, via the probability, a measure of closeness to the dominant color, means for determining whether the video frame has a dominant motion or a global motion corresponding to a high probability region of dominant color within the video frame, means for, when the video frame does not have a dominant motion nor a global motion corresponding to the high probability region, segmenting the video frame into region-layers based only on the dominant color probability map, and means for providing a regions mask corresponding to the video frame based on the region-layers, the regions mask indicating pixels of the video frame are included in one of a first or second region-layer.

Further to the third embodiments, the means for segmenting the video frame into region-layers based only on the dominant color probability map comprise means for generating a histogram corresponding to each color channel of the video frame, means for generating a dominant color map binarization threshold based on the histogram, means for applying the dominant color map binarization threshold to the dominant color probability map to generate a first binary dominant color map, and means for applying at least one of a morphological open/close operator or an isolated small size segment removal to the first binary dominant color map to generate a binary dominant color map.

Further to the third embodiments, the system further comprises means for, when the video frame has a dominant motion or a global motion corresponding to the high probability region, segmenting the video frame into region-layers based on the dominant color probability map and a global/local motion probability map corresponding to the video frame.

Further to the third embodiments, the system further comprises means for generating the global/local motion probability map comprising means for determining a local motion vector field based on the video frame and a reference video frame, means for determining global motion parameters based on the video frame, the reference video frame, and the local motion vector field, means for mapping the global motion parameters to a global motion vector field, means for, when a motion differencing method is a first value, determining a first plurality of differences between the local motion vector field and the global motion vector field each as a first sum of absolute value differences x and y values of local and global motion vectors and means for, when a motion differencing method is a second value, determining a second plurality of differences between the local motion vector field and the global motion vector field each based on differences of local and global motion vectors in a polar coordinate domain, and means for mapping the first or second plurality of differences to the global/local probability map.

Further to the third embodiments, the system further comprises means for segmenting the second region-layer, based on one of a second dominant color of the second region-layer or a global/local motion probability map, into third and fourth region-layers and means for segmenting the third region-layer into fifth and sixth region-layers based on at least one of a third dominant color of the third region-layer, the global/local motion probability map, or a dominant motion of the video frame, wherein the regions mask indicates the pixels of the video frame are included in one of four region-layers: the first, fourth, fifth, or sixth region-layer.

In one or more fourth embodiments, at least one machine readable medium comprises a plurality of instructions that, in response to being executed on a device, cause the device to segment video frames into region-layers by determining a dominant color for a video frame of a sequence of video frames, generating a dominant color probability map corresponding to the video frame based on the dominant color such that the dominant color probability map comprises a plurality of probabilities, each probability corresponding to a location within the video frame and indicating, via the probability, a measure of closeness to the dominant color, determining whether the video frame has a dominant motion or a global motion corresponding to a high probability region of dominant color within the video frame, when the video frame does not have a dominant motion nor a global motion corresponding to the high probability region, segmenting the video frame into region-layers based only on the dominant color probability map, and providing a regions mask corresponding to the video frame based on the region-layers, the regions mask indicating pixels of the video frame are included in one of a first or second region-layer.

Further to the fourth embodiments, segmenting the video frame into region-layers based only on the dominant color probability map comprises generating a binary dominant color map by generating a histogram corresponding to each color channel of the video frame, generating a dominant color map binarization threshold based on the histogram, applying the dominant color map binarization threshold to the dominant color probability map to generate a first binary dominant color map, and applying at least one of a morphological open/close operator or an isolated small size segment removal to the first binary dominant color map to generate the binary dominant color map.

Further to the fourth embodiments, the machine readable medium comprises further instructions that, in response to being executed on the device, cause the device to segment video frames into region-layers by, when the video frame has a dominant motion or a global motion corresponding to the high probability region, segmenting the video frame into region-layers based on the dominant color probability map and a global/local motion probability map corresponding to the video frame.

Further to the fourth embodiments, the machine readable medium comprises further instructions that, in response to being executed on the device, cause the device to segment video frames into region-layers by determining a local motion vector field based on the video frame and a reference video frame, determining global motion parameters based on the video frame, the reference video frame, and the local motion vector field, mapping the global motion parameters to a global motion vector field, when a motion differencing method is a first value, determining a first plurality of differences between the local motion vector field and the global motion vector field each as a first sum of absolute value differences x and y values of local and global motion vectors and when a motion differencing method is a second value, determining a second plurality of differences between the local motion vector field and the global motion vector field each based on differences of local and global motion vectors in a polar coordinate domain, and mapping the first or second plurality of differences to the global/local probability map.

Further to the fourth embodiments, determining whether the high probability region of dominant color has a dominant motion comprises generating a histogram corresponding to a local motion vector field of the high probability region of dominant color and indicating a dominant motion for the high probability region of dominant color when the histogram corresponding to the local motion vector field has a peak or indicating no dominant motion for the high probability region of dominant color when the histogram corresponding to the local motion vector field does not have a peak.

Further to the fourth embodiments, the machine readable medium comprises further instructions that, in response to being executed on the device, cause the device to segment video frames into region-layers by segmenting the second region-layer, based on one of a second dominant color of the second region-layer or a global/local motion probability map, into third and fourth region-layers and segmenting the third region-layer into fifth and sixth region-layers based on at least one of a third dominant color of the third region-layer, the global/local motion probability map, or a dominant motion of the video frame, wherein the regions mask indicates the pixels of the video frame are included in one of four region-layers: the first, fourth, fifth, or sixth region-layer.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for segmenting video frames into region-layers comprising:
   determining a dominant color for a video frame of a sequence of video frames;
   generating a dominant color probability map corresponding to the video frame based on the dominant color, wherein the dominant color probability map comprises a plurality of probabilities, each probability corresponding to a location within the video frame and comprising a scaled absolute difference between a color of the location and the dominant color;
   determining whether the video frame has a dominant motion or a global motion corresponding to a high probability region of dominant color within the video frame, the high probability region comprising a region having probabilities exceeding a threshold;
   when the video frame does not have a dominant motion nor a global motion corresponding to the high probability region, segmenting the video frame into region-layers based only on the dominant color probability map; and
   providing a regions mask corresponding to the video frame based on the region-layers, the regions mask indicating pixels of the video frame are included in one of a first or second region-layer.

2. The method of claim 1, wherein the second region-layer comprises a non-dominant color region-layer, the method further comprising:
   determining whether the second region-layer has a second dominant color; and
   when the second region-layer does not have a second dominant color, terminating segmentation processing for the video frame.

3. The method of claim 1, wherein segmenting the video frame into region-layers based only on the dominant color probability map comprises generating a binary dominant color map by:
   generating a histogram corresponding to each color channel of the video frame;
   generating a dominant color map binarization threshold based on the histogram;
   applying the dominant color map binarization threshold to the dominant color probability map to generate a first binary dominant color map; and
   applying at least one of a morphological open/close operator or an isolated small size segment removal to the first binary dominant color map to generate the binary dominant color map.

4. The method of claim 1, further comprising:
   when the video frame has a dominant motion or a global motion corresponding to the high probability region, segmenting the video frame into region-layers based on the dominant color probability map and a global/local motion probability map corresponding to the video frame.

5. The method of claim 4, further comprising generating the global/local motion probability map by:
   determining a local motion vector field based on the video frame and a reference video frame;
   determining global motion parameters based on the video frame, the reference video frame, and the local motion vector field;
   mapping the global motion parameters to a global motion vector field;
   when a motion differencing method is a first value, determining a first plurality of differences between the local motion vector field and the global motion vector field each as a first sum of absolute value differences x and y values of local and global motion vectors; and when a motion differencing method is a second value, determining a second plurality of differences between the local motion vector field and the global motion vector field each based on differences of local and global motion vectors in a polar coordinate domain; and mapping the first or second plurality of differences to the global/local probability map.

6. The method of claim 1, wherein determining the dominant color for the video frame comprises:

generating a histogram corresponding to each color channel of the video frame;

determining a peak for each of the histograms; and defining the dominant color as a color corresponding to the peaks of each of the histograms.

7. The method of claim 1, wherein determining whether the high probability region of dominant color has a dominant motion comprises:

generating a histogram corresponding to a local motion vector field of the high probability region of dominant color; and indicating a dominant motion for the high probability region of dominant color when the histogram corresponding to the local motion vector field has a peak or indicating no dominant motion for the high probability region of dominant color when the histogram corresponding to the local motion vector field does not have a peak.

8. The method of claim 1, further comprising:

determining a second dominant color for the second region-layer; and segmenting the second region-layer based on the second dominant color into third and fourth region-layers, wherein the regions mask indicates the pixels of the video frame are included in one of three region-layers: the first, third, or fourth region-layer.

9. The method of claim 1, further comprising:

segmenting the second region-layer based on a global/local motion probability map into third and fourth region-layers, wherein the regions mask indicates the pixels of the video frame are included in one of three region-layers: the first, third, or fourth region-layer.

10. The method of claim 1, further comprising:

segmenting the second region-layer, based on one of a second dominant color of the second region-layer or a global/local motion probability map, into third and fourth region-layers; and segmenting the third region-layer into fifth and sixth region-layers based on a third dominant color of the third region-layer, wherein the regions mask indicates the pixels of the video frame are included in one of four region-layers: the first, fourth, fifth, or sixth region-layer.

11. The method of claim 1, further comprising:

segmenting the second region-layer, based on one of a second dominant color of the second region-layer or a global/local motion probability map, into third and fourth region-layers; and segmenting the third region-layer into fifth and sixth region-layers based on the global/local motion probability map, wherein the regions mask indicates the pixels of the video frame are included in one of four region-layers: the first, fourth, fifth, or sixth region-layer.

12. The method of claim 1, further comprising:

segmenting the second region-layer, based on one of a second dominant color of the second region-layer or the global/local motion probability map, into third and fourth region-layers; and segmenting the third region-layer into fifth and sixth region-layers based on a dominant motion of the video frame, wherein the regions mask indicates the pixels of the video frame are included in one of four region-layers: the first, fourth, fifth, or sixth region-layer.

13. A system for segmenting video frames into region-layers comprising:

a memory configured to store a video frame of a sequence of video frames; and a processor coupled to the memory, the processor to determine a dominant color for the video frame, to generate a dominant color probability map corresponding to the video frame based on the dominant color, wherein the dominant color probability map comprises a plurality of probabilities, each probability corresponding to a location within the video frame and comprising a scaled absolute difference between a color of the location and the dominant color, to determine whether the video frame has a dominant motion or a global motion corresponding to a high probability region of dominant color within the video frame, the high probability region comprising a region having probabilities exceeding a threshold, when the video frame does not have a dominant motion nor a global motion corresponding to the high probability region, to segment the video frame into region-layers based only on the dominant color probability map, and to provide a regions mask corresponding to the video frame based on the region-layers, the regions mask indicating pixels of the video frame are included in one of a first or second region-layer.

14. The system of claim 13, wherein to segment the video frame into region-layers based only on the dominant color probability map comprises the processor to generate a binary dominant color map, the processor to generate the binary dominant color map comprising the processor to generate a histogram corresponding to each color channel of the video frame, to generate a dominant color map binarization threshold based on the histogram, to apply the dominant color map binarization threshold to the dominant color probability map to generate a first binary dominant color map, and to apply at least one of a morphological open/close operator or an isolated small size segment removal to the first binary dominant color map to generate the binary dominant color map.

15. The system of claim 13, the processor further to, when the video frame has a dominant motion or a global motion corresponding to the high probability region, segment the video frame into region-layers based on the dominant color probability map and a global/local motion probability map corresponding to the video frame.

16. The system of claim 15, the processor to generate the global/local motion probability map, wherein the processor to generate the global/local motion probability map comprises the processor to determine a local motion vector field based on the video frame and a reference video frame, to determine global motion parameters based on the video frame, the reference video frame, and the local motion vector field, to map the global motion parameters to a global motion vector field, when a motion differencing method is a first value, to determine a first plurality of differences between the local motion vector field and the global motion vector field each as a first sum of absolute value differences x and y values of local and global motion vectors and, when a motion differencing method is a second value, to determine a second plurality of differences between the local motion vector field and the global motion vector field each based on differences of local and global motion vectors in a polar coordinate domain, and to map the first or second plurality of differences to the global/local probability map.

17. The system of claim 13, the processor to determine whether the high probability region of dominant color has a dominant motion comprises the processor to a histogram corresponding to a local motion vector field of the high probability region of dominant color and to indicate a dominant motion for the high probability region of dominant color when the histogram corresponding to the local motion vector field has a peak or indicating no dominant motion for the high probability region of dominant color when the histogram corresponding to the local motion vector field does not have a peak.

18. The system of claim 13, wherein the processor is further to segment the second region-layer, based on one of a second dominant color of the second region-layer or a global/local motion probability map, into third and fourth region-layers and to segment the third region-layer into fifth and sixth region-layers based on at least one of a third dominant color of the third region-layer, the global/local motion probability map, or a dominant motion of the video frame, wherein the regions mask indicates the pixels of the video frame are included in one of four region-layers: the first, fourth, fifth, or sixth region-layer.

19. At least one non-transitory machine readable medium comprising a plurality of instructions that, in response to being executed on a device, cause the device to segment video frames into region-layers by:
  determining a dominant color for a video frame of a sequence of video frames;
  generating a dominant color probability map corresponding to the video frame based on the dominant color, wherein the dominant color probability map comprises a plurality of probabilities, each probability corresponding to a location within the video frame and comprising a scaled absolute difference between a color of the location and the dominant color;
  determining whether the video frame has a dominant motion or a global motion corresponding to a high probability region of dominant color within the video frame, the high probability region comprising a region having probabilities exceeding a threshold;
  when the video frame does not have a dominant motion nor a global motion corresponding to the high probability region, segmenting the video frame into region-layers based only on the dominant color probability map; and
  providing a regions mask corresponding to the video frame based on the region-layers, the regions mask indicating pixels of the video frame are included in one of a first or second region-layer.

20. The non-transitory machine readable medium of claim 19, wherein segmenting the video frame into region-layers based only on the dominant color probability map comprises generating a binary dominant color map by:
  generating a histogram corresponding to each color channel of the video frame;
  generating a dominant color map binarization threshold based on the histogram;
  applying the dominant color map binarization threshold to the dominant color probability map to generate a first binary dominant color map; and
  applying at least one of a morphological open/close operator or an isolated small size segment removal to the first binary dominant color map to generate the binary dominant color map.

21. The non-transitory machine readable medium of claim 19, the machine readable medium comprising further instructions that, in response to being executed on the device, cause the device to segment video frames into region-layers by:
  when the video frame has a dominant motion or a global motion corresponding to the high probability region, segmenting the video frame into region-layers based on the dominant color probability map and a global/local motion probability map corresponding to the video frame.

22. The non-transitory machine readable medium of claim 21, the machine readable medium comprising further instructions that, in response to being executed on the device, cause the device to generate the global/local motion probability map by:
  determining a local motion vector field based on the video frame and a reference video frame;
  determining global motion parameters based on the video frame, the reference video frame, and the local motion vector field;
  mapping the global motion parameters to a global motion vector field;
  when a motion differencing method is a first value, determining a first plurality of differences between the local motion vector field and the global motion vector field each as a first sum of absolute value differences x and y values of local and global motion vectors; and
  when a motion differencing method is a second value, determining a second plurality of differences between the local motion vector field and the global motion vector field each based on differences of local and global motion vectors in a polar coordinate domain; and
  mapping the first or second plurality of differences to the global/local probability map.

23. The non-transitory machine readable medium of claim 19, wherein determining whether the high probability region of dominant color has a dominant motion comprises:
  generating a histogram corresponding to a local motion vector field of the high probability region of dominant color; and
  indicating a dominant motion for the high probability region of dominant color when the histogram corresponding to the local motion vector field has a peak or indicating no dominant motion for the high probability region of dominant color when the histogram corresponding to the local motion vector field does not have a peak.

24. The non-transitory machine readable medium of claim 19, the machine readable medium comprising further instructions that, in response to being executed on the device, cause the device to generate the global/local motion probability map by:
  segmenting the second region-layer, based on one of a second dominant color of the second region-layer or a global/local motion probability map, into third and fourth region-layers; and
  segmenting the third region-layer into fifth and sixth region-layers based on at least one of a third dominant color of the third region-layer, the global/local motion probability map, or a dominant motion of the video frame, wherein the regions mask indicates the pixels of the video frame are included in one of four region-layers: the first, fourth, fifth, or sixth region-layer.

* * * * *